(12) United States Patent
Ogata et al.

(10) Patent No.: US 10,735,177 B2
(45) Date of Patent: Aug. 4, 2020

(54) OPTICAL TRANSMITTING DEVICE AND OPTICAL RECEIVING DEVICE

(71) Applicant: FUJITSU LIMITED, Kawasaki-shi, Kanagawa (JP)

(72) Inventors: Yuuki Ogata, Kawasaki (JP); Takashi Shiraishi, Atsugi (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/458,988

(22) Filed: Jul. 1, 2019

(65) Prior Publication Data

US 2020/0028661 A1 Jan. 23, 2020

(30) Foreign Application Priority Data

Jul. 23, 2018 (JP) ................................. 2018-137593

(51) Int. Cl.
| | | |
|---|---|---|
| *H04L 7/02* | (2006.01) | |
| *H04L 7/00* | (2006.01) | |
| *H04B 10/50* | (2013.01) | |
| *H04B 10/61* | (2013.01) | |

(52) U.S. Cl.
CPC ............ *H04L 7/02* (2013.01); *H04B 10/50* (2013.01); *H04B 10/61* (2013.01); *H04L 7/0075* (2013.01)

(58) Field of Classification Search
CPC ........... H04B 10/50; H04B 10/61; H04L 7/02; H04L 7/0075

USPC ......................................................... 398/140
See application file for complete search history.

(56) References Cited

U.S. PATENT DOCUMENTS

| | | | | |
|---|---|---|---|---|
| 5,953,139 A | * | 9/1999 | Nemecek ................. | H04N 7/22 |
| | | | | 348/E7.094 |
| 7,136,593 B1 | * | 11/2006 | Yano ....................... | H04J 14/02 |
| | | | | 398/158 |
| 9,184,909 B1 | * | 11/2015 | McCracken ............ | H03L 7/087 |
| 10,530,495 B2 | * | 1/2020 | Akizawa .............. | H04B 10/695 |
| 2002/0159130 A1 | * | 10/2002 | Sakano ................... | H03L 7/087 |
| | | | | 359/326 |
| 2007/0223919 A1 | | 9/2007 | Kanesaka | |
| 2018/0294883 A1 | * | 10/2018 | Kim ....................... | H04B 10/58 |

FOREIGN PATENT DOCUMENTS

| | | |
|---|---|---|
| JP | 62-278836 | 12/1987 |
| JP | 5-274258 | 10/1993 |
| JP | 2007-266668 | 10/2007 |

* cited by examiner

*Primary Examiner* — Dalzid E Singh
(74) *Attorney, Agent, or Firm* — Fujitsu Patant Center

(57) ABSTRACT

An optical transmitting device includes a plurality of transmitters configured to be arranged so as to correspond to a plurality of channels, the transmitters each reproducing a clock from an input data signal, and outputting the data signal identified and reproduced based on the reproduced clock to a light emitting element and a processor configured to control phase difference between the output data signals based on a result of comparison between phases of the reproduced clocks.

15 Claims, 42 Drawing Sheets

FIG. 5
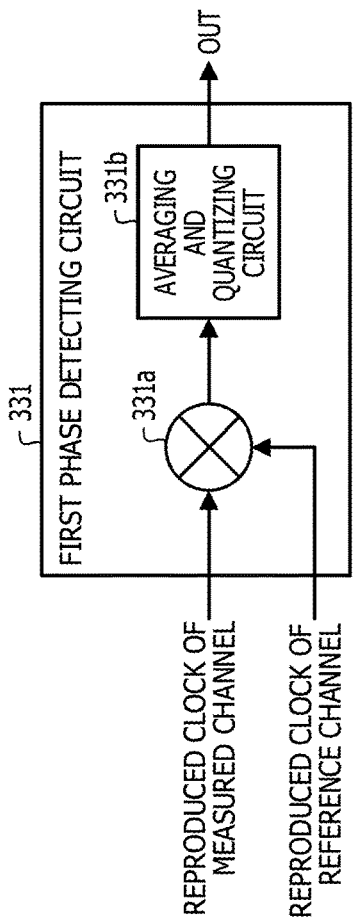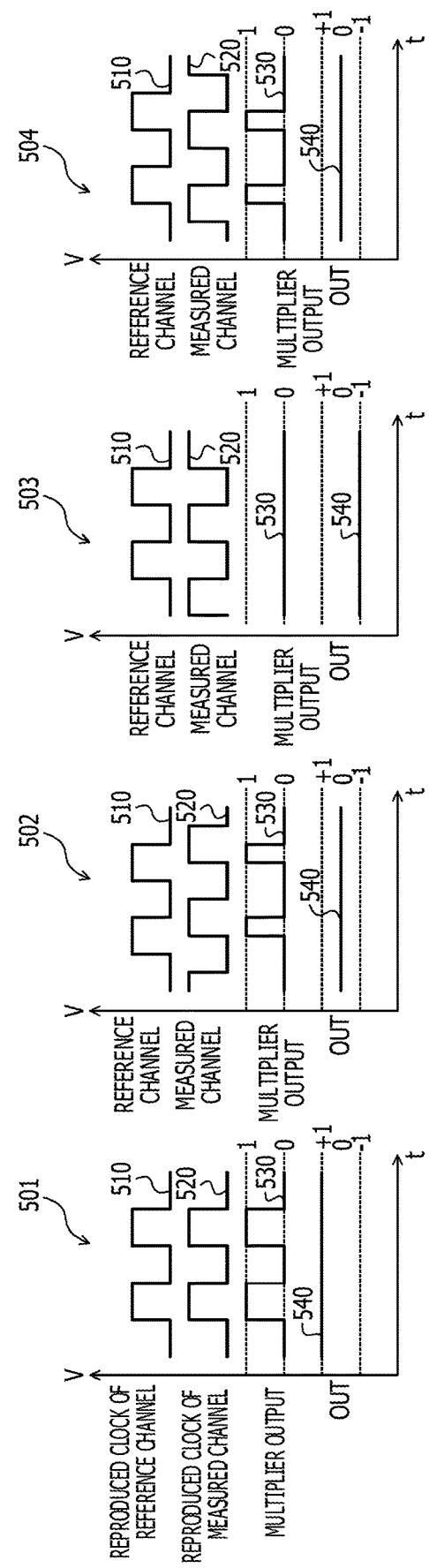

FIG. 6

| AMOUNT OF PHASE DELAY [°] OF REPRODUCED CLOCK OF MEASURED CHANNEL WITH RESPECT TO REPRODUCED CLOCK OF REFERENCE CHANNEL | DETECTION RESULT OF FIRST PHASE DETECTING CIRCUIT |
|---|---|
| 0 | +1 |
| 90 | 0 |
| 180 | -1 |
| 270 | 0 |

| AMOUNT OF PHASE DELAY [°] OF REPRODUCED CLOCK OF MEASURED CHANNEL WITH RESPECT TO REPRODUCED CLOCK OF REFERENCE CHANNEL | DETECTION RESULT OF SECOND PHASE DETECTING CIRCUIT |
|---|---|
| 0 | 0 |
| 90 | -1 |
| 180 | 0 |
| 270 | +1 |

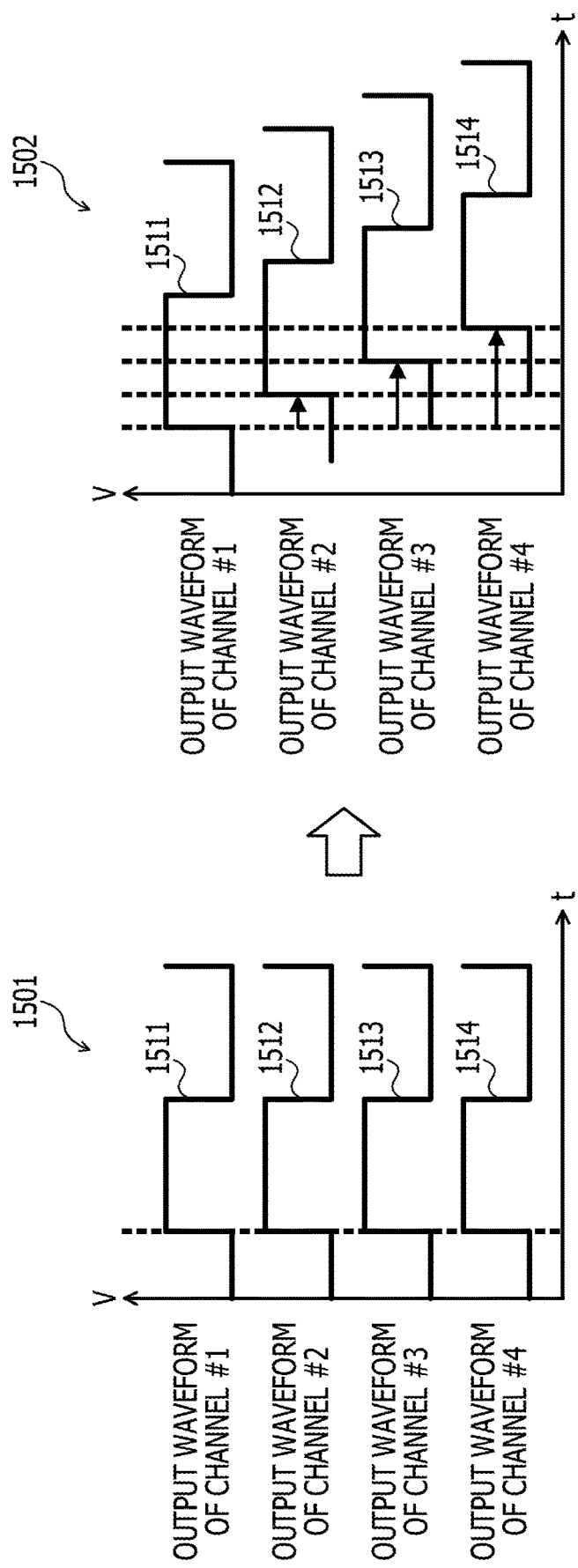

FIG. 34

| CHANNEL | VCO GAIN Kdef_ch#* IN BEST STATE | NORMALIZED EVALUATION VALUE Vmax_ch#* IN WORST STATE |
|---|---|---|
| #1 | Kdef_ch#1 | Vmax_ch#1 |
| #2 | Kdef_ch#2 | Vmax_ch#2 |
| #3 | Kdef_ch#3 | Vmax_ch#3 |
| #4 | Kdef_ch#4 | Vmax_ch#4 |

3400

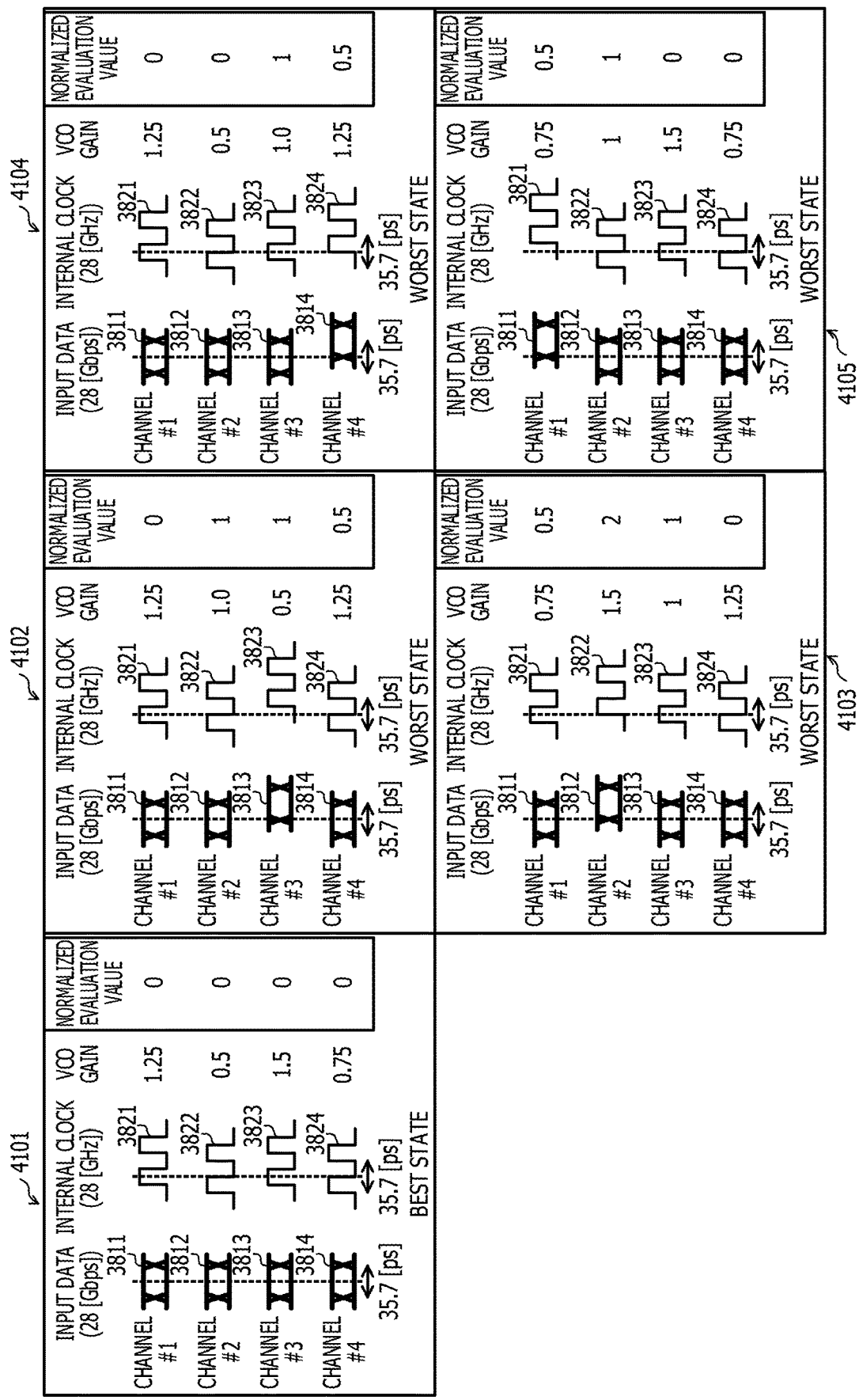

US 10,735,177 B2

OPTICAL TRANSMITTING DEVICE AND OPTICAL RECEIVING DEVICE

CROSS-REFERENCE TO RELATED APPLICATION

This application is based upon and claims the benefit of priority of the prior Japanese Patent Application No. 2018-137593, filed on Jul. 23, 2018, the entire contents of which are incorporated herein by reference.

FIELD

The embodiments discussed herein are related to an optical transmitting device and an optical receiving device.

BACKGROUND

In the past, there has been a technology which suppresses an effect of crosstalk between signal lines constituting a signal bus by temporally shifting starts of output of respective signals in the signal bus. In addition, there has been a technology which suppresses an amount of crosstalk between a transmitting unit and a receiving unit by detecting a phase difference between a change point of data transmitted via an electro-optic converting unit and a change point of data received via an opto-electric converting unit, and applying delay control to the transmission data. In addition, there has been a technology which adjusts a transmission skew between channels in parallel optical transmission.

Disclosed as related art are, for example, Japanese Laid-open Patent Publication No. 05-274258, Japanese Laid-open Patent Publication No. 2007-266668, Japanese Laid-open Patent Publication No. 62-278836, and the like.

However, with the above-described related technologies, it is difficult to determine phase relation between data signals of respective channels which data signals are input to an optical transmitting device or an optical receiving device in a configuration that transmits optical signals using the plurality of channels. It is therefore difficult to suppress an effect of crosstalk between channels on transmission quality.

In view of the above, it is desirable to provide an optical transmitting device and an optical receiving device that may suppress an effect of crosstalk between channels on transmission quality.

SUMMARY

According to an aspect of the embodiment, An optical transmitting device includes a plurality of transmitters configured to be arranged so as to correspond to a plurality of channels, the transmitters each reproducing a clock from an input data signal, and outputting the data signal identified and reproduced based on the reproduced clock to a light emitting element and a processor configured to control phase difference between the output data signals based on a result of comparison between phases of the reproduced clocks.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram (1) illustrating an example of detection of a first phase detecting circuit according to the first embodiment;

FIG. 6 is a diagram (2) illustrating an example of detection of a first phase detecting circuit according to the first embodiment;

FIG. 8 is a diagram (2) illustrating an example of detection of a second phase detecting circuit according to the first embodiment;

FIG. 15 is a diagram illustrating a first example of phase control of an optical transmitting device according to the first embodiment;

FIG. 34 is a diagram illustrating an example of VCO gains in a best state and normalized evaluation values in a worst state, the VCO gains and the normalized evaluation values being stored by an optical transmitting device according to the second embodiment;

FIG. 41 is a diagram illustrating an example of comparison between a best state and a worst state in an optical transmitting device according to the third embodiment.

DESCRIPTION OF EMBODIMENTS

Figure 1:
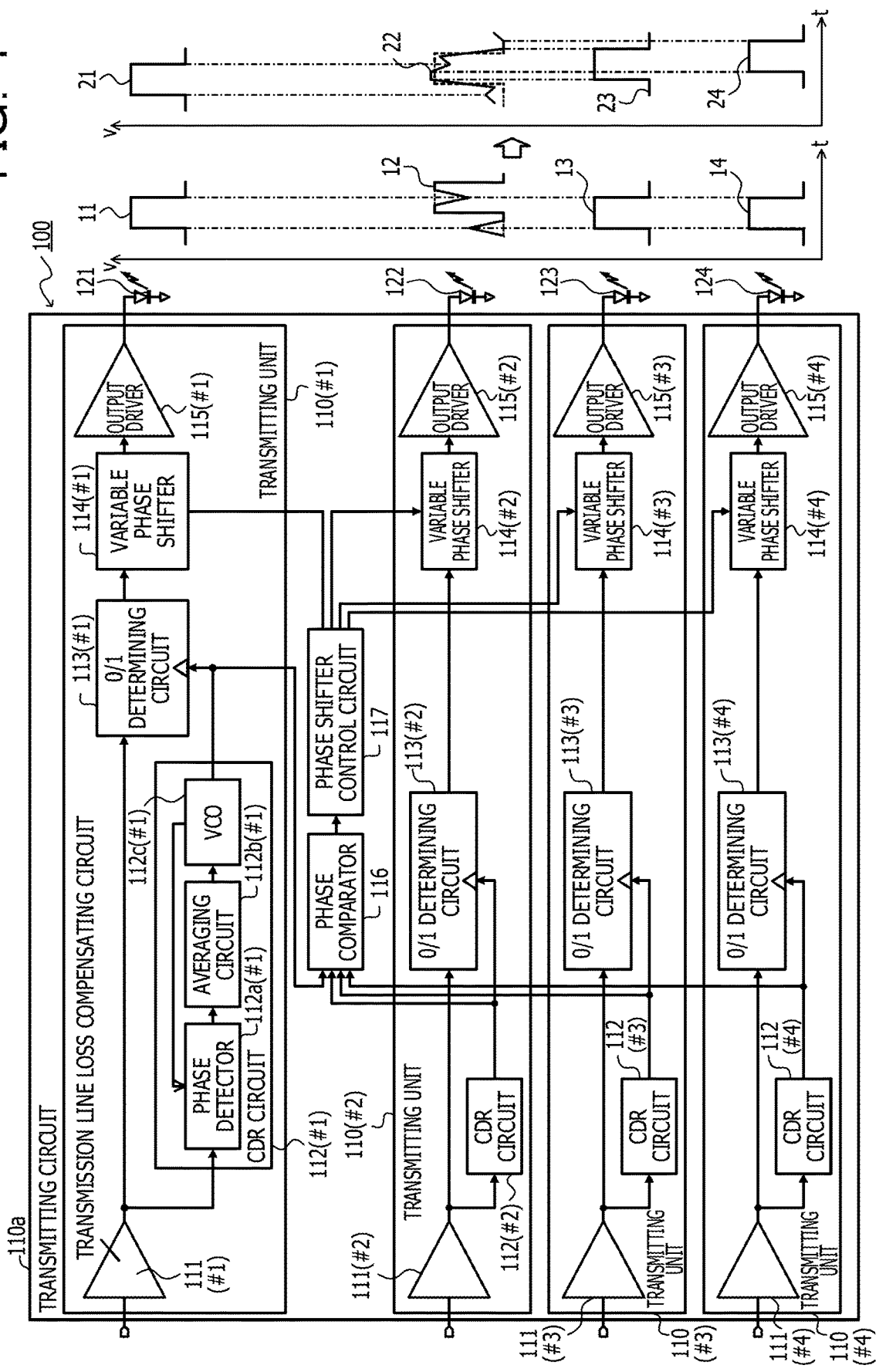
FIG. 1 is a diagram illustrating an example of an optical transmitting device according to a first embodiment.

Referring to the drawings, detailed description will hereinafter be made of embodiments of an optical transmitting device and an optical receiving device according to the present technology.

(First Embodiment)
(Optical Transmitting Device According to First Embodiment)

FIG. 1 is a diagram illustrating an example of an optical transmitting device according to a first embodiment. As illustrated in FIG. 1, an optical transmitting device 100 according to the first embodiment includes a transmitting circuit 110a and light emitting elements 121 to 124. In the example illustrated in FIG. 1, the optical transmitting device 100 is a four-channel transmitting device that performs high-capacity optical transmission by transmitting optical signals from the light emitting elements 121 to 124, respectively. The four channels will be set as channels #1 to #4.

As an example, the optical transmitting device 100 may perform optical transmission at 25×4=100 [Gbps] by transmitting optical signals each at 25 [Gbps] from the light emitting elements 121 to 124. As another example, the optical transmitting device 100 may perform optical transmission at 28×4=112 [Gbps] by transmitting optical signals each at 28 [Gbps] from the light emitting elements 121 to 124.

The transmitting circuit 110a is a circuit that generates respective driving signals for driving the light emitting elements 121 to 124 based on input data signals (electric signals) of the channels #1 to #4. The transmitting circuit 110a may be implemented by one or more integrated circuits such as an FPGA or the like. FPGA is an abbreviation of Field Programmable Gate Array. The transmitting circuit 110a, for example, includes transmitting units 110 (#1 to #4) corresponding to the channels #1 to #4, respectively, a phase comparator 116, and a phase shifter control circuit 117.

The transmitting units 110 (#1 to #4) are arranged in order of the transmitting unit 110 (#1), the transmitting unit 110 (#2), the transmitting unit 110 (#3), and the transmitting unit 110 (#4) corresponding to the channels #1 to #4, respectively. For example, the transmitting unit 110 (#1) and the transmitting unit 110 (#2) are adjacent to each other, the transmitting unit 110 (#2) and the transmitting unit 110 (#3) are adjacent to each other, and the transmitting unit 110 (#3) and the transmitting unit 110 (#4) are adjacent to each other. Being adjacent means being arranged so as to adjoin each other.

The data signals of the channels #1 to #4 are input to the transmitting units 110 (#1 to #4), respectively. Here, phase relation between the data signals of the channels #1 to #4 which data signals are input to the transmitting units 110 (#1 to #4) is not uniform. This results from a fact that transmission sources of the data signals of the channels #1 to #4 do not set the phases between the channels uniform, a fact that the phases between the channels are shifted in a transmission line, or both thereof. However, the data signals of the channels #1 to #4 which data signals are input to the transmitting units 110 (#1 to #4) have a same frequency.

The phase relation between the data signals of a plurality of channels (for example, the channels #1 to #4) is relation with regard to shifts between the respective phases of the data signals of the plurality of channels. For example, the phase relation between the data signals of the plurality of channels is a relation as to how many phases of the respective phases of the data signals of the plurality of channels are the same. Alternatively, the phase relation between the data signals of the plurality of channels may be a relation as to which phases of the respective phases of the data signals of the plurality of channels are the same. Alternatively, the phase relation between the data signals of the plurality of channels may be, for example, the direction and amount of a shift (phase difference) of the phase of the data signal of each of the other channels than one channel among the plurality of channels with respect to the phase of the data signal of the one channel among the plurality of channels.

Description will first be made of the transmitting unit 110 (#1) among the transmitting units 110 (#1 to #4). The transmitting unit 110 (#1) generates a driving signal for driving the light emitting element 121 based on the data signal of the channel #1 which data signal is input to the transmitting circuit 110a. The transmitting unit 110 (#1), for example, includes a transmission line loss compensating circuit 111 (#1), a CDR circuit 112 (#1), a 0/1 determining circuit 113 (#1), a variable phase shifter 114 (#1), and an output driver 115 (#1). CDR is an abbreviation of Clock Data Recovery.

The transmission line loss compensating circuit 111 (#1) is an amplifier circuit that compensates for a transmission line loss in the data signal of the channel #1 which data signal is input to the transmitting unit 110 (#1) by amplifying the data signal. The transmission line loss is, for example, a loss (attenuation) in the data signal, the loss (attenuation) occurring in a transmission line between a circuit transmitting the data signal to the transmitting circuit 110a (computer 31 illustrated in FIG. 20 to be described later as an example) and the transmitting circuit 110a. The transmission line loss compensating circuit 111 (#1) outputs the data signal in which the transmission line loss is compensated for to the CDR circuit 112 (#1) and the 0/1 determining circuit 113 (#1).

The CDR circuit 112 (#1) reproduces a clock from the data signal output from the transmission line loss compensating circuit 111 (#1), and outputs the reproduced clock to the 0/1 determining circuit 113 and the phase comparator 116. The CDR circuit 112 (#1) may be circuits of various systems such as a phase locked system using a PLL, a phase interpolation system using a phase interpolating circuit (interpolator), and the like. PLL is an abbreviation of Phase Locked Loop (phase locked circuit).

In the example illustrated in FIG. 1, the CDR circuit 112 (#1) is a circuit of a phase locked system using a PLL. The CDR circuit 112 (#1) includes a phase detector 112a (#1), an averaging circuit 112b (#1), and a VCO 112c (#1). VCO is an abbreviation of Voltage Controlled Oscillator.

The phase detector 112a (#1) detects a phase difference between the data signal input to the CDR circuit 112 (#1) and the clock signal fed back from the VCO 112c (#1), and outputs a voltage signal indicating the detected phase difference to the averaging circuit 112b (#1). The phase detector 112a (#1) may, for example, be implemented by a circuit of an exclusive OR, a charge pump, or the like.

The averaging circuit 112b (#1) temporally averages the voltage signal output from the phase detector 112a (#1), and outputs the temporally averaged voltage signal as a control voltage to the VCO 112c (#1). The VCO 112c (#1) may, for example, be implemented by an LPF or the like. LPF is an abbreviation of Low Pass Filter.

The VCO 112c (#1) oscillates the clock signal of a frequency corresponding to the control voltage output from the averaging circuit 112b (#1), and outputs the oscillated clock signal as a reproduced clock to the 0/1 determining circuit 113 (#1) and the phase comparator 116. The VCO 112c (#1) also feeds back the oscillated clock signal to the phase detector 112a (#1). Various kinds of VCOs such as a QVCO and the like may be used as the VCO 112c (#1). QVCO is an abbreviation of a Quadrature Voltage Controlled Oscillator (voltage-controlled oscillator).

The 0/1 determining circuit 113 (#1) determines the value (zero or one) of the data signal output from the transmission line loss compensating circuit 111 (#1) in timing of an edge (a rising edge or a falling edge) of the reproduced clock output from the CDR circuit 112 (#1). The 0/1 determining circuit 113 (#1) then outputs, to the variable phase shifter 114 (#1), a result of the determination as a data signal identified and reproduced from the data signal input to the transmitting unit 110 (#1). The 0/1 determining circuit 113 (#1) may, for example, be implemented by a flip-flop.

The variable phase shifter 114 (#1) shifts the phase of the data signal output from the 0/1 determining circuit 113 (#1) based on a control signal output from the phase shifter control circuit 117. The variable phase shifter 114 (#1) then outputs the phase-shifted data signal to the output driver 115 (#1). A configuration of the variable phase shifter 114 (#1) will be described later (see FIG. 12, for example).

The output driver 115 (#1) generates a driving signal for the light emitting element 121 based on the data signal output from the variable phase shifter 114 (#1). The output driver 115 (#1) outputs the generated driving signal to the light emitting element 121.

The transmitting unit 110 (#2) generates a driving signal for driving the light emitting element 122 based on the data signal of the channel #2 which data signal is input to the transmitting circuit 110a. The transmitting unit 110 (#2), for example, includes a transmission line loss compensating circuit 111 (#2), a CDR circuit 112 (#2), a 0/1 determining circuit 113 (#2), a variable phase shifter 114 (#2), and an output driver 115 (#2).

These configurations of the transmitting unit 110 (#2) are respectively similar to the transmission line loss compensating circuit 111 (#1), the CDR circuit 112 (#1), the 0/1 determining circuit 113 (#1), the variable phase shifter 114 (#1), and the output driver 115 (#1) of the transmitting unit 110 (#1) described above. However, the transmission line loss compensating circuit 111 (#2) amplifies the data signal of the channel #2 which data signal is input to the transmitting unit 110 (#2). In addition, the output driver 115 (#2) outputs a generated driving signal to the light emitting element 122.

The transmitting unit 110 (#3) generates a driving signal for driving the light emitting element 123 based on the data signal of the channel #3 which data signal is input to the transmitting circuit 110a. The transmitting unit 110 (#3), for example, includes a transmission line loss compensating circuit 111 (#3), a CDR circuit 112 (#3), a 0/1 determining circuit 113 (#3), a variable phase shifter 114 (#3), and an output driver 115 (#3).

These configurations of the transmitting unit 110 (#3) are respectively similar to the transmission line loss compensating circuit 111 (#1), the CDR circuit 112 (#1), the 0/1 determining circuit 113 (#1), the variable phase shifter 114 (#1), and the output driver 115 (#1) of the transmitting unit 110 (#1) described above. However, the transmission line loss compensating circuit 111 (#3) amplifies the data signal of the channel #3 which data signal is input to the transmitting unit 110 (#3). In addition, the output driver 115 (#3) outputs a generated driving signal to the light emitting element 123.

The transmitting unit 110 (#4) generates a driving signal for driving the light emitting element 124 based on the data signal of the channel #4 which data signal is input to the transmitting circuit 110a. The transmitting unit 110 (#4), for example, includes a transmission line loss compensating circuit 111 (#4), a CDR circuit 112 (#4), a 0/1 determining circuit 113 (#4), a variable phase shifter 114 (#4), and an output driver 115 (#4).

These configurations of the transmitting unit 110 (#4) are respectively similar to the transmission line loss compensating circuit 111 (#1), the CDR circuit 112 (#1), the 0/1 determining circuit 113 (#1), the variable phase shifter 114 (#1), and the output driver 115 (#1) of the transmitting unit 110 (#1) described above. However, the transmission line loss compensating circuit 111 (#4) amplifies the data signal of the channel #4 which data signal is input to the transmitting unit 110 (#4). In addition, the output driver 115 (#4) outputs a generated driving signal to the light emitting element 124.

The phase comparator 116 is supplied with the reproduced clocks output from the CDR circuits 112 (#1 to #4) of the transmitting units 110 (#1 to #4), respectively. The phase comparator 116 detects phase differences (phase relation) between the respective data signals of the channels #1 to #4 which data signals are input to the transmitting circuit 110a, by comparing the phases of the respective input reproduced clocks with each other. The phase comparator 116 outputs a result of the detection to the phase shifter control circuit 117. A configuration of the phase comparator 116 will be described later (see FIG. 3, for example).

The phase shifter control circuit 117 is a logical circuit that performs processing of controlling shifts in the phases of the data signals in the variable phase shifters 114 (#1 to #4) of the transmitting units 110 (#1 to #4), respectively, based on the phase difference detection result output from the phase comparator 116. This control is performed based on control signals output to the variable phase shifters 114 (#1 to #4) by the phase shifter control circuit 117. The processing of the phase shifter control circuit 117 will be described later (see FIG. 13 and FIG. 14, for example).

The phase comparator 116 and the phase shifter control circuit 117 may, for example, be implemented by cooperative operation of a processor and a memory included in an integrated circuit implementing the transmitting circuit 110a.

The light emitting elements 121 to 124 are arranged in order of the light emitting element 121, the light emitting element 122, the light emitting element 123, and the light emitting element 124 so as to correspond to the channels #1 to #4, respectively. The light emitting element 121 generates an optical signal corresponding to the driving signal of the channel #1 which driving signal is output from the transmitting unit 110 (#1), and emits the generated optical signal to an opposite device (second optical transmission device 2030 illustrated in FIG. 20 as an example) of the optical transmitting device 100. Similarly, the light emitting elements 122 to 124 generate optical signals corresponding to the driving signals of the channels #2 to #4 which driving signals are output from the transmitting units 110 (#2 to #4), respectively, and emit the generated optical signals to the opposite device of the optical transmitting device 100.

The respective optical signals emitted from the light emitting elements 121 to 124 are transmitted via an optical transmission line (for example, an optical fiber) between the optical transmitting device 100 and the opposite device, and are received by the opposite device. The light emitting elements 121 to 124 may be implemented by various kinds of laser diodes such as a VCSEL and the like. VCSEL is an abbreviation of Vertical Cavity Surface Emitting Laser.

The multiple-channel optical transmitting device 100 is, for example, desired to achieve high density at a pitch of 250 [μm]. The transmitting units 110 (#1 to #4) are arranged at this pitch, as an example. Hence, because of the short distances between the transmitting units 110 (#1 to #4), crosstalk between channels occurs in parts consuming large currents, the parts being the output drivers 115 (#1 to #4) or the like, for example.

Data signals 11 to 14 illustrated in FIG. 1 are driving signals output from the transmitting units 110 (#1 to #4) to the light emitting elements 121 to 124, respectively, in a case where it is assumed that the phase control of the phase shifter control circuit 117 described above is not performed. In the example illustrated in FIG. 1, among the data signals 11 to 14, the data signals 11, 13, and 14 rise at a same time (t), and the data signal 12 rises at a time (t) later than that of the data signals 11, 13, and 14. For example, among the data signals 11 to 14, the data signals 11, 13, and 14 have the same phase, while the data signal 12 is shifted in phase with respect to the data signals 11, 13, and 14.

The waveform of the data signal 12 in FIG. 1 in a case where there are assumed to be no effects of crosstalk is indicated by a dotted line. The waveform of the data signal 12 in FIG. 1 in a case where there are effects of crosstalk is indicated by a solid line. As illustrated in FIG. 1, in the data signal 12, a crosstalk component caused by rising edges of the data signals 11, 13, and 14 occurs at a part having a value of zero before a rising edge. In addition, in the data signal 12, a crosstalk component caused by falling edges of the data signals 11, 13, and 14 occurs at a part having a value of one after the rising edge.

Therefore, the waveform of the data signal 12 output to the light emitting element 122 is greatly distorted locally, and the waveform of the optical signal emitted from the light emitting element 122 is also greatly distorted locally. The receiving side (opposite device) therefore erroneously determines a data signal of zero as one, or erroneously determines a data signal of one as zero, so that transmission quality is degraded.

Such crosstalk between channels tends to occur particularly in the output drivers 115 (#1 to #4) consuming relatively large currents. For example, a signal noise occurring in the output driver 115 of a certain channel distorts the signal waveform of the data signal of another channel.

Crosstalk between channels occurs when a signal waveform makes a transition from zero to one (or from one to zero). When the signal phases of all of the channels giving the crosstalk (channels #1, #3, and #4 in the example illustrated in FIG. 1) are the same, the signal of the channel receiving the crosstalk (channel #2 in the example illustrated in FIG. 1) is distorted most.

Data signals 21 to 24 illustrated in FIG. 1 are driving signals output from the transmitting units 110 (#1 to #4) to the light emitting elements 121 to 124, respectively, in a case where the phase control of the phase shifter control circuit 117 described above is performed. In the example illustrated in FIG. 1, the phase shifter control circuit 117 controls the variable phase shifters 114 (#1 to #4) such that the phases of the data signals 21 to 24 are shifted from each other.

The waveform of the data signal 22 in FIG. 1 in a case where there are assumed to be no effects of crosstalk is indicated by a dotted line. The waveform of the data signal 22 in FIG. 1 in a case where there are effects of crosstalk is indicated by a solid line. An examination of crosstalks into the data signal 22 by the data signals 21, 23, and 24 indicates that the crosstalks into the data signal 22 by the data signals 21, 23, and 24 are temporally distributed because the phases of the data signals 21, 23, and 24 are shifted from each other.

Therefore, the local distortion of the waveform of the data signal 12 output the light emitting element 122 is reduced, and the local distortion of the waveform of the optical signal emitted from the light emitting element 122 is reduced.

Therefore, erroneous determinations of zero and one on the receiving side (opposite device) do not occur easily, so that transmission quality is improved. The optical transmitting device 100 may thus reduce crosstalk between channels by intentionally shifting data edges (a rising edge and a falling edge) of each channel.

(Data Signal and Reproduced Clock According to First Embodiment)

Figure 2:
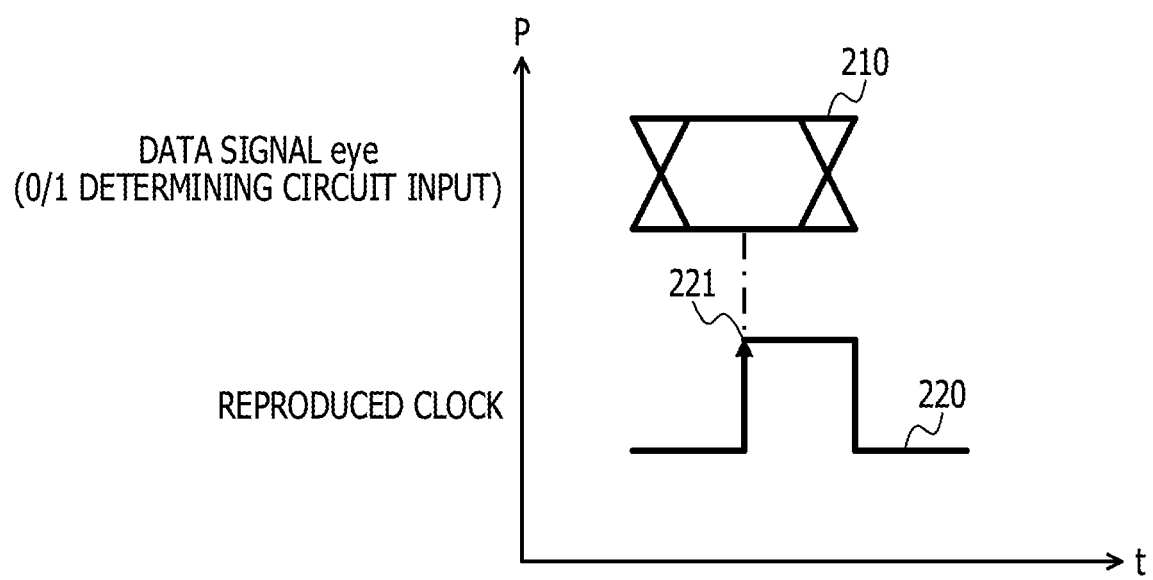
FIG. 2 is a diagram illustrating an example of a data signal and a reproduced clock according to the first embodiment.

FIG. 2 is a diagram illustrating an example of a data signal and a reproduced clock according to the first embodiment. In FIG. 2, an axis of abscissas indicates time (t), and an axis of ordinates indicates signal strength (P). A data signal 210 illustrated in FIG. 2, for example, represents, by an eye pattern (data signal eye), the data signal (0/1 determining circuit input) that is input to the transmitting unit 110 (#1) and whose loss is compensated for by the transmission line loss compensating circuit 111 (#1). A reproduced clock 220 illustrated in FIG. 2 is the clock signal reproduced from the data signal 210 by the CDR circuit 112 (#1).

As illustrated in FIG. 2, the CDR circuit 112 (#1) generates the reproduced clock 220 whose rising edge 221 occurs at the center of an eye of the data signal 210, for example, based on the data signal 210. Thus, the 0/1 determining circuit 113 (#1) may make determinations of zero and one at the center of the eye of the data signal 210 by referring to the timing of the rising edge 221 of the reproduced clock 220.

While the data signal 210 and the reproduced clock 220 of the channel #1 have been described, a similar description applies also to the data signals 210 and the reproduced clocks 220 of the channel #2, the channel #3, and the channel #4. The phase comparator 116 illustrated in FIG. 1 may detect phase differences between the respective data signals of the channels #1 to #4 by comparing the phases (for example, timings of the rising edges 221) of the reproduced clocks 220 of the channels #1 to #4 with each other.

(Phase Comparator According to First Embodiment)

Figure 3:
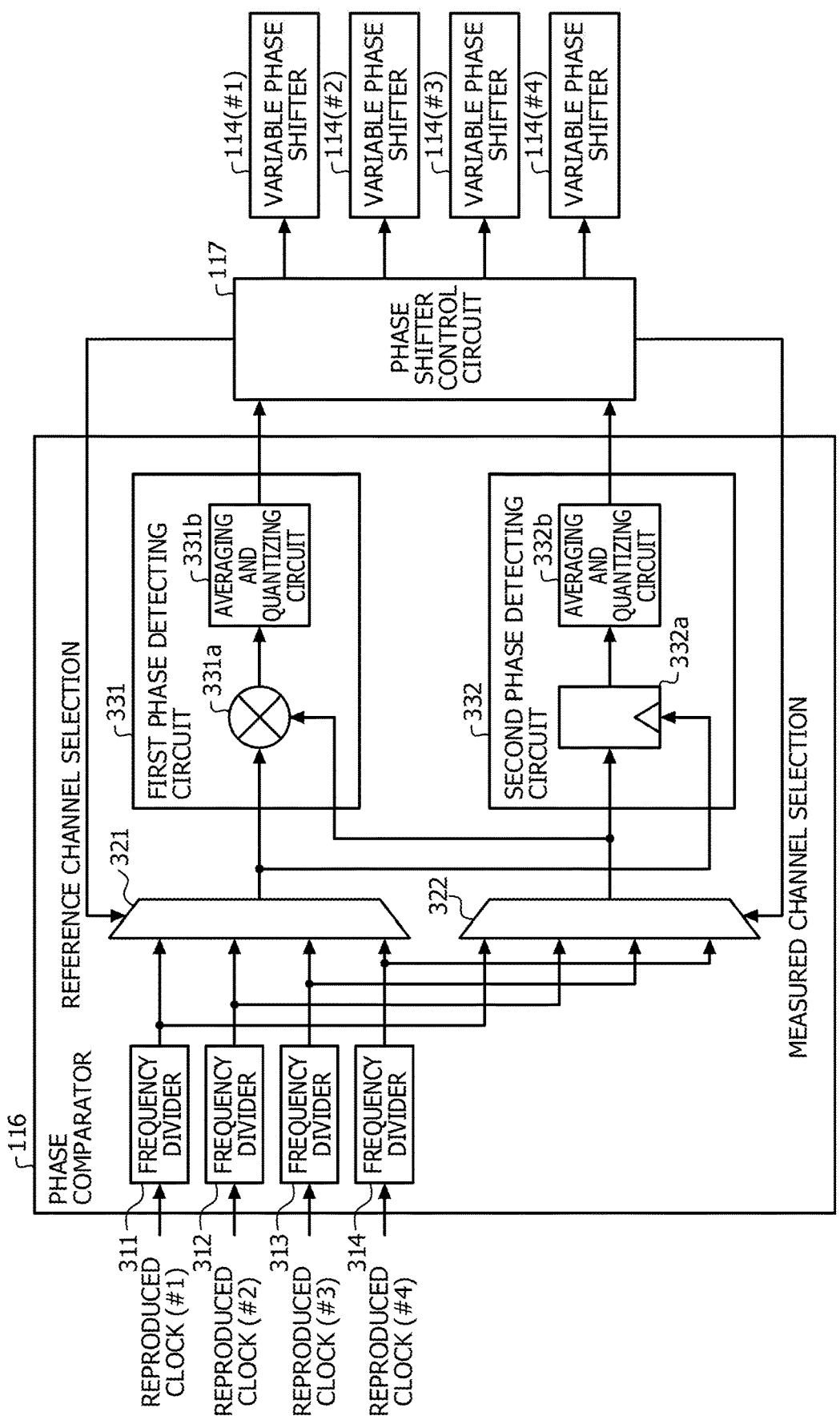
FIG. 3 is a diagram illustrating an example of a phase comparator according to the first embodiment.

FIG. 3 is a diagram illustrating an example of a phase comparator according to the first embodiment. As illustrated in FIG. 3, for example, the phase comparator 116 illustrated in FIG. 1 includes frequency dividers 311 to 314, a reference channel selector 321, a measured channel selector 322, a first phase detecting circuit 331, and a second phase detecting circuit 332.

The frequency divider 311 frequency-divides the reproduced clock output from the CDR circuit 112 (#1) of the transmitting unit 110 (#1) (for example, ½ frequency division), and outputs the frequency-divided reproduced clock to the reference channel selector 321 and the measured channel selector 322. Similarly, the frequency dividers 312 to 314 respectively frequency-divide the reproduced clocks output from the CDR circuits 112 (#2 to #4) of the transmitting units 110 (#2 to #4), and output the frequency-divided reproduced clocks to the reference channel selector 321 and the measured channel selector 322. The frequency division of the reproduced clocks by the frequency dividers 311 to 314 will be described later (see FIG. 4, for example).

The reference channel selector 321 selects one of the respective reproduced clocks output from the frequency dividers 311 to 314 as the reproduced clock of a reference channel, and outputs the selected reproduced clock to the first phase detecting circuit 331 and the second phase detecting circuit 332. The reference channel is a channel serving as a reference in phase comparison between the channels. The selection of the reproduced clock (reference channel selection) by the reference channel selector 321 is made according to a control signal from the phase shifter control circuit 117, for example.

The measured channel selector 322 selects one of the respective reproduced clocks output from the frequency dividers 311 to 314 as the reproduced clock of a measured channel, and outputs the selected reproduced clock to the first phase detecting circuit 331 and the second phase detecting circuit 332. The measured channel is a channel to be compared with the reference channel in phase comparison between the channels. The selection of the reproduced clock (measured channel selection) by the measured channel selector 322 is made according to a control signal from the phase shifter control circuit 117, for example.

The first phase detecting circuit 331 detects a phase difference between the reproduced clock of the reference channel which reproduced clock is output from the reference channel selector 321 and the reproduced clock of the measured channel which reproduced clock is output from the measured channel selector 322. The phase difference detected by the first phase detecting circuit 331 will be described later (see FIG. 5 and FIG. 6, for example). The first phase detecting circuit 331 outputs a result of the detection to the phase shifter control circuit 117. The first phase detecting circuit 331, for example, includes a multiplier 331a and an averaging and quantizing circuit 331b.

The multiplier 331a multiplies together the reproduced clock of the reference channel which reproduced clock is output from the reference channel selector 321 and the reproduced clock of the measured channel which reproduced clock is output from the measured channel selector 322. The multiplier 331a outputs a signal obtained by the multiplication to the averaging and quantizing circuit 331b. The averaging and quantizing circuit 331b averages the signal output from the multiplier 331a, and quantizes the averaged signal. The averaging and quantizing circuit 331b then outputs the quantized value as a result of detection by the first phase detecting circuit 331 to the phase shifter control circuit 117.

The second phase detecting circuit 332 detects a phase difference between the reproduced clock of the reference channel which reproduced clock is output from the reference channel selector 321 and the reproduced clock of the measured channel which reproduced clock is output from the measured channel selector 322. The phase difference detected by the second phase detecting circuit 332 will be described later (see FIG. 7 and FIG. 8, for example). The second phase detecting circuit 332 outputs a result of the detection to the phase shifter control circuit 117. The second phase detecting circuit 332, for example, includes a flip-flop 332a and an averaging and quantizing circuit 332b.

The flip-flop 332a retains the value of the reproduced clock of the measured channel which reproduced clock is output from the measured channel selector 322 in timing of a rising edge of the reproduced clock of the reference channel which reproduced clock is output from the reference channel selector 321. The flip-flop 332a then outputs the retained value to the averaging and quantizing circuit 332b. The averaging and quantizing circuit 332b averages the signal output from the flip-flop 332a, and quantizes the averaged signal. The averaging and quantizing circuit 332b then outputs the quantized value as a result of detection by the second phase detecting circuit 332 to the phase shifter control circuit 117.

Incidentally, as in an example illustrated in FIG. 13 and FIG. 14 to be described later, for example, the reference channel selector 321 may be omitted in a case where one channel (for example, the channel #1) is fixed as the reference channel among the channels #1 to #4. In this case, the reproduced clock output from frequency divider corresponding to the reference channel among the frequency dividers 311 to 314 is input as the reproduced clock of the reference channel to the first phase detecting circuit 331 and the second phase detecting circuit 332.

(Frequency Division of Reproduced Clock by Frequency Divider According to First Embodiment)

Figure 4:
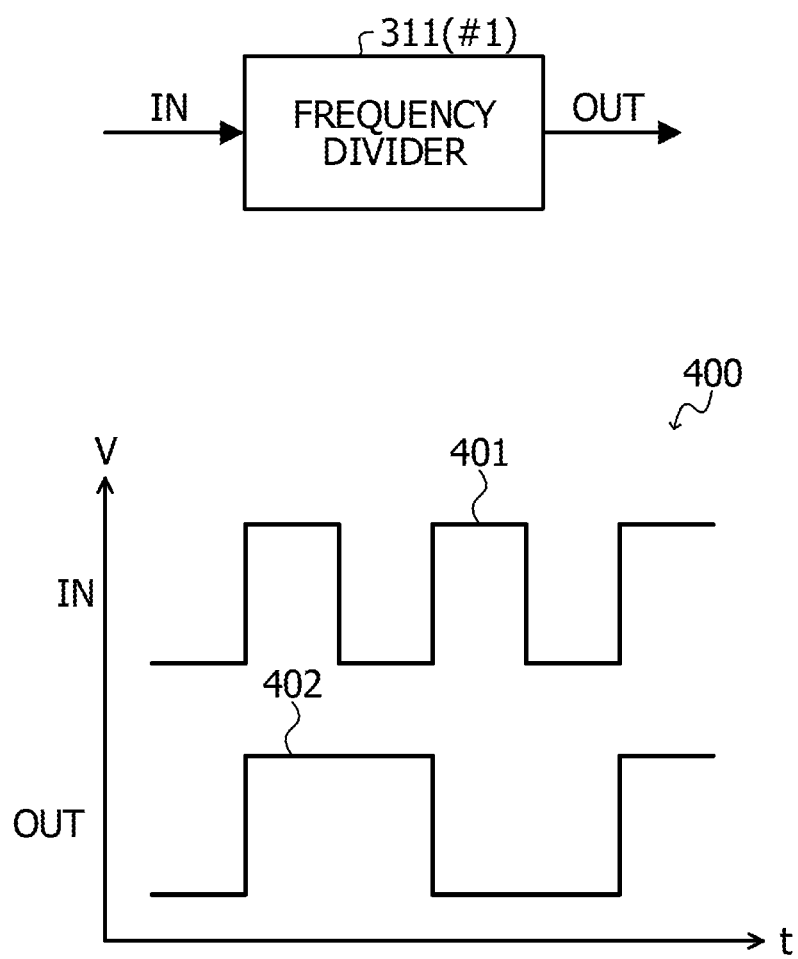
FIG. 4 is a diagram illustrating an example of frequency division of a reproduced clock by a frequency divider according to the first embodiment.

FIG. 4 is a diagram illustrating an example of frequency division of a reproduced clock by a frequency divider according to the first embodiment. In a graph 400 of FIG. 4, an axis of abscissas indicates time (t), and an axis of ordinates indicates the strength of reproduced clocks. A reproduced clock 401 (in) is the reproduced clock input to the frequency divider 311 (#1). A reproduced clock 402 (out) is the reproduced clock output from the frequency divider 311 (#1).

As illustrated in FIG. 4, the frequency divider 311 (#1) outputs the reproduced clock 402 obtained by reducing the frequency of the input reproduced clock 401 to ½. While the frequency division of the frequency divider 311 (#1) has been described, a similar description applies also to the frequency division of the frequency dividers 311 (#2 to #4).

Even when the operating speed of circuits in stages subsequent to the frequency dividers 311 (#1 to #4) is lower than the speed of the data signals, the frequency division (decrease in speed) of the reproduced clocks by the frequency dividers 311 (#1 to #4) enables these circuits to perform processing. The circuits in the stages subsequent to the frequency dividers 311 (#1 to #4), for example, include the reference channel selector 321, the measured channel selector 322, the first phase detecting circuit 331, the second phase detecting circuit 332, the phase shifter control circuit 117, and the like.

(Detection of First Phase Detecting Circuit According to First Embodiment)

FIG. 5 and FIG. 6 are diagrams illustrating an example of detection of a first phase detecting circuit according to the first embodiment. In graphs 501 to 504 illustrated in FIG. 5, an axis of abscissas indicates time (t), and an axis of ordinates indicates the strength (v) of reproduced clocks. A reproduced clock 510 is the reproduced clock of the reference channel which reproduced clock is output from the reference channel selector 321 to the first phase detecting circuit 331. A reproduced clock 520 is the reproduced clock of the measured channel which reproduced clock is output from the measured channel selector 322 to the first phase detecting circuit 331.

A multiplier output 530 is a signal output by the multiplier 331a of the first phase detecting circuit 331, for example, a result of multiplication of the reproduced clocks 510 and 520. A detection result 540 is a quantized value output by the averaging and quantizing circuit 331b of the first phase detecting circuit 331, for example, a detection result output from the first phase detecting circuit 331 to the phase shifter control circuit 117.

In the example illustrated in FIG. 5, suppose that the averaging and quantizing circuit 331b performs quantization into three values (−1, 0, and +1) according to the pulse width of the signal output from the multiplier 331a. However, the resolution of quantization in the averaging and quantizing circuit 331b is this described above, and besides, the resolution of quantization in the averaging and quantizing circuit 331b may be made higher, for example.

In the example of the graph 501, the reproduced clock of the reference channel and the reproduced clock of the measured channel have a same phase. In this case, the detection result 540 is +1. In the example of the graph 502, the phase of the reproduced clock of the measured channel is delayed by 90 [°] with respect to the phase of the reproduced clock of the reference channel. In this case, the detection result 540 is 0.

In the example of the graph 503, the phase of the reproduced clock of the measured channel is delayed by 180 [°] with respect to the phase of the reproduced clock of the reference channel. In this case, the detection result 540 is −1. In the example of the graph 504, the phase of the reproduced clock of the measured channel is delayed by 270 [°] with respect to the phase of the reproduced clock of the reference channel. In this case, the detection result 540 is 0.

Thus, there is relation as in a table 600 illustrated in FIG. 6 between the amounts of phase delay [°] of the reproduced clock of the measured channel with respect to the reproduced clock of the reference channel and the detection results of the first phase detecting circuit 331.

(Detection of Second Phase Detecting Circuit According to First Embodiment)

Figure 7:
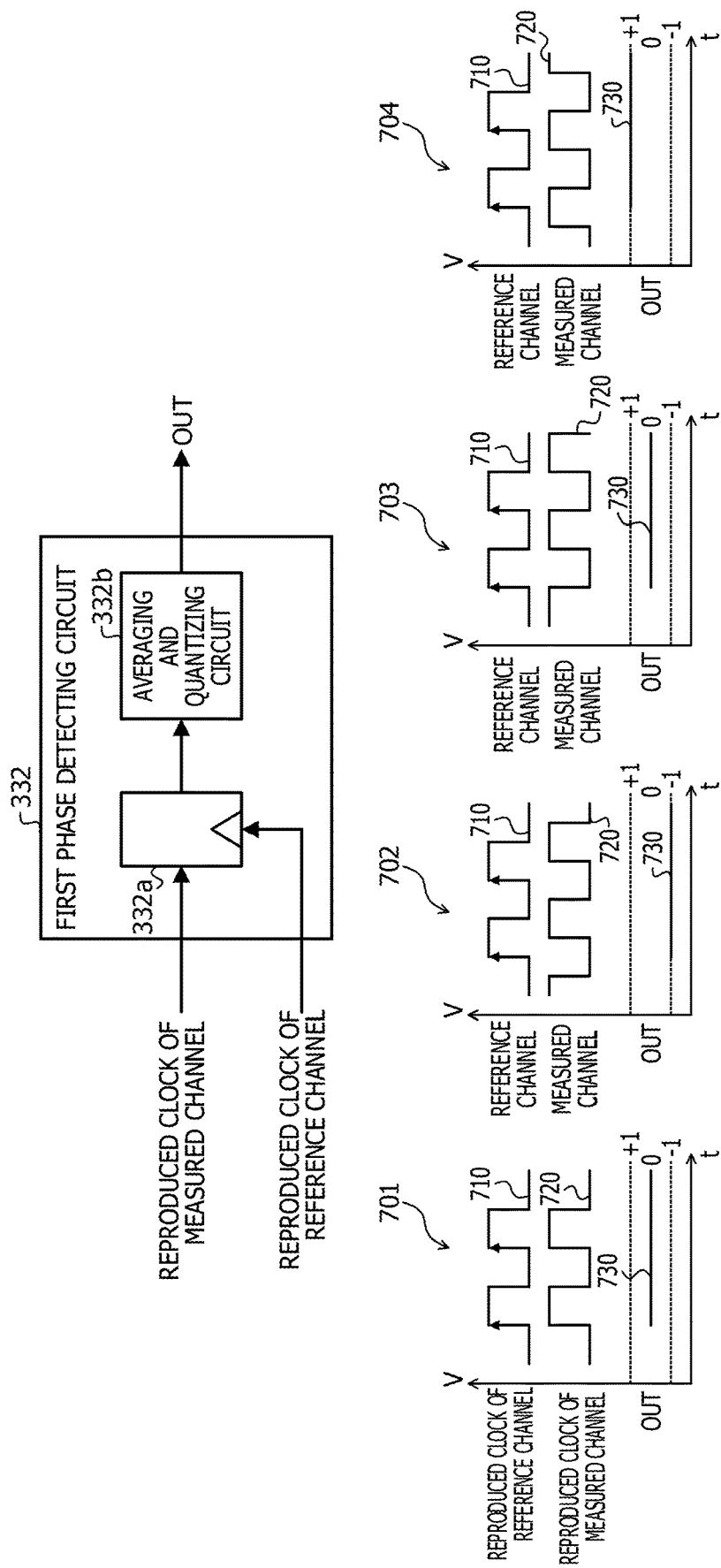
FIG. 7 is a diagram (1) illustrating an example of detection of a second phase detecting circuit according to the first embodiment.

FIG. 7 and FIG. 8 are diagrams illustrating an example of detection of a second phase detecting circuit according to the first embodiment. In graphs 701 to 704 illustrated in FIG. 7, an axis of abscissas indicates time (t), and an axis of ordinates indicates the strength (v) of reproduced clocks. A reproduced clock 710 is the reproduced clock of the reference channel which reproduced clock is output from the reference channel selector 321 to the second phase detecting circuit 332. A reproduced clock 720 is the reproduced clock of the measured channel which reproduced clock is output from the measured channel selector 322 to the second phase detecting circuit 332. A detection result 730 is a quantized value output by the averaging and quantizing circuit 332b of the second phase detecting circuit 332, for example, a detection result output from the second phase detecting circuit 332 to the phase shifter control circuit 117.

In the example illustrated in FIG. 7, suppose that the averaging and quantizing circuit 332b performs quantization into three values (−1, 0, and +1) according to an average value of the signal output from the flip-flop 332a. However, the resolution of quantization in the averaging and quantizing circuit 332b is this described above, and besides, the resolution of quantization in the averaging and quantizing circuit 332b may be made higher, for example.

In the example of the graph 701, the reproduced clock of the reference channel and the reproduced clock of the measured channel have a same phase. In this case, the detection result 730 is 0. In the example of the graph 702, the phase of the reproduced clock of the measured channel is delayed by 90 [°] with respect to the phase of the reproduced clock of the reference channel. In this case, the detection result 730 is −1.

In the example of the graph 703, the phase of the reproduced clock of the measured channel is delayed by 180 [°] with respect to the phase of the reproduced clock of the reference channel. In this case, the detection result 730 is 0. In the example of the graph 704, the phase of the reproduced clock of the measured channel is delayed by 270 [°] with respect to the phase of the reproduced clock of the reference channel. In this case, the detection result 730 is +1.

Thus, there is relation as in a table 800 illustrated in FIG. 8 between the amounts of phase delay [°] of the reproduced clock of the measured channel with respect to the reproduced clock of the reference channel and the detection results of the second phase detecting circuit 332.

(Relation Between Respective Detection Results of First and Second Phase Detecting Circuits and Phase Differences Between Reproduced Clocks According to First Embodiment)

Figure 9:
FIG. 9 is a diagram illustrating an example of relation between respective detection results of first and second phase detecting circuits and phase differences between reproduced clocks according to the first embodiment.

FIG. 9 is a diagram illustrating an example of relation between respective detection results of first and second phase detecting circuits and phase differences between reproduced clocks according to the first embodiment. There is relation as in a table 900 illustrated in FIG. 9 between the amounts of phase delay [°] of the reproduced clock of the measured channel with respect to the reproduced clock of the reference channel and combinations between the respective detection results of the first phase detecting circuit 331 and the second phase detecting circuit 332.

As illustrated in the table 900, four amounts of phase delay (phase differences) of the reproduced clock of the measured channel with respect to the reproduced clock of the reference channel may be determined based on at least one of the respective detection results of the first phase detecting circuit 331 and the second phase detecting circuit 332.

For example, when the detection result of the first phase detecting circuit 331 is +1, it may be determined that the amount of phase delay of the reproduced clock of the measured channel with respect to the reproduced clock of the reference channel is 0 [°] (same phase). In addition, when the detection result of the first phase detecting circuit 331 is 0, and the detection result of the second phase detecting circuit 332 is −1, it may be determined that the amount of phase delay of the reproduced clock of the measured channel with respect to the reproduced clock of the reference channel is 90 [°].

In addition, when the detection result of the first phase detecting circuit 331 is −1, it may be determined that the amount of phase delay of the reproduced clock of the measured channel with respect to the reproduced clock of the reference channel is 180 [°]. In addition, when the detection result of the first phase detecting circuit 331 is 0, and the detection result of the second phase detecting circuit 332 is +1, it may be determined that the amount of phase delay of the reproduced clock of the measured channel with respect to the reproduced clock of the reference channel is 270 [°].

(Relation Between Detection Results of High-Resolution First Phase Detecting Circuit and Phase Differences Between Reproduced Clocks According to First Embodiment)

Figure 10:
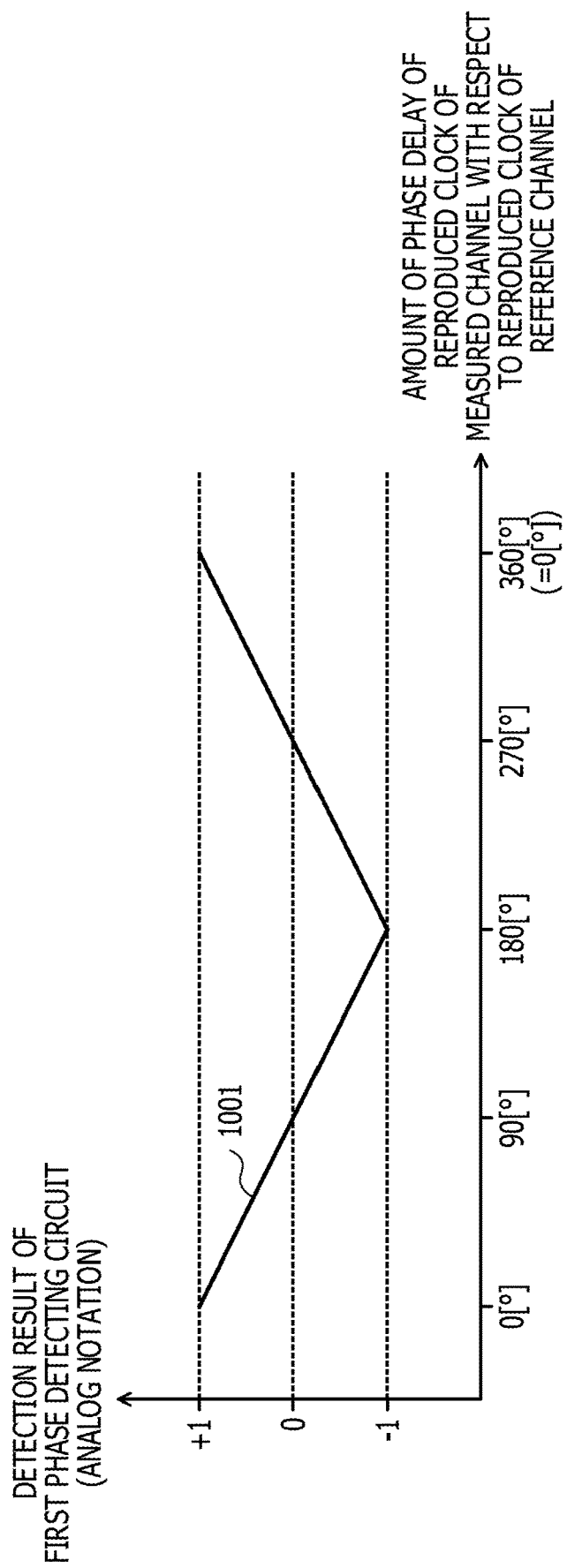
FIG. 10 is a diagram illustrating an example of relation between detection results of a first phase detecting circuit with a high resolution and phase differences between reproduced clocks according to the first embodiment.

FIG. 10 is a diagram illustrating an example of relation between detection results of a first phase detecting circuit with a high resolution and phase differences between reproduced clocks according to the first embodiment. In FIG. 10, an axis of abscissas indicates the amounts of phase delay [°] of the reproduced clock of the measured channel with respect to the reproduced clock of the reference channel, and an axis of ordinates indicates the detection results of the first phase detecting circuit 331 in analog notation. An output characteristic 1001 represents relation between the amounts of phase delay of the reproduced clock of the measured channel with respect to the reproduced clock of the reference channel and the values of the detection results output by the first phase detecting circuit 331 in a case where the resolution of the averaging and quantizing circuit 331b is made sufficiently high.

(Relation Between Detection Result of High-Resolution Second Phase Detecting Circuit and Phase Differences Between Reproduced Clocks According to First Embodiment)

Figure 11:
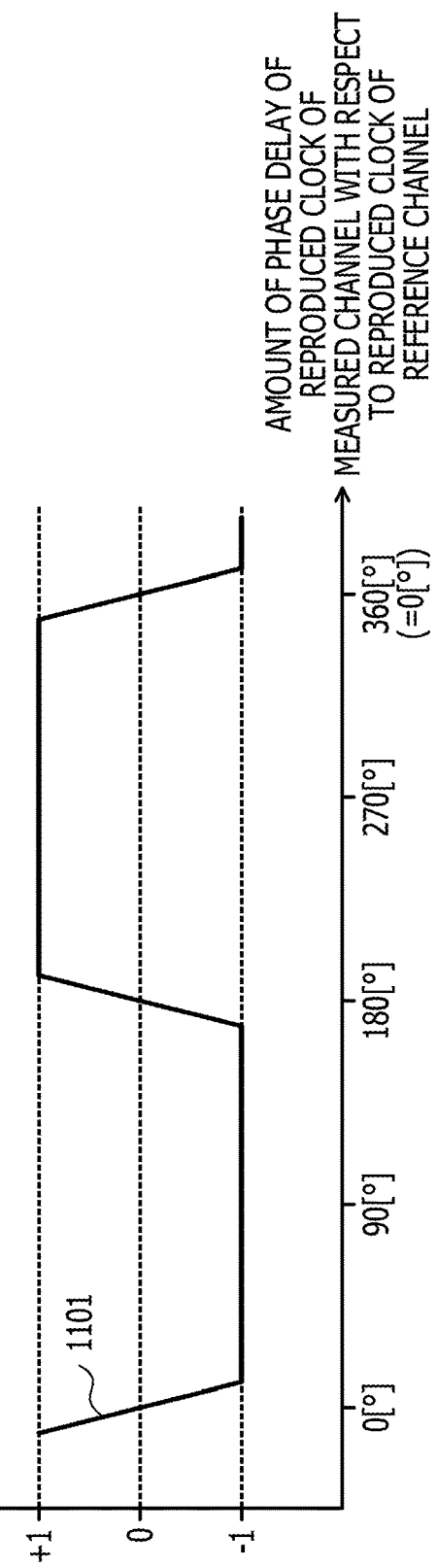
FIG. 11 is a diagram illustrating an example of relation between detection results of a second phase detecting circuit with a high resolution and phase differences between reproduced clocks according to the first embodiment.

FIG. 11 is a diagram illustrating an example of relation between detection results of a second phase detecting circuit with a high resolution and phase differences between reproduced clocks according to the first embodiment. In FIG. 11, an axis of abscissas indicates the amounts of phase delay [°] of the reproduced clock of the measured channel with respect to the reproduced clock of the reference channel, and an axis of ordinates indicates the detection results of the second phase detecting circuit 332 in analog notation. An output characteristic 1101 represents relation between the amounts of phase delay of the reproduced clock of the measured channel with respect to the reproduced clock of the reference channel and the values of the detection results output by the second phase detecting circuit 332 in a case where the resolution of the averaging and quantizing circuit 332b is made sufficiently high.

As in the examples illustrated in FIG. 10 and FIG. 11, for example, a configuration may be adopted in which the resolution of the averaging and quantizing circuits 331b and 332b is made higher, and the first phase detecting circuit 331 and the second phase detecting circuit 332 provide high-resolution detection results. It is thereby possible to detect the amounts of phase delay (phase differences) of the reproduced clock of the measured channel with respect to the reproduced clock of the reference channel with high resolution, and perform phase control between the channels by the phase shifter control circuit 117 with high accuracy.

(Variable Phase Shifter According to First Embodiment)

Figure 12:
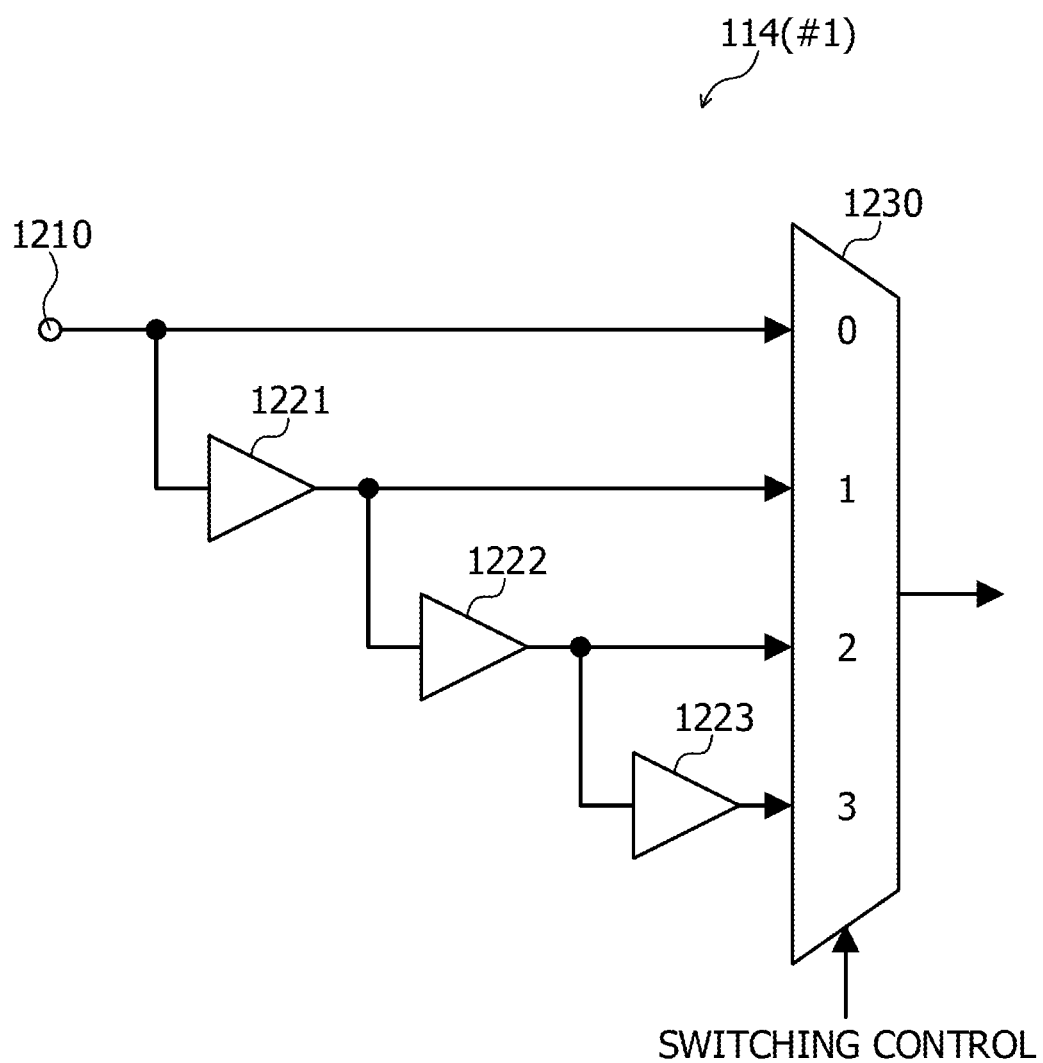
FIG. 12 is a diagram illustrating an example of a variable phase shifter according to the first embodiment.

FIG. 12 is a diagram illustrating an example of a variable phase shifter according to the first embodiment. As illustrated in FIG. 12, the variable phase shifter 114 (#1) may, for example, include an input unit 1210, buffers 1221 to 1223, and a delay amount selector 1230. The input unit 1210 outputs the data signal input to the variable phase shifter 114 (#1) to the delay amount selector 1230 and the buffer 1221.

The buffer 1221 delays the data signal output from the input unit 1210 by a given delay amount, and outputs the delayed data signal to the delay amount selector 1230 and the buffer 1222. The buffer 1222 delays the data signal output from the buffer 1221 by a given delay amount, and outputs the delayed data signal to the delay amount selector 1230 and the buffer 1223. The buffer 1223 delays the data signal output from the buffer 1222 by a given delay amount, and outputs the delayed data signal to the delay amount selector 1230.

The delay amount selector 1230 selects one of the respective data signals output from the input unit 1210 and the buffers 1221 to 1223, and outputs the selected data signal to the output driver 115 (#1). It is thereby possible to output the data signal given a delay amount corresponding to the selection of the delay amount selector 1230. The selection of the data signal (switching control) by the delay amount selector 1230 is, for example, made according to a control signal from the phase shifter control circuit 117.

Here, suppose that the delay amount of the data signal in a case where the delay amount selector 1230 selects the data signal from the input unit 1210 is "0." In addition, suppose that the delay amounts of the data signals in cases where the delay amount selector 1230 selects the data signals from the buffers 1221 to 1223 are "1" to "3," respectively.

The given delay amounts in the buffers 1221 to 1223 may be, for example, approximately ¼ of a UI (Unit Interval) as a cycle of the data signals (for example, approximately a few

[ps] to 10 [ps]). In this case, the above-described delay amounts "0" to "3" are delay amounts corresponding to 0 [°], 90 [°], 180 [°], and 270 [°], respectively.

Thus, the variable phase shifter 114 (#1) may be implemented by a buffer chain configuration for adjustment at four levels as an example. While the configuration of the variable phase shifter 114 (#1) has been described, a similar description applies also to the configurations of the variable phase shifters 114 (#2 to #4).

(Phase Detection and Control Processing of Optical Transmitting Device According to First Embodiment)

Figure 13:
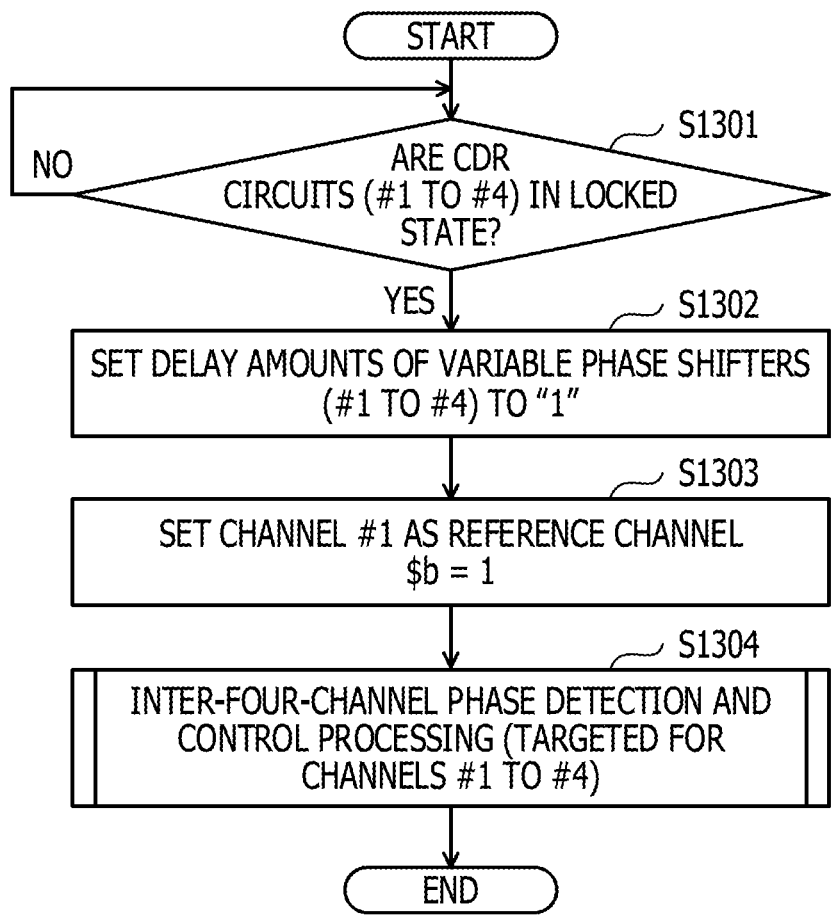
FIG. 13 is a flowchart illustrating an example of phase detection and control processing of an optical transmitting device according to the first embodiment.

FIG. 13 is a flowchart illustrating an example of phase detection and control processing of an optical transmitting device according to the first embodiment. The optical transmitting device 100 according to the first embodiment, for example, performs the phase detection and control processing illustrated in FIG. 13. The optical transmitting device 100, for example, performs the phase detection and control processing illustrated in FIG. 13 by the phase shifter control circuit 117 illustrated in FIG. 1.

First, the optical transmitting device 100 determines whether or not the CDR circuits 112 (#1 to #4) are in a locked state (step S1301), and waits until the CDR circuits 112 (#1 to #4) are set in a locked state (loop of step S1301: No). The locked state of the CDR circuit 112 (#1) is, for example, a state in which the CDR circuit 112 (#1) is generating the clock signal having a stable phase in synchronism with the data signal. The same is true for the locked states of the CDR circuits 112 (#2 to #4).

The determination of the locked state may be made by, for example, determining whether or not a sufficient time for the CDR circuits 112 (#1 to #4) to be set in the locked state has passed since a time of a start of the optical transmitting device 100. Alternatively, the determination in step S1301 may be made by the phase shifter control circuit 117 by monitoring the operation states of the CDR circuits 112 (#1 to #4) (for example, whether or not the phases of the generated clock signals are stable).

When the CDR circuits 112 (#1 to #4) are set in the locked state in step S1301 (step S1301: Yes), the optical transmitting device 100 sets the respective delay amounts of the variable phase shifters 114 (#1 to #4) to "1" (step S1302). The delay amount "1," for example, corresponds to ¼ of the UI of the data signals, as described above. Step S1302 is, for example, performed by the delay amount selector 1230 illustrated in FIG. 12 by selecting the signal from the buffer 1221 in each of the variable phase shifters 114 (#1 to #4) under control of the phase shifter control circuit 117.

In addition, the optical transmitting device 100 sets the channel #1 as the reference channel (step S1303). Step S1303 is, for example, performed by the reference channel selector 321 illustrated in FIG. 3 by selecting the signal from the frequency divider 311 corresponding to the channel #1 among the frequency dividers 311 to 314 under control of the phase shifter control circuit 117. In addition, the optical transmitting device 100 sets one indicating the channel #1 as $b, which is information stored in memory of the transmitting circuit 110a and indicates the reference channel.

Next, the optical transmitting device 100 performs inter-four-channel phase detection and control processing targeted for the channels #1 to #4 (step S1304). The optical transmitting device 100 then ends the series of processing. The inter-four-channel phase detection and control processing will be described with reference to FIG. 14.

However, the phase detection and control processing of the optical transmitting device 100 is not limited to the example illustrated in FIG. 13. For example, while description has been made of a case where the respective delay amounts of the variable phase shifters 114 (#1 to #4) are set to "1" in step S1302 in the example illustrated in FIG. 13, there is no limitation to such processing. For example, in step S1302, processing may be performed which sets the respective delay amounts of the variable phase shifters 114 (#1 to #4) to "2."

The phase detection and control processing illustrated in FIG. 13 is performed before operation of optical transmission using optical signals, for example. In this case, the optical transmitting device 100, for example, performs the phase detection and control processing illustrated in FIG. 13 in a state in which data signals for training of the four channels (random signals, fixed pattern signals, or the like) are input. In addition, when the receiving side has a tolerance to signal degradation attendant on phase shifts, for example, the phase detection and control processing illustrated in FIG. 13 may be performed during operation of optical transmission using optical signals.

(Inter-Four-Channel Phase Detection and Control Processing of Optical Transmitting Device According to First Embodiment)

Figure 14A:
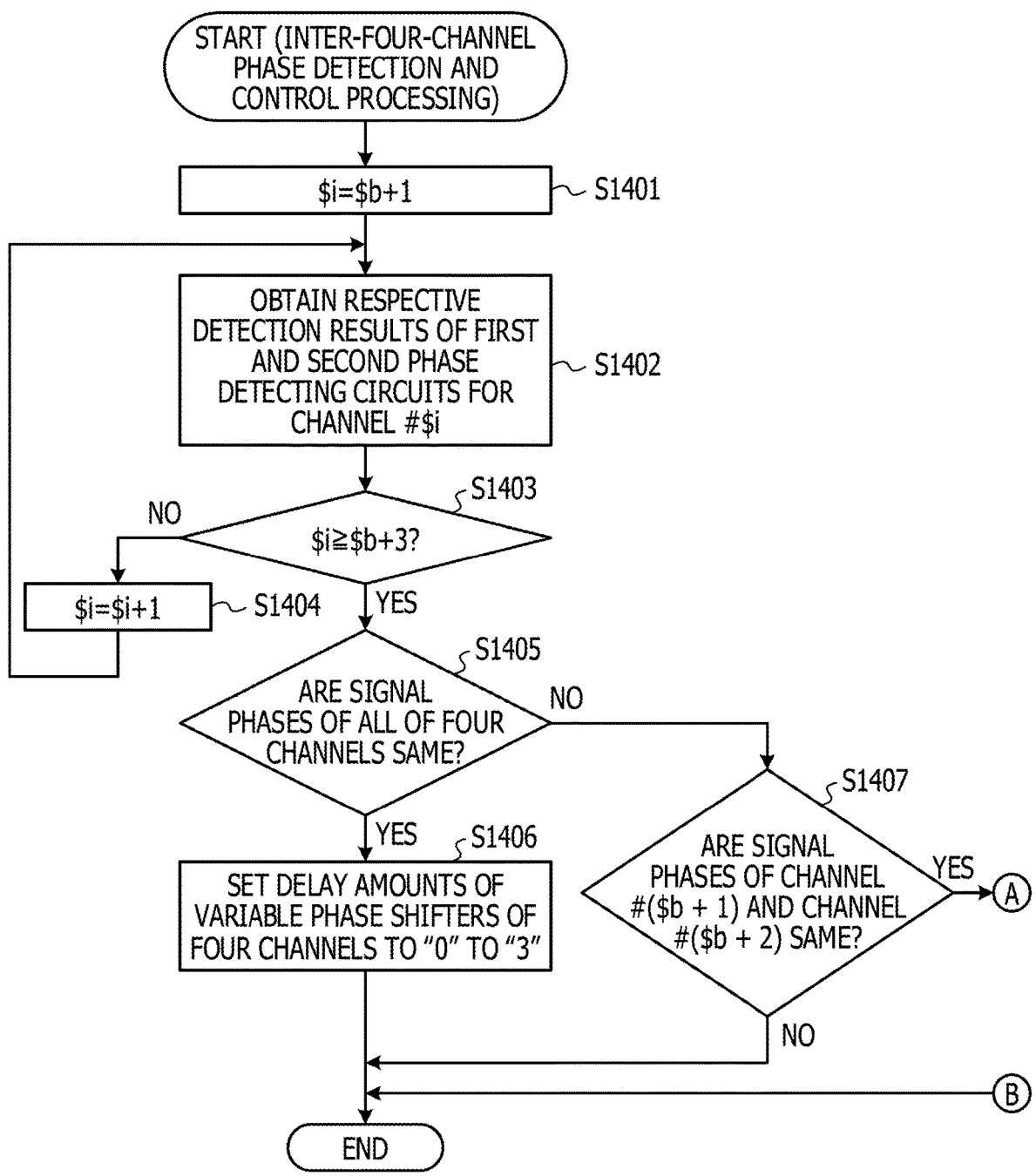
FIGS. 14A and 14B are flowcharts illustrating an example of inter-four-channel phase detection and control processing of an optical transmitting device according to the first embodiment.
Figure 14B:
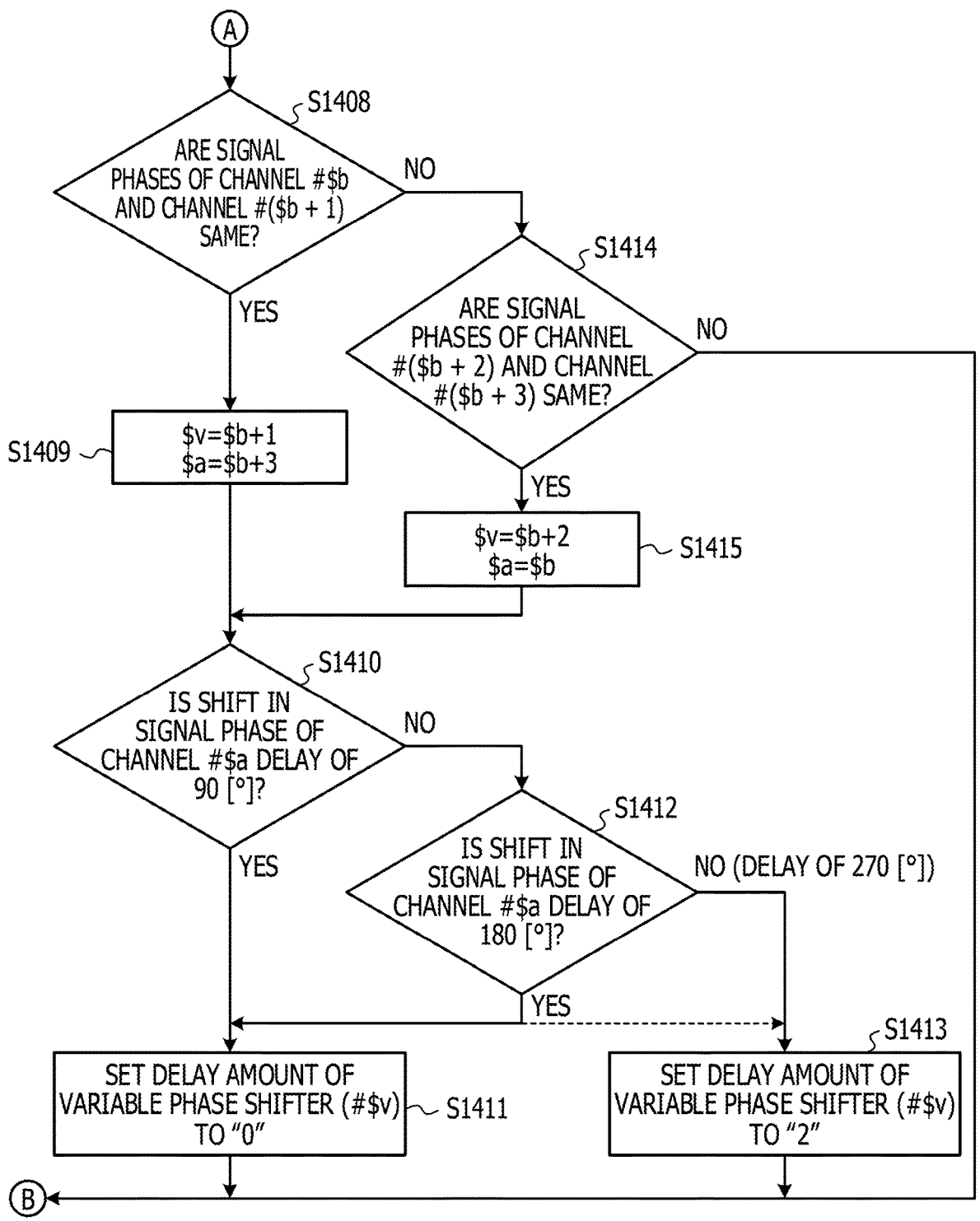

FIG. 14 is a flowchart illustrating an example of inter-four-channel phase detection and control processing of an optical transmitting device according to the first embodiment. The optical transmitting device 100 according to the first embodiment performs processing illustrated in FIG. 14, for example, as the inter-four-channel phase detection and control processing of step S1304 illustrated in FIG. 13, for example. The optical transmitting device 100, for example, performs the processing illustrated in FIG. 14 by the phase shifter control circuit 117 illustrated in FIG. 1.

Here, four channels as targets of the inter-four-channel phase detection and control processing are the following four channels: a channel #$b indicated by the present $b (information indicating the reference channel) and channels #($b+1) to #($b+3) based on the present $b.

First, based on the present $b (information indicating the reference channel), the optical transmitting device 100 sets the value of $b+1 as $i, which is an index stored in the memory of the transmitting circuit 110a and indicates a present target measured channel (step S1401).

Next, the optical transmitting device 100 obtains respective detection results of the first phase detecting circuit 331 and the second phase detecting circuit 332 for the channel #$i based on the present $i (step S1402). In step S1402, for example, the measured channel selector 322 illustrated in FIG. 3 selects a signal from the frequency divider corresponding to the channel #$i among the frequency dividers 311 to 314 under control of the phase shifter control circuit 117. Thereafter, the phase shifter control circuit 117 obtains the respective detection results for the channel #$i, the respective detection results being output from the first phase detecting circuit 331 and the second phase detecting circuit 332.

Next, the optical transmitting device 100 determines whether or not $i is $b+3 or more based on the present $b and $i (step S1403). When $i is not $b+3 or more (step S1403: No), there is a channel for which the respective detection results of the first phase detecting circuit 331 and the second phase detecting circuit 332 are not obtained yet among the three measured channels. In this case, the optical transmitting device 100 increments $i (step S1404), and then returns to step S1402.

When $i is $b+3 or more in step S1403 (step S1403: Yes), the respective detection results of the first phase detecting circuit 331 and the second phase detecting circuit 332 are already obtained for all of the three measured channels. In this case, the optical transmitting device 100 determines whether or not the signal phases of all of the four target channels are the same (step S1405).

The determination in step S1405 may, for example, be made by the phase shifter control circuit 117 by determining whether or not the detection results of the first phase detecting circuit 331 for the three measured channels, the detection results being obtained in step S1402, are all +1. When the detection results of the first phase detecting circuit 331 for the three measured channels are all +1, it may be determined that phase differences between the channels are all zero (see FIG. 9, for example), for example, that the signal phases of all of the four target channels are the same.

In step S1405, when the signal phases of all of the four target channels are the same (step S1405: Yes), the optical transmitting device 100 proceeds to step S1406. For example, the optical transmitting device 100 sets delay amounts of the variable phase shifters 114 of the four target channels to "0" to "3," respectively (step S1406). The optical transmitting device 100 then ends the series of inter-four-channel phase detection and control processing.

In step S1406, for example, the phase shifter control circuit 117 controls the variable phase shifter 114 (#1) such that the delay amount selector 1230 illustrated in FIG. 12 selects the signal from the input unit 1210. In addition, the phase shifter control circuit 117 controls the variable phase shifters 114 (#2 to #4) such that the delay amount selector 1230 illustrated in FIG. 12 selects the signals from the buffers 1221 to 1223, respectively.

When the phase of at least one channel of the four target channels is shifted with respect to the phases of the other channels in step S1405 (step S1405: No), the optical transmitting device 100 proceeds to step S1407. For example, the optical transmitting device 100 determines whether or not the signal phases of the channels #($b+1) and #($b+2), for example, two central channels among the four target channels are the same (step S1407).

The determination in step S1407 may, for example, be made by determining whether or not, between the channels #($b+1) and #($b+2), the respective detection results of the first phase detecting circuit 331 are substantially equal to each other and the respective detection results of the second phase detecting circuit 332 are substantially equal to each other.

When the signal phases of the channels #($b+1) and #($b+2) are not the same in step S1407 (step S1407: No), for example, when the signal phases of the two central channels among the four target channels are shifted from each other, there is a small effect of crosstalk between channels. In this case, the optical transmitting device 100 ends the series of inter-four-channel phase detection and control processing without performing phase control between channels.

When the signal phases of the channels #($b+1) and #($b+2) are the same in step S1407 (step S1407: Yes), for example, when the signal phases of the two central channels among the four target channels are the same, there is a large effect of crosstalk between channels. In this case, the optical transmitting device 100 determines whether or not the signal phases of the channels #$b and #($b+1), for example, the first and second channels among the four target channels are the same (step S1408).

The determination in step S1408 may, for example, be made by determining whether or not, between the channels #$b and #($b+1), the respective detection results of the first phase detecting circuit 331 are substantially equal to each other and the respective detection results of the second phase detecting circuit 332 are substantially equal to each other.

When the signal phases of the channels #$b and #($b+1) are the same in step S1408 (step S1408: Yes), the signal phases of the first to third channels among the four target channels are the same, and the signal phase of the fourth channel is shifted with respect to the signal phases of the first to third channels. In this case, the optical transmitting device 100 sets the value of $b +1 indicating the second channel as $v, which is information stored in the memory of the transmitting circuit 110a and indicates a channel whose signal phase is to be shifted (step S1409). In addition, in step S1409, the optical transmitting device 100 sets the value of $b+3 indicating the fourth channel as $a, which is information stored in the memory of the transmitting circuit 110a and indicates a channel whose signal phase is shifted from those of the other channels.

Next, the optical transmitting device 100 determines whether or not the shift in the signal phase of the channel #$a from those of the other channels is a delay of 90 [°] (step S1410). The determination in step S1410 may, for example, be made by determining whether or not the detection result of the first phase detecting circuit 331 for the channel #$a is 0 and the detection result of the second phase detecting circuit 332 for the channel #$a is −1.

When the shift in the signal phase is a delay of 90 [°] in step S1410 (step S1410: Yes), the optical transmitting device 100 proceeds to step S1411. For example, the optical transmitting device 100 sets the delay amount of the variable phase shifter 114 (#$v) of the channel #$v to "0" (step S1411). The optical transmitting device 100 then ends the series of inter-four-channel phase detection and control processing. Step S1411 advances the signal phase of the channel #$v by one step (for example, 90 [°]). In step S1411, for example, the phase shifter control circuit 117 controls the variable phase shifter 114 (#$v) such that the delay amount selector 1230 illustrated in FIG. 12 selects the signal from the input unit 1210.

When the shift in the signal phase is not a delay of 90 [°] in step S1410 (step S1410: No), the optical transmitting device 100 determines whether or not the shift in the signal phase of the channel #$a from those of the other channels is a delay of 180 [°] (step S1412). The determination in step S1412 may, for example, be made by determining whether or not the detection result of the first phase detecting circuit 331 for the channel #$a is −1.

When the shift in the signal phase is a delay of 180 [°] in step S1412 (step S1412: Yes), the optical transmitting device 100 proceeds to step S1411. Thus, the delay amount of the variable phase shifter 114 (#$v) of the channel #$v is set to "0," and the signal phase of the channel #$v is advanced by one step (for example, 90 [°]). However, at this time, the optical transmitting device 100 may proceed to step S1413 to be described later to delay the signal phase of the channel #$v by one step by setting the delay amount of the variable phase shifter 114 (#$v) of the channel #$v to "2." For example, when the shift in the signal phase of the channel #$a is a delay of 180 [°], the signal phase of the channel #$v may be shifted in either direction.

When the shift in the signal phase is not a delay of 180 [°] but is 270 [°] in step S1412 (step S1412: No), the optical transmitting device 100 proceeds to step S1413. For example, the optical transmitting device 100 sets the delay amount of the variable phase shifter 114 (#$v) of the channel #$v to "2" (step S1413). The optical transmitting device 100 ends the series of phase detection and control processing. Step S1413 delays the signal phase of the channel #$v by one step.

In step S1413, for example, the phase shifter control circuit 117 controls the variable phase shifter 114 (#$v) such that the delay amount selector 1230 illustrated in FIG. 12 selects the signal from the buffer 1222. Incidentally, when the shift in the signal phase of the channel #$v is 270 [°], the detection result of the first phase detecting circuit 331 for the channel #$a is 0, and the detection result of the second phase detecting circuit 332 for the channel #$a is +1.

When the signal phases of the channel #$b and the channel #($b +1) are not the same in step S1408 (step S1408: No), the optical transmitting device 100 proceeds to step S1414. A determination is made as to whether or not the signal phases of the channel #($b+2) and the channel #($b+3), for example, the third and fourth channels among the four target channels are the same (step S1414).

The determination in step S1414 may, for example, be made by determining whether or not, between the channels #($b+2) and #($b+3), the respective detection results of the first phase detecting circuit 331 are substantially equal to each other and the respective detection results of the second phase detecting circuit 332 are substantially equal to each other.

When the signal phases are the same in step S1414 (step S1414: Yes), the signal phases of the second to fourth channels among the four target channels are the same, and the signal phase of the first channel is shifted with reference to the signal phases of the second to fourth channels. In this case, the optical transmitting device 100 sets the value of $b+2 indicating the third channel as the above-described $v, and sets the value of $b indicating the first channel as the above-described $a (step S1415). The optical transmitting device 100 proceeds to step S1410.

When the signal phases are not the same in step S1414 (step S1414: No), the signal phases of the second and third channels among the four target channels are the same, and the signal phases of the first and fourth channels are shifted with respect to the signal phases of the second and third channels. There is a small effect of crosstalk in this case. The optical transmitting device 100 therefore ends the series of inter-four-channel phase detection and control processing without performing phase control.

(Phase Control of Optical Transmitting Device According to First Embodiment)

FIG. 15 is a diagram illustrating a first example of phase control of an optical transmitting device according to the first embodiment. Output waveforms 1511 to 1514 illustrated in FIG. 15 are the waveforms of the data signals (driving signals) output from the transmitting units 110 (#1 to #4) in the respective channels #1 to #4. Suppose here that targets of the phase detection and control processing are the channels #1 to #4. In addition, suppose that the signal phases of the channels #1 to #4 are the same.

In this case, the optical transmitting device 100 proceeds to step S1406 in the phase detection and control processing illustrated in FIG. 14. Before phase control in step S1406, the phases of the output waveforms 1511 to 1514 of all of the four target channels are the same, as illustrated in a graph 1501. On the other hand, the optical transmitting device 100 sets the delay amounts of the variable phase shifters 114 (#1 to #4) to "0" to "3," respectively, in step S1406. Thus, as illustrated in a graph 1502, the phases of the output waveforms 1511 to 1514 of the four target channels may be shifted from one another by a given amount (for example, ¼ of the UI).

Figure 16:
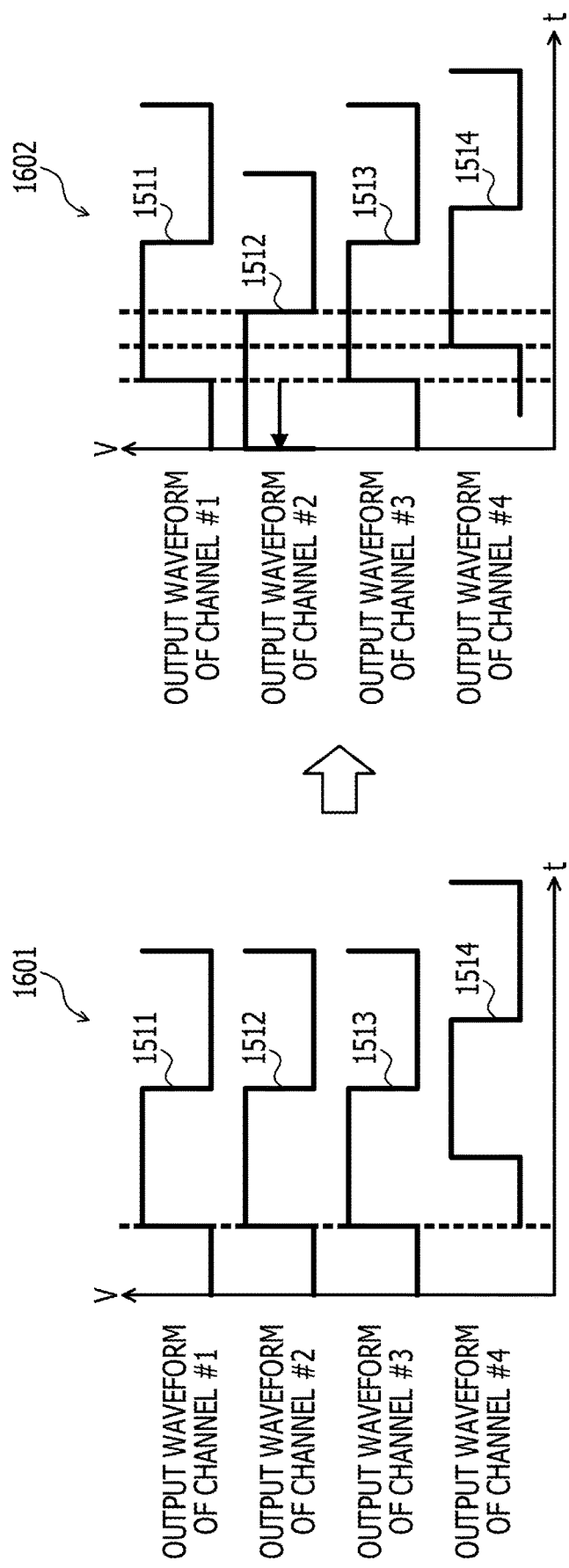
FIG. 16 is a diagram illustrating a second example of phase control of an optical transmitting device according to the first embodiment.

FIG. 16 is a diagram illustrating a second example of phase control of an optical transmitting device according to the first embodiment. In FIG. 16, parts similar to the parts illustrated in FIG. 15 are identified by the same reference numerals, and description thereof will be omitted. Suppose here that targets of the phase detection and control processing are the channels #1 to #4. In addition, suppose that the signal phases of the channels #1 to #3 are the same, and that the signal phase of the channel #4 is delayed by 90 [°] with respect to the signal phases of the channels #1 to #3.

In this case, the optical transmitting device 100 proceeds to step S1411 in the phase detection and control processing illustrated in FIG. 14. Before phase control in step S1411, the phases of the output waveforms 1511 to 1513 are the same, and the phase of the output waveform 1514 is delayed by 90 [°] with respect to the phases of the output waveforms 1511 to 1513, as illustrated in a graph 1601.

Accordingly, the optical transmitting device 100 changes the delay amount of the variable phase shifter 114 (#2) from "1" to "0" in step S1411. Thus, as illustrated in a graph 1602, the signal phase of the central channel #2 among the channels #1 to #3 whose signal phases are the same may be shifted (advanced) in an opposite direction from the channel #4 whose signal phase is shifted (delayed).

Figure 17:
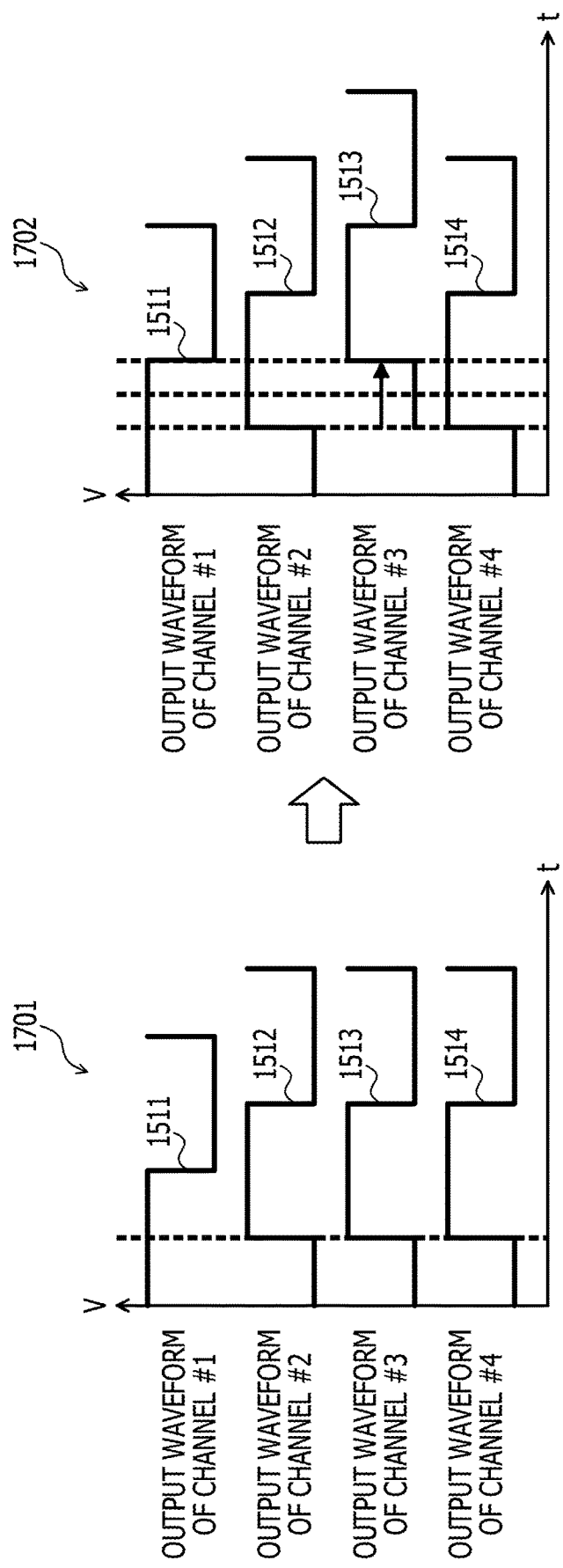
FIG. 17 is a diagram illustrating a third example of phase control of an optical transmitting device according to the first embodiment.

FIG. 17 is a diagram illustrating a third example of phase control of an optical transmitting device according to the first embodiment. In FIG. 17, parts similar to the parts illustrated in FIG. 15 are identified by the same reference numerals, and description thereof will be omitted. Suppose here that targets of the phase detection and control processing are the channels #1 to #4. In addition, suppose that the signal phases of the channels #2 to #4 are the same, and that the signal phase of the channel #1 is advanced by 90 [°] (for example, delayed by 270 [°]) with respect to the signal phases of the channels #2 to #4.

In this case, the optical transmitting device 100 proceeds to step S1413 in the phase detection and control processing illustrated in FIG. 14. Before the phase control in step S1413, as illustrated in a graph 1701, the phases of the output waveforms 1512 to 1514 are the same, and the phase of the output waveform 1511 is advanced by 90 [°] (for example, delayed by 270 [°]) with respect to the phases of the output waveforms 1512 to 1514.

Accordingly, the optical transmitting device 100 changes the delay amount of the variable phase shifter 114 (#3) from "1" to "2" in step S1413. Thus, as illustrated in a graph 1702, the signal phase of the central channel #3 among the channels #2 to #4 whose signal phases are the same may be shifted in an opposite direction (delayed) from the channel #1 whose signal phase is shifted (advanced).

As illustrated in FIGS. 14 to 17, when the signal phases of all of the four target channels are the same, the optical transmitting device 100 performs control of shifting the signal phases of all of the four target channels. In addition, when the signal phases of three adjacent channels among the four target channels are the same, the optical transmitting device 100 shifts the signal phase of the central channel among the three channels. At this time, the optical transmitting device 100 shifts the signal phase of the central channel in a direction of not becoming the same phase as the signal phase of the channel whose phase is shifted.

In addition, in other than these cases, for example, when channels that are adjacent to each other and whose signal phases are the same among the four target channels are two channels or less, there is a small effect of crosstalk, and the optical transmitting device 100 therefore does not perform phase control. It is thereby possible to avoid a state in which channels that are adjacent to each other and whose signal phases are the same among the four target channels are three channels or more, and consequently suppress an effect of crosstalk between channels on transmission quality.

(Reduction of Crosstalk in Optical Transmitting Device According to First Embodiment)

Figure 18:
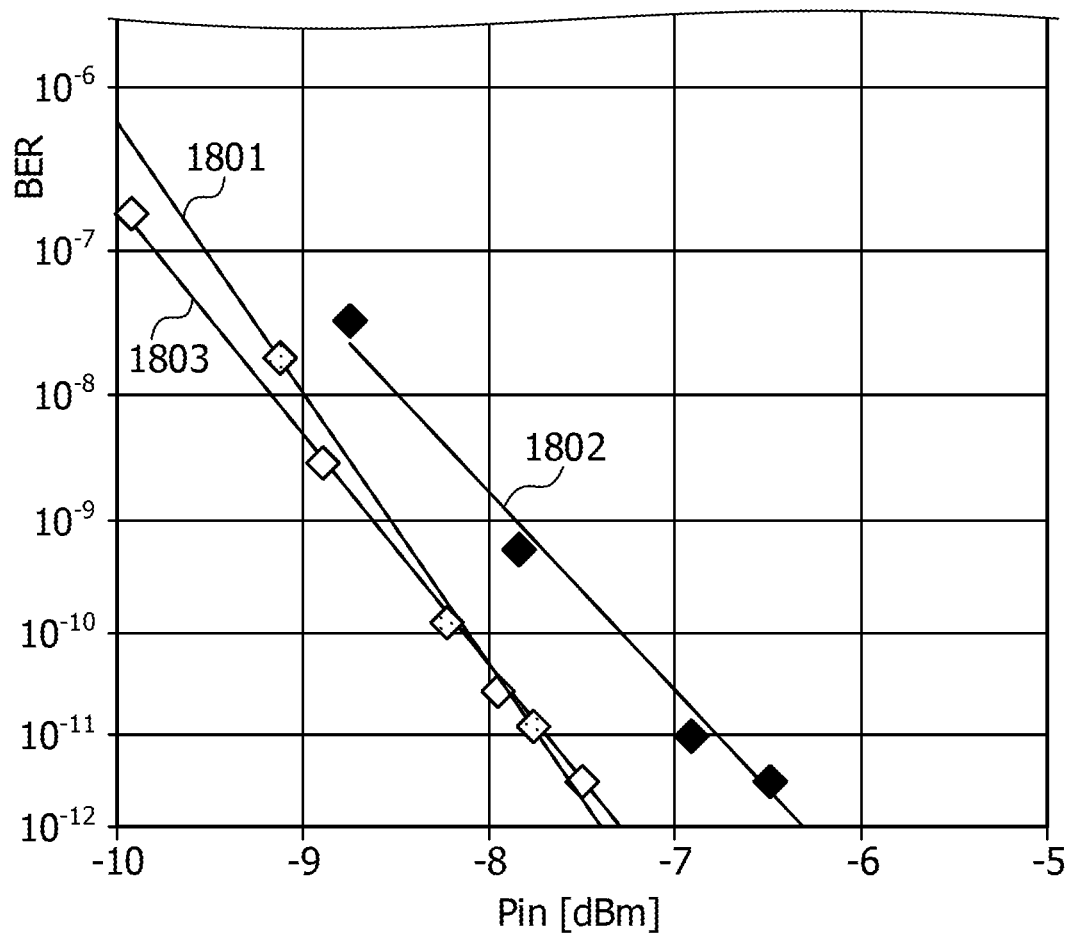
FIG. 18 is a diagram illustrating an example of reduction of crosstalk in an optical transmitting device according to the first embodiment.

FIG. 18 is a diagram illustrating an example of reduction of crosstalk in an optical transmitting device according to the first embodiment. In FIG. 18, an axis of abscissas indicates reception power Pin [dBm] in an optical receiving device receiving the optical signals transmitted by the optical transmitting device 100, and an axis of ordinates indicates BER in the optical receiving device with regard to the optical signals transmitted by the optical transmitting device 100. BER is an abbreviation of Bit Error Rate. Suppose here that the optical transmitting device 100 performs optical transmission at 28×4=112 [Gbps] by transmitting optical signals of 28 [Gbps] from the light emitting elements 121 to 124, respectively.

A reception power BER characteristic 1801 represents relation between the reception power and the BER in the optical receiving device in a case where it is assumed that the optical transmitting device 100 transmits an optical signal by using only one channel. A reception power BER characteristic 1802 represents relation between the reception power and the BER in the optical receiving device in a case where it is assumed that the optical transmitting device 100 transmits optical signals by using the four channels and does not perform the above-described phase detection and control processing. A reception power BER characteristic 1803 represents relation between the reception power and the BER in the optical receiving device in a case where the optical transmitting device 100 transmits optical signals by using the four channels and performs the above-described phase detection and control processing.

As indicated by the reception power BER characteristics 1801 to 1803, generally, the higher the reception power in the optical receiving device, the lower the BER. The reception power in the optical receiving device is determined according to transmission power from the optical transmitting device 100 and a loss in a transmission line between the optical transmitting device 100 and the optical receiving device.

Here, supposing that a BER of $10^{-12}$ or more is desired as a system requirement, for example, an effect of crosstalk of the optical signals transmitted by the optical transmitting device 100 may be evaluated based on the lowness of the reception power at a BER of $10^{-12}$. For example, the lower the reception power at the BER of $10^{-12}$, the smaller the effect of crosstalk that may be evaluated, because the system requirement is satisfied even when the transmission power from the optical transmitting device 100 is low or there is a large loss in the transmission line.

As indicated by the reception power BER characteristic 1801, when the optical transmitting device 100 uses only one channel, there is no crosstalk between channels, and therefore the reception power at the BER of $10^{-12}$ is relatively low at approximately −7.4 [dBm]. In this case, however, low-speed optical transmission at 28 [Gbps] is performed because only one channel is used.

In addition, as indicated by the reception power BER characteristic 1802, when the optical transmitting device 100 transmits optical signals by using the four channels, and does not perform the above-described phase detection and control processing, the reception power at the BER of $10^{-12}$ is relatively high at approximately −6.3 [dBm]. This indicates a large effect of crosstalk between channels.

On the other hand, as indicated by the reception power BER characteristic 1803, when the optical transmitting device 100 transmits optical signals by using the four channels and performs the above-described phase detection and control processing, the reception power at the BER of $10^{-12}$ is relatively low at approximately −7.3 [dBm]. This indicates that an effect of crosstalk between channels is suppressed by the above-described phase detection and control processing.

As illustrated in FIG. 18, the phase detection and control processing of the optical transmitting device 100 may suppress an effect of crosstalk between channels in high-speed optical transmission using the four channels. It is therefore possible to improve transmission and reception performance of an optical interconnect or the like to which the optical transmitting device 100 is applied, for example. Hence, robustness is increased against, for example, process variations and variations in environmental aspects such as temperature, power supply voltage, and the like, and improvements in a transmission speed and a transmission distance may be achieved.

(Phase Detection and Control Processing of Eight-Channel Optical Transmitting Device According to First Embodiment)

Figure 19:
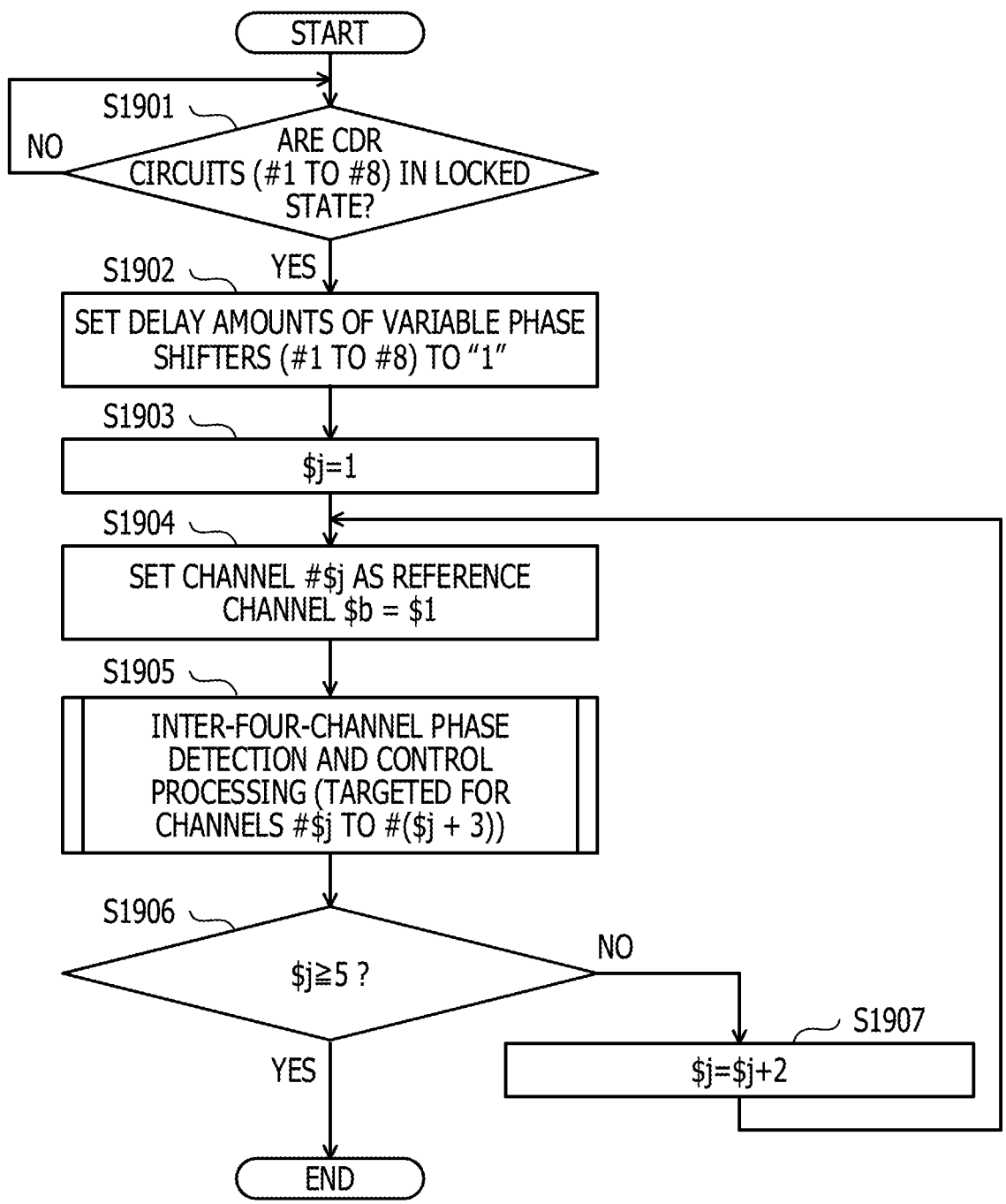
FIG. 19 is a flowchart illustrating an example of phase detection and control processing of an eight-channel optical transmitting device according to the first embodiment.

FIG. 19 is a flowchart illustrating an example of phase detection and control processing of an eight-channel optical transmitting device according to the first embodiment. The optical transmitting device 100 in the example illustrated in FIG. 1 is a four-channel transmitting device of the channels #1 to #4. However, the optical transmitting device 100 may be made to be an eight-channel transmitting device of channels #1 to #8 by further providing a transmitting circuit 110a (#5 to #8) and light emitting elements corresponding to the channels #5 to #8, for example. The transmitting circuit 110a (#5 to #8) has a configuration similar to the configuration of the transmitting circuit 110a (#1 to #4).

Processing of the eight-channel optical transmitting device 100 will be described with reference to FIG. 19. The eight-channel optical transmitting device 100 performs three times of inter-four-channel phase detection and control processing targeted for the channels #1 to #4, the channels #3 to #6, and the channels #5 to #8, respectively, as an example. For example, the eight-channel optical transmitting device 100 performs processing illustrated in FIG. 19 by the phase shifter control circuit 117 illustrated in FIG. 1.

First, the optical transmitting device 100 determines whether or not the CDR circuits 112 (#1 to #8) are in a locked state (step S1901), and waits until the CDR circuits 112 (#1 to #8) are set in the locked state (loop of step S1901: No).

When the CDR circuits 112 (#1 to #8) are set in the locked state in step S1901 (step S1901: Yes), the optical transmitting device 100 sets the respective delay amounts of the variable phase shifters 114 (#1 to #8) to "1" (step S1902). In addition, the optical transmitting device 100 sets one indicating the channel #1 as $j, which is an index stored in the memory of the transmitting circuit 110a and indicates the present reference channel (step S1903).

Next, the optical transmitting device 100 sets a channel #$j as the reference channel based on the present $j (step S1904). Step S1904 is, for example, performed by controlling the reference channel selector 321 illustrated in FIG. 3 so as to select a signal from a frequency divider corresponding to the channel #$j (frequency divider 311 when $j=1) among the frequency dividers 311 to 314. In addition, the optical transmitting device 100 sets $j indicating the channel

$j as $b, which is information stored in the memory of the transmitting circuit 110a and indicates the reference channel.

Next, the optical transmitting device 100 performs the inter-four-channel phase detection and control processing targeted for the channels #$j to #($j+3) (step S1905). The inter-four-channel phase detection and control processing in step S1905 is the same as the inter-four-channel phase detection and control processing illustrated in FIG. 14. Next, the optical transmitting device 100 determines whether or not $j is equal to or more than five based on the present $j (step S1906).

When $j is not equal to or more than five in step S1906 (step S1906: No), at least one time of inter-four-channel phase detection and control processing of the above-described three times of inter-four-channel phase detection and control processing is not completed. In this case, the optical transmitting device 100 increases the value of $j by two (step S1907). The optical transmitting device 100 then returns to step S1904.

When $j is equal to or more than five in step S1906 (step S1906: Yes), the above-described three times of inter-four-channel phase detection and control processing are completed. The optical transmitting device 100 therefore ends the series of phase detection and control processing.

However, the phase detection and control processing of the optical transmitting device 100 is not limited to the example illustrated in FIG. 19. For example, while description has been made of a case where the respective delay amounts of the variable phase shifters 114 (#1 to #8) are set to "1" in step S1902 in the example illustrated in FIG. 19, there is no limitation to such processing. For example, in step S1902, processing may be performed which sets the respective delay amounts of the variable phase shifters 114 (#1 to #8) to "2."

As with the phase detection and control processing illustrated in FIG. 13, the phase detection and control processing illustrated in FIG. 19 is performed before operation of optical transmission using optical signals or during operation of optical transmission using optical signals.

(AOC to which Optical Transmitting Device According to First Embodiment is Applied)

Figure 20:
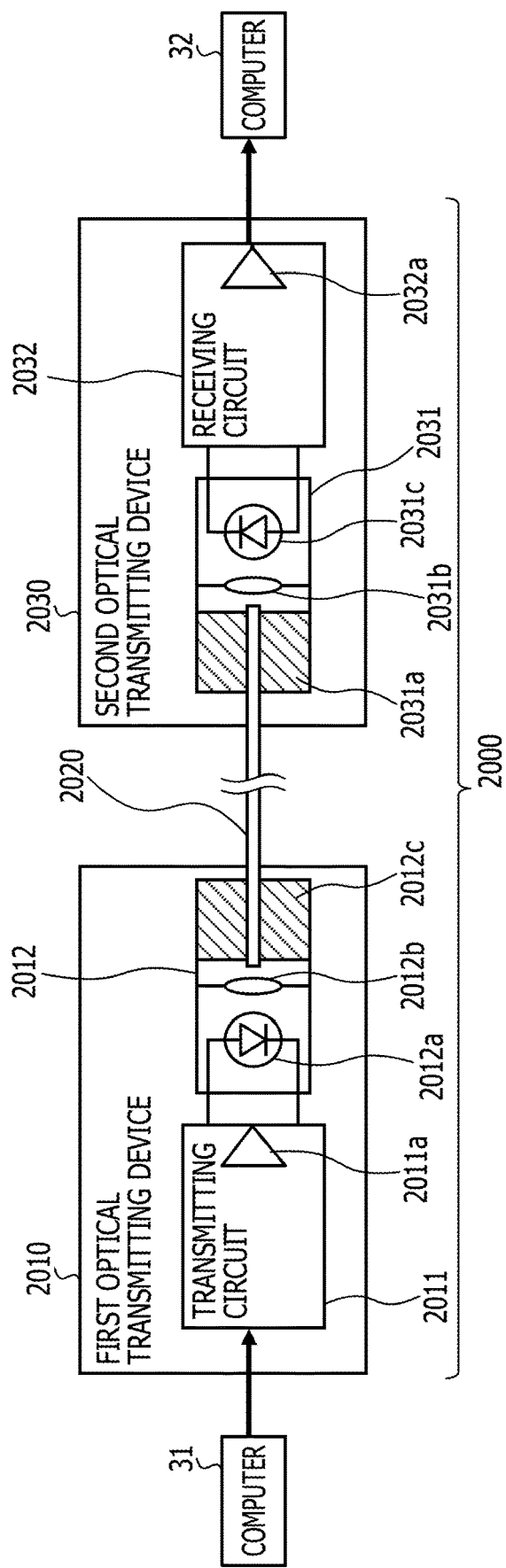
FIG. 20 is a diagram illustrating an example of an AOC to which an optical transmitting device according to the first embodiment is applied.

FIG. 20 is a diagram illustrating an example of an AOC to which an optical transmitting device according to the first embodiment is applied. The optical transmitting device 100 according to the first embodiment is, for example, applicable to an AOC 2000 illustrated in FIG. 20. AOC is an abbreviation of Active Optical Cable. The AOC 2000 is an optical interconnect formed by integrating an (E/O) module that converts an electric signal into an optical signal, an optical fiber that transmits the optical signal, and an (O/E) module that restores the optical signal received through the optical fiber to the electric signal.

For example, the AOC 2000 is an optical module formed by integrating a first optical transmission device 2010, an optical fiber cable 2020, and a second optical transmission device 2030. The optical transmitting device 100 described above may, for example, be applied to the first optical transmission device 2010.

The first optical transmission device 2010 is a connector connectable to a computer 31. The first optical transmission device 2010 converts an electric signal output from the computer 31 connected by the connector into an optical signal, and transmits the converted optical signal to the second optical transmission device 2030 via the optical fiber cable 2020. The first optical transmission device 2010, for example, includes a transmitting circuit 2011 and an electro-optic conversion module 2012.

The transmitting circuit 2011 generates a driving signal driving a light emitting element 2012a of the electro-optic conversion module 2012 to be described later based on a data signal (electric signal) output from the computer 31. The transmitting circuit 2011, for example, includes an output driver 2011a that generates the driving signal in a final stage or in the vicinity of the final stage. The transmitting circuit 2011 then outputs the driving signal generated by the output driver 2011a to the electro-optic conversion module 2012. The transmitting circuit 110a described above may, for example, be applied to the transmitting circuit 2011.

In addition, the transmitting circuit 2011 may include an encoding circuit that encodes the electric signal output from the computer 31 so as to support optical transmission by the AOC 2000. In this case, the output driver 2011a generates the driving signal based on the electric signal encoded by the encoding circuit.

The electro-optic conversion module 2012 converts the driving signal output from the transmitting circuit 2011 into an optical signal, and sends out the converted optical signal to the optical fiber cable 2020. The electro-optic conversion module 2012, for example, includes a light emitting element 2012a, a lens 2012b, and a fiber retaining unit 2012c. The light emitting element 2012a generates the optical signal according to the driving signal output from the transmitting circuit 2011, and emits the generated optical signal to the lens 2012b.

The lens 2012b condenses the optical signal emitted from the light emitting element 2012a onto an end portion of the optical fiber cable 2020 fixed within the electro-optic conversion module 2012. The optical signal emitted from the light emitting element 2012a is thereby sent out to the optical fiber cable 2020. The fiber retaining unit 2012c retains the end portion of the optical fiber cable 2020, the end portion being on the side of the first optical transmission device 2010, so as to fix the end portion within the electro-optic conversion module 2012.

In addition, the first optical transmission device 2010 is a multichannel transmitting device having a plurality of combinations of the transmitting circuit 2011 and the electro-optic conversion module 2012 and capable of sending out a plurality of optical signals. The first optical transmission device 2010 is, for example, a four-channel transmitting device having four combinations of the transmitting circuit 2011 and the electro-optic conversion module 2012 and capable of sending out four optical signals.

In this case, the transmitting units 110 (#1 to #4) and the light emitting elements 121 to 124 described above may be applied to the transmitting circuits 2011 and the electro-optic conversion modules 2012 (light emitting elements 2012a) of the four combinations. In addition, in this case, the first optical transmission device 2010 may include a distributing circuit that divides the electric signal output from the computer 31 into a plurality of signals, and distributes the divided signals to the plurality of transmitting circuits 2011, respectively.

The optical fiber cable 2020 is a cable including an optical fiber connecting the first optical transmission device 2010 and the second optical transmission device 2030 to each other. For example, the optical fiber cable 2020 passes the optical signal sent out from the first optical transmission device 2010, and makes the passed optical signal enter the second optical transmission device 2030. In addition, the optical fiber cable 2020 is a cable including a plurality of (for example, four) optical fibers that pass a plurality of (for example, four-channel) optical signals sent out from the first optical transmission device 2010.

The second optical transmission device 2030 is a connector connectable to a computer 32. The second optical transmission device 2030 converts the optical signal transmitted from the first optical transmission device 2010 via the optical fiber cable 2020 into an electric signal, and outputs the converted electric signal to the computer 32 connected by the connector. The second optical transmission device 2030, for example, includes an opto-electric conversion module 2031 and a receiving circuit 2032.

The opto-electric conversion module 2031 converts the optical signal passed through the optical fiber cable 2020 into an electric signal, and outputs the converted electric signal to the receiving circuit 2032. The opto-electric conversion module 2031, for example, includes a fiber retaining unit 2031a, a lens 2031b, and a light receiving element 2031c. The fiber retaining unit 2031a retains an end portion of the optical fiber cable 2020, the end portion being on the side of the second optical transmission device 2030, so as to fix the end portion within the opto-electric conversion module 2031.

The lens 2031b condenses the optical signal emitted from the end portion of the optical fiber cable 2020, the end portion being fixed within the opto-electric conversion module 2031, onto the light receiving element 2031c. The light receiving element 2031c receives the optical signal condensed by the lens 2031b, generates an electric signal according to the received optical signal, and outputs the generated electric signal to the receiving circuit 2032.

The receiving circuit 2032 performs reception processing for the electric signal output from the opto-electric conversion module 2031, and outputs the electric signal obtained by the reception processing to the computer 32. For example, the receiving circuit 2032 includes a TIA, and performs, as the reception processing, processing of converting the electric signal output from the opto-electric conversion module 2031 from a current signal to a voltage signal by the TIA. TIA is an abbreviation of Transimpedance Amplifier. In addition, the receiving circuit 2032 includes an output driver 2032a that amplifies and outputs the voltage signal in a final stage or in the vicinity of the final stage. In addition, the receiving circuit 2032 may, for example, include a decoding circuit, and perform decoding corresponding to the above-described encoding circuit as the reception processing.

The second optical transmission device 2030 is a multi-channel transmitting device having a plurality of combinations of the opto-electric conversion module 2031 and the receiving circuit 2032 and capable of receiving a plurality of optical signals. The second optical transmission device 2030 is, for example, a four-channel transmitting device having four combinations of the opto-electric conversion module 2031 and the receiving circuit 2032 and capable of receiving four optical signals. In addition, in this case, the second optical transmission device 2030 may include a coupling circuit that couples electric signals output from the plurality of receiving circuits 2032, and outputs the coupled electric signals to the computer 32.

In addition, while description has been made of a configuration in which an optical signal is transmitted from the first optical transmission device 2010 to the optical fiber cable 2020 in the AOC 2000, a configuration may also be adopted in which optical signals are bidirectionally transmitted between the first optical transmission device 2010 and the second optical transmission device 2030. For example, the configuration of the first optical transmission device 2010 illustrated in FIG. 20 is provided also to the second optical transmission device 2030, and thereby an optical signal based on an electric signal output from the computer 32 is transmitted to the first optical transmission device 2010 via the optical fiber cable 2020.

In this case, the optical fiber cable 2020 includes an optical fiber that passes the optical signal transmitted from the second optical transmission device 2030 to the first optical transmission device 2010. In addition, in this case, the configuration of the second optical transmission device 2030 illustrated in FIG. 20, for example, is provided also to the first optical transmission device 2010. Thus, the optical signal transmitted from the second optical transmission device 2030 via the optical fiber cable 2020 may be converted into an electric signal in the first optical transmission device 2010, and the converted electric signal may be output to the computer 31.

Thus, the optical transmitting device 100 according to the first embodiment controls phase differences between the respective data signals (driving signals) output by the transmitting units 110 (#1 to #4) based on a result of comparison of the respective phases of the clocks reproduced by the transmitting units 110 (#1 to #4). It is thereby possible to adjust relative phases between the data signals of the respective channels, and consequently suppress an effect of crosstalk between channels on transmission quality. Incidentally, the control of the phase differences between the data signals is performed by controlling the phase shift amounts of the respective data signals. The control of the phase shift amounts includes setting a phase shift amount to zero, for example, not shifting the phase.

In addition, the optical transmitting device 100 controls the phase differences between the respective data signals after being identified and reproduced by the 0/1 determining circuits 113 (#1 to #4) of the transmitting units 110 (#1 to #4) and before being amplified by the output drivers 115 (#1 to #4). It is thereby possible to suppress an effect produced on transmission quality by crosstalk between channels in the output drivers 115 (#1 to #4) where a large crosstalk tends to occur between channels.

In addition, when the phases of the respective clocks reproduced by the transmitting units 110 (#1 to #4) are the same, the optical transmitting device 100 according to the first embodiment sets the phase shift amounts for the respective data signals output by the transmitting units 110 (#1 to #4) to respective different amounts. It is thereby possible to resolve a state in which crosstalk into the data signal of one channel tends to occur from the respective data signals of a plurality of other channels in same timing, and consequently suppress an effect of the crosstalk between the channels on transmission quality. This phase control may be implemented by step S1406 illustrated in FIG. 14, for example.

In addition, the optical transmitting device 100 according to the first embodiment includes a first transmitting unit, a second transmitting unit adjacent to the first transmitting unit, and a third transmitting unit adjacent to the second transmitting unit. The first transmitting unit, the second transmitting unit, and the third transmitting unit are, for example, the transmitting units 110 (#1 to #3) or the transmitting units 110 (#2 to #4) described above.

When the phases of respective clocks reproduced by these transmitting units are the same, the optical transmitting device 100 sets a phase shift amount for a data signal output by the second transmitting unit to an amount different from a phase shift amount for the respective data signals output by the first and third transmitting units. The phase of the data signal output from the second transmitting unit may be thereby shifted from the phases of the respective data signals output from the first transmitting unit and the third transmitting unit.

Hence, it is possible to resolve a state in which a crosstalk into the data signal output from the second transmitting unit occurs from the respective data signals of the two other adjacent channels in same timing, and consequently suppress an effect of the crosstalk between the channels on transmission quality. This phase control may be implemented by step S1411 or step S1413 illustrated in FIG. 14, for example.

In addition, the optical transmitting device 100 according to the first embodiment includes a fourth transmitting unit adjacent to the first transmitting unit or the third transmitting unit. In a case where the first transmitting unit, the second transmitting unit, and the third transmitting unit are the transmitting units 110 (#1 to #3) described above, the fourth transmitting unit is, for example, the transmitting circuit 110a (#4). In a case where the first transmitting unit, the second transmitting unit, and the third transmitting unit are the transmitting units 110 (#2 to #4) described above, the fourth transmitting unit is, for example, the transmitting circuit 110a (#1).

When the phases of the respective clocks reproduced by the first transmitting unit, the second transmitting unit, and the third transmitting unit are a first phase (same), and the phase of the clock reproduced by the fourth transmitting unit is a second phase different from the first phase, the transmitting circuits 110a performs the following phase control. For example, the optical transmitting device 100 controls a phase shift amount for the data signal output by the second transmitting unit such that the phase of the data signal output by the second transmitting unit is a phase different from the first phase and the second phase.

Consequently, the phase of the data signal output from the second transmitting unit may be made not to be the same as the phase of the data signal output from the fourth transmitting unit when the phase of the data signal output from the second transmitting unit is shifted from the phases of the respective data signals output from the first and third transmitting units.

Hence, it is possible to avoid a state in which a crosstalk into the data signal output from the transmitting unit (the first transmitting unit or the third transmitting unit) between the second and fourth transmitting units occurs from the respective data signals of the second and fourth transmitting units in same timing. For example, it is possible to avoid an increase in the effect of crosstalk into the data signal of the transmitting unit between the second and fourth transmitting units as a result of shifting the phase of the data signal output from the second transmitting unit from the phases of the respective data signals output from the first and third transmitting units. Therefore, the effect of the crosstalk between the channels on transmission quality may be suppressed.

It is to be noted that while description has been made of a case where the optical transmitting device 100 is a transmitting device of four channels or eight channels in the first embodiment, the number of channels accommodated by the optical transmitting device 100 is not limited to these numbers. For example, the optical transmitting device 100 may be a transmitting device of 16 channels or more.

In addition, while description has been made of the optical transmitting device 100 transmitting optical signals, the first embodiment is applicable also to an optical receiving device receiving optical signals. For example, the receiving circuit 2032 of the second optical transmission device 2030 illustrated in FIG. 20 may be provided with a circuit similar to the transmitting circuit 110a illustrated in FIG. 1.

In this case, however, the transmission line loss compensating circuits 111 (#1 to #4) are supplied with data signals obtained when the opto-electric conversion modules 2031 of the channels #1 to #4 receive the optical signals of the channels #1 to #4 which optical signals are transmitted by the first optical transmission device 2010. In addition, the output drivers 115 (#1 to #4) amplify the data signals output from the variable phase shifters 114 (#1 to #4), respectively, and output the amplified data signals to the computer 32. It is thereby possible to suppress an effect of crosstalk between channels on transmission quality of the data signals of the respective channels which data signals are output to the computer 32 by the second optical transmission device 2030.

(Second Embodiment)

A second embodiment will be described with regard to parts different from those of the first embodiment. In the second embodiment, description will be made of a configuration in which an effect of crosstalk is suppressed by using a circuit other than the variable phase shifters 114 (#1 to #4), the phase comparator 116, and the phase shifter control circuit 117 according to the first embodiment, for example, even when the variable phase shifters 114 (#1 to #4), the phase comparator 116, and the phase shifter control circuit 117 according to the first embodiment are not provided.

(Optical Transmitting Device According to Second Embodiment)

Figure 21:
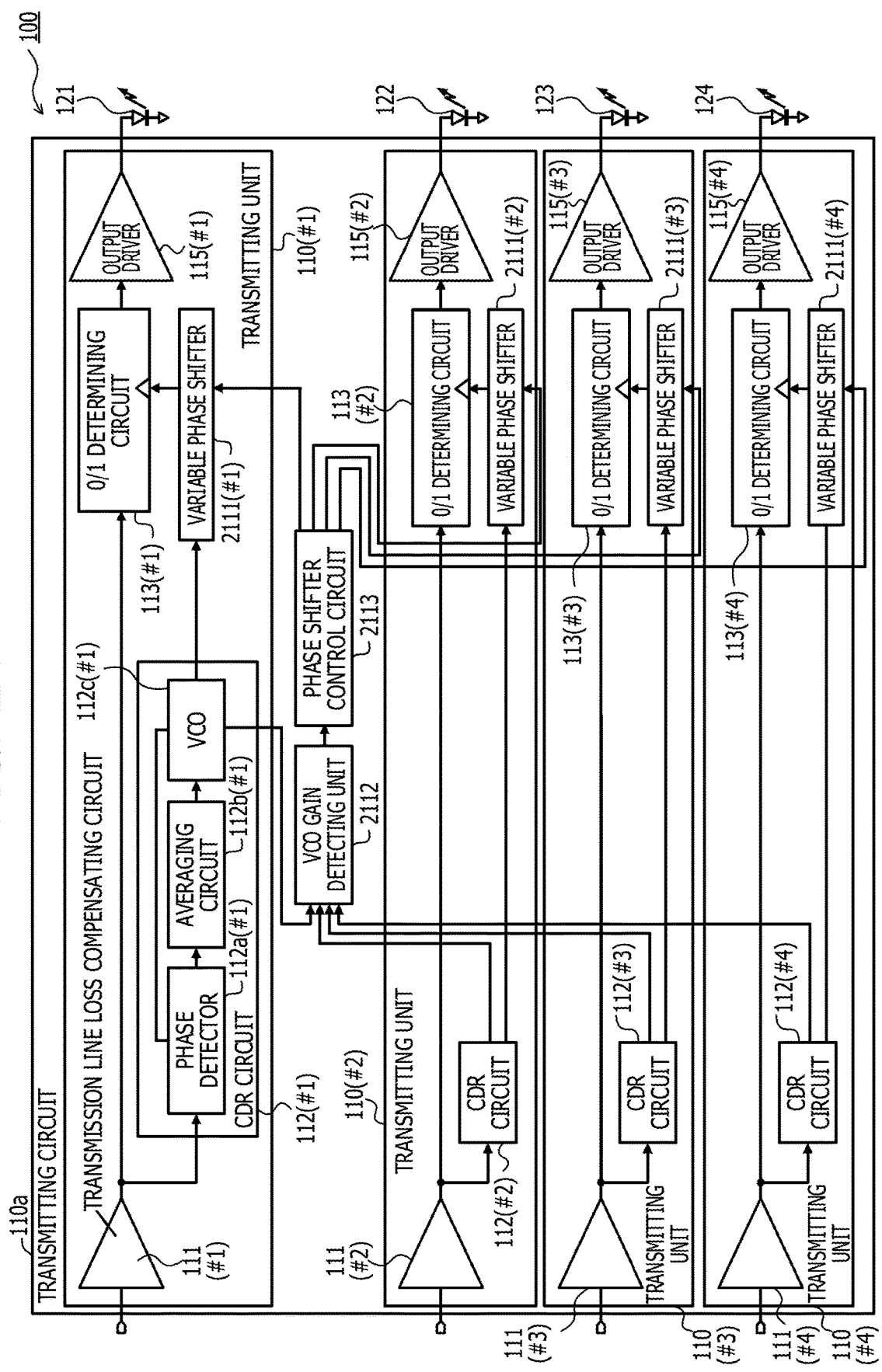
FIG. 21 is a diagram illustrating an example of an optical transmitting device according to a second embodiment.

FIG. 21 is a diagram illustrating an example of an optical transmitting device according to the second embodiment. In FIG. 21, parts similar to the parts illustrated in FIG. 1 are identified by the same reference numerals, and description thereof will be omitted. As illustrated in FIG. 21, an optical transmitting device 100 according to the second embodiment includes variable phase shifters 2111 (#1 to #4) in place of the variable phase shifters 114 (#1 to #4) illustrated in FIG. 1. In addition, the optical transmitting device 100 according to the second embodiment includes a VCO gain detecting unit 2112 and a phase shifter control circuit 2113 in place of the phase comparator 116 and the phase shifter control circuit 117 illustrated in FIG. 1.

In this case, the 0/1 determining circuit 113 (#1) determines the value of the data signal output from the transmission line loss compensating circuit 111 (#1) in timing of an edge of the reproduced clock output from the variable phase shifter 2111 (#1). The 0/1 determining circuit 113 (#1) then outputs a result of the determination of the value of the data signal as an identified and reproduced data signal to the output driver 115 (#1).

Similarly, the 0/1 determining circuits 113 (#2 to #4) determine the values of the data signals output from the respective transmission line loss compensating circuits 111 (#2 to #4) in timing of edges of the reproduced clocks output from the variable phase shifters 2111 (#2 to #4), respectively. The 0/1 determining circuits 113 (#2 to #4) then output results of the determination of the values of the data signals as identified and reproduced data signals to the output drivers 115 (#2 to #4), respectively.

The CDR circuit 112 (#1) outputs a generated reproduced clock to the variable phase shifter 2111 (#1). Similarly, the CDR circuits 112 (#2 to #4) output generated reproduced clocks to the variable phase shifters 2111 (#2 to #4), respectively.

The variable phase shifter 2111 (#1) shifts the phase of the reproduced clock output from the CDR circuit 112 (#1) based on a control signal output from the phase shifter control circuit 2113. The variable phase shifter 2111 (#1) then outputs the phase-shifted reproduced clock to the 0/1 determining circuit 113 (#1). Similarly, the variable phase shifters 2111 (#2 to #4) respectively shift the phases of the reproduced clocks output from the CDR circuits 112 (#2 to #4) based on control signals output from the phase shifter control circuit 2113. The variable phase shifters 2111 (#2 to #4) then output the phase-shifted reproduced clocks to the 0/1 determining circuits 113 (#2 to #4), respectively.

In a case where the VCO 112c (#1) outputs a plurality of reproduced clocks, for example, the variable phase shifter 2111 (#1) may shift the phase of the reproduced clock by selecting or synthesizing the plurality of reproduced clocks. The plurality of reproduced clocks are, for example, a reproduced clock synchronized with the data signal and three clock signals having phases shifted by 90 [°], 180 [°], and 270 [°], respectively, with respect to the reproduced clock. Similarly, the variable phase shifters 2111 (#2 to #4) may shift the phases of the reproduced clocks by selecting or synthesizing pluralities of reproduced clocks output from the VCOs 112c (#2 to #4), respectively.

Thus, the variable phase shifters 2111 (#1 to #4) may be implemented with a configuration simpler than that of the variable phase shifters 114 (#1 to #4) that shift the phases of the data signals by using the buffer chain configuration illustrated in FIG. 12, for example. However, the variable phase shifters 2111 (#1 to #4) may be implemented by using the buffer chain configuration illustrated in FIG. 12 as in the variable phase shifters 114 (#1 to #4).

The output driver 115 (#1) generates a driving signal for the light emitting element 121 based on the data signal output from the 0/1 determining circuit 113 (#1). Similarly, the output drivers 115 (#2 to #4) generate driving signals for the light emitting elements 122 to 124 based on the data signals output from the 0/1 determining circuits 113 (#2 to #4), respectively.

The VCO gain detecting unit 2112 detects a VCO gain in the VCO 112c (#1) directly (FIG. 26 and FIG. 27) or indirectly (FIGS. 28 to 32) based on at least one of the input signal and output signal of the VCO 112c (#1). The input signal of the VCO 112c (#1) is a control voltage output from the averaging circuit 112b (#1) to the VCO 112c (#1). The output signal of the VCO 112c (#1) is the reproduced clock output from the VCO 112c (#1).

Similarly, the VCO gain detecting unit 2112 detects the VCO gain of each of the VCOs 112c (#2 to #4) directly or indirectly based on at least one of the input signal and output signal of each of the VCOs 112c (#2 to #4). In addition, the detection of the VCO gains of the VCOs 112c (#1 to #4) by the VCO gain detecting unit 2112 is performed in the locked states of the CDR circuits 112 (#1 to #4), respectively.

The VCO gain is a ratio [Hz/V] of the frequency of the clock signal output by the VCO to the control voltage input to the VCO. The detection of the VCO gain by the VCO gain detecting unit 2112 will be described later (see FIGS. 26 to 32, for example). The VCO gain detecting unit 2112 outputs respective detection results of the VCO gains of the VCOs 112c (#1 to #4) to the phase shifter control circuit 2113.

The phase shifter control circuit 2113 performs processing of controlling shifts in the phases of the reproduced clocks in the variable phase shifters 2111 (#1 to #4) of the transmitting units 110 (#1 to #4), respectively, based on the detection results of the VCO gains, the detection results being output from the VCO gain detecting unit 2112. This control is performed based on the control signals that the phase shifter control circuit 2113 outputs to the variable phase shifters 2111 (#1 to #4). The processing of the phase shifter control circuit 2113 will be described later (see FIG. 33, for example).

The VCO gain detecting unit 2112 and the phase shifter control circuit 2113 may, for example, be implemented by cooperative operation of a processor and a memory included in an integrated circuit implementing the transmitting circuit 110a.

(Worst Phase to be Avoided by Optical Transmitting Device According to Second Embodiment)

Figure 22:
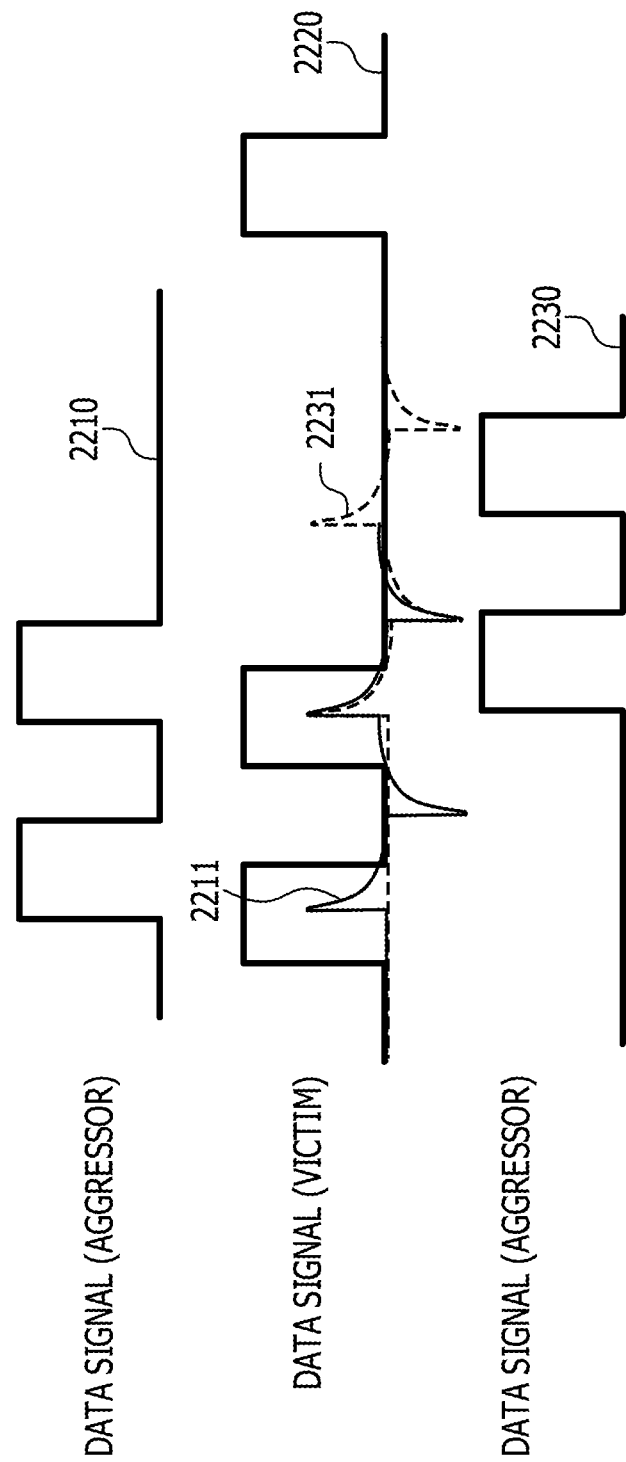
FIG. 22 is a diagram illustrating an example of a worst phase to be avoided by an optical transmitting device according to the second embodiment.

FIG. 22 is a diagram illustrating an example of a worst phase to be avoided by an optical transmitting device according to the second embodiment. In FIG. 22, a horizontal direction indicates time. Data signals 2210, 2220, and 2230 are the respective data signals of three channels included in the channels #1 to #4 and adjacent to each other. The respective data signals of the three channels adjacent to each other are the respective data signals of three transmitting units 110 arranged so as to be adjacent to each other among the transmitting units 110 (#1 to #4), for example, the respective data signals of the channels #1 to #3 or the channels #2 to #4.

An effect of crosstalk between data signals differs depending on phase differences between the data signals of aggressors and the data signal of a victim. Here, suppose that the data signal 2220 between the data signals 2210 and 2230 is a victim, and that the data signals 2210 and 2230 on both sides of the data signal 2220 are aggressors.

A crosstalk 2211 illustrated in FIG. 22 is a crosstalk given to the data signal 2220 by the data signal 2210. A crosstalk 2231 is a crosstalk given to the data signal 2220 by the data signal 2230. The data signal 2220 receives the crosstalks 2211 and 2231, and thereby has a waveform formed by adding the crosstalks 2211 and 2231 to the original data signal 2220.

As illustrated in FIG. 22, the quality of the data signal 2220 (victim) is degraded most when timing of about an eye center of the data signal 2220 (victim) and timing of data edges of the data signals 2210 and 2230 (aggressors) are the same. The degradation in the quality of the data signal 2220 means that the waveform of the data signal 2220 is distorted, making it difficult to identify the value (zero or one) of the data signal 2220 on the receiving side.

A phase relation such that the timing of about the eye center of the central data signal among the three data signals adjacent to each other and the timing of the data edges of the data signals on both sides of the central data signal are thus the same will be referred to as a worst phase with a largest effect of crosstalk. In addition, a state in which the channels accommodated by the optical transmitting device 100 include three channels having the worst phase as a phase relation thereof will be referred to as a worst state. The phase shifter control circuit 2113 according to the second embodiment controls shifts in the phases of the reproduced clocks in the variable phase shifters 2111 (#1 to #4) so as to avoid the worst phase (worst state), for example.

However, the worst phase is not limited to this. A phase relation may also be included in the worst phase, the phase relation being, for example, such that the signal phase of only a channel at one end among the four channels is shifted and thereby an effect of crosstalk in the channel at the one end is increased. In addition, in the worst state, the channels accommodated by the optical transmitting device 100 may include the four channels having such a worst phase as a phase relation thereof (worst states 4104 and 4105 in FIG. 41, for example).

(VCO Gain Detected by VCO Gain Detecting Unit According to Second Embodiment)

Figure 23:
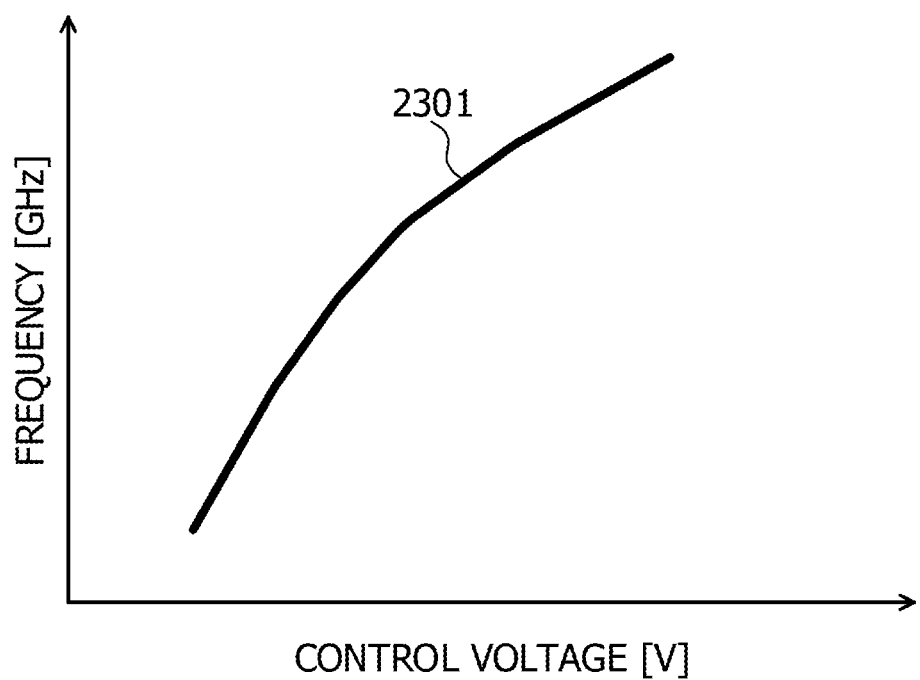
FIG. 23 is a diagram illustrating an example of a VCO gain detected by a VCO gain detecting unit according to the second embodiment.

FIG. 23 is a diagram illustrating an example of a VCO gain detected by a VCO gain detecting unit according to the second embodiment. In FIG. 23, an axis of abscissas indicates the control voltage [V] input to the VCO 112c (#1) of the CDR circuit 112 (#1) of the channel #1, and an axis of ordinates indicates the frequency [GHz] of the reproduced clock output by the VCO 112c (#1).

A voltage frequency characteristic 2301 is a characteristic of the frequency of the reproduced clock output by the VCO 112c (#1) with respect to the control voltage input to the VCO 112c (#1). The VCO gain of the VCO 112c (#1) which VCO gain is detected by the VCO gain detecting unit 2112 corresponds to the slope of the voltage frequency characteristic 2301.

While description has been made of the VCO gain of the VCO 112c (#1) of the CDR circuit 112 (#1) of the channel #1, a similar description applies also to the respective VCO gains of the VCOs 112c (#2 to #4) of the CDR circuits 112 (#2 to #4) of the channels #2 to #4. The VCO gain detecting unit 2112 directly or indirectly detects the respective VCO gains of the VCOs 112c (#1 to #4), and outputs detection results to the phase shifter control circuit 2113.

(Magnetic Field Coupling Corresponding to Signal Phase Difference Between Channels According to Second Embodiment)

Figure 24:
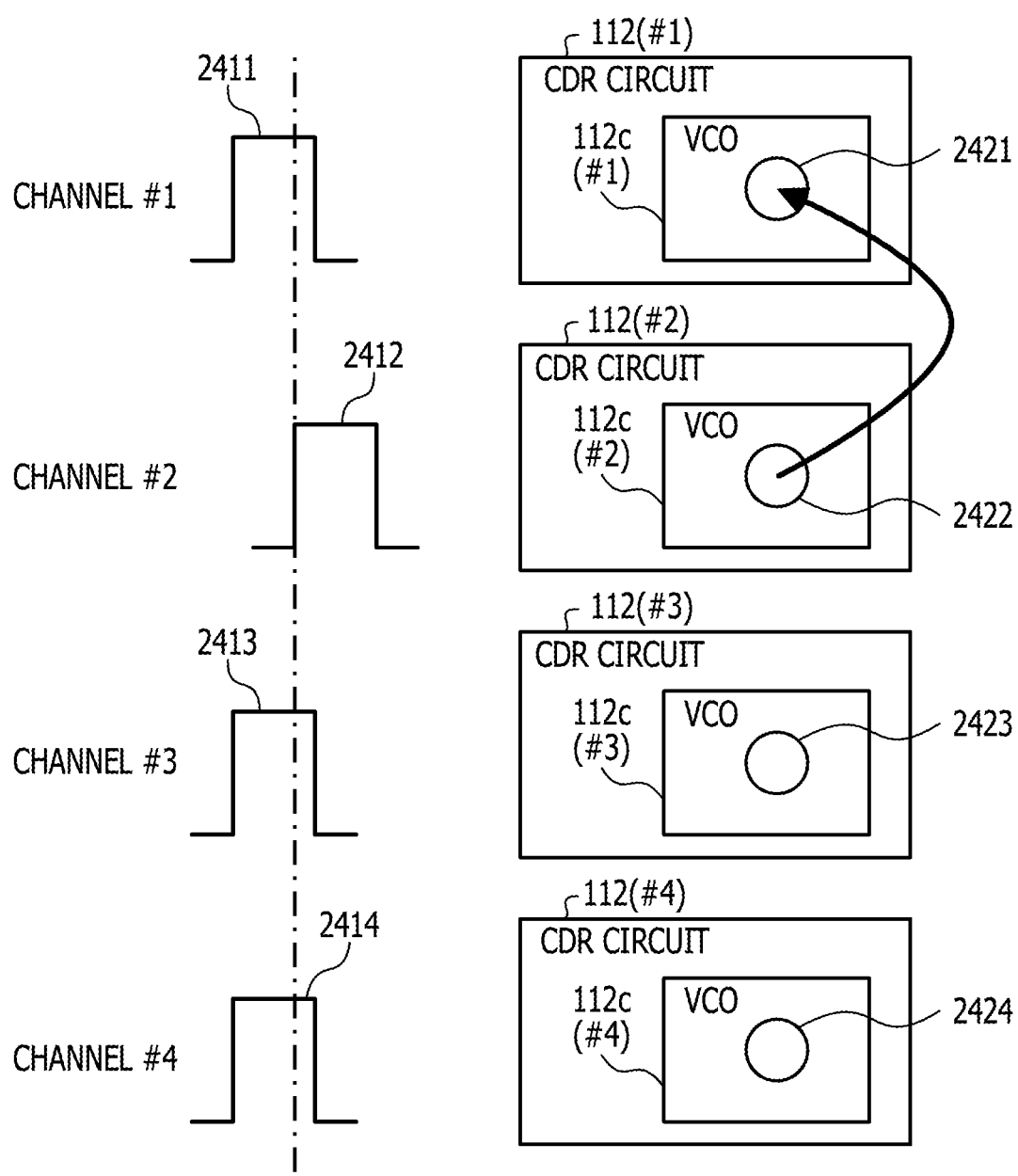
FIG. 24 is a diagram illustrating an example of magnetic field coupling corresponding to a signal phase difference between channels according to the second embodiment.

FIG. 24 is a diagram illustrating an example of magnetic field coupling corresponding to a signal phase difference between channels according to the second embodiment. Data signals 2411 to 2414 illustrated in FIG. 24 are the data signals of the channels #1 to #4, respectively.

Here, each of the VCOs 112c (#1 to #4) of the CDR circuits 112 (#1 to #4) may be implemented by an oscillator including an LC tank formed by a parallel coupling of an inductor and a variable capacitance. Inductors 2421 to 2424 illustrated in FIG. 24 are the inductors of the LC tanks of the VCOs 112c (#1 to #4), respectively.

In the transmitting circuit 110a, the transmitting units 110 (#1 to #4) are arranged side by side, and thus the inductors 2421 to 2424 of the VCOs 112c (#1 to #4) are also arranged side by side. Therefore, magnetic field coupling corresponding to mutual distances between the inductors 2421 to 2424 occurs between the inductors 2421 to 2424.

When there is no phase difference between the data signals 2411 and 2412 of the channels #1 and #2, for example, magnetic field coupling does not occur. The larger the phase difference between the data signals 2411 and 2412 of the channels #1 and #2, the larger the magnetic field coupling that occurs. Then, as the magnetic field coupling occurring between the channels #1 and #2 becomes larger, the VCO gains in the VCOs 112c (#1 and #2) of the channels #1 and #2 change. Changes in the VCO gains may be observed when this magnetic field coupling is at least approximately −60 [dB], for example.

Hence, the phase difference of the data signal 2411 of the channel #1 from the data signal of an adjacent channel (data signal 2412 of the channel #2) may be determined by detecting the VCO gain of the VCO 112c (#1), for example. Similarly, the phase differences of the data signal 2412 of the channel #2 from the data signals of adjacent channels (data signals 2411 and 2413 of the channels #1 and #3) may be determined by detecting the VCO gain of the VCO 112c (#2).

Similarly, the phase differences of the data signal 2413 of the channel #3 from the data signals of adjacent channels (data signals 2412 and 2414 of the channels #2 and #4) may be determined by detecting the VCO gain of the VCO 112c (#3). Similarly, the phase difference of the data signal 2414 of the channel #4 from the data signal of an adjacent channel (data signal 2413 of the channel #3) may be determined by detecting the VCO gain of the VCO 112c (#4).

(Relation Between Signal Phase Difference Between Channels and VCO Gain According to Second Embodiment)

Figure 25:
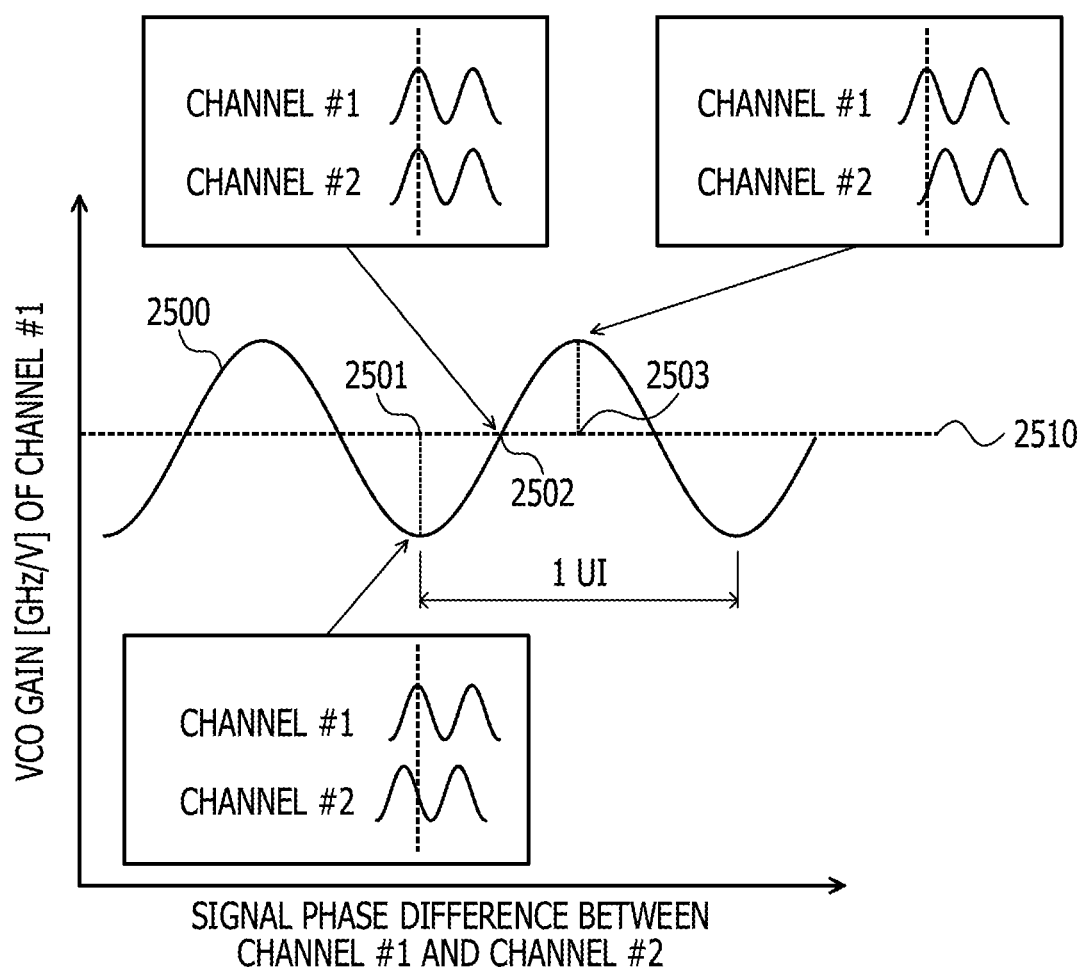
FIG. 25 is a diagram illustrating an example of relation between a signal phase difference between channels and a VCO gain according to the second embodiment.

FIG. 25 is a diagram illustrating an example of relation between a signal phase difference between channels and a VCO gain according to the second embodiment. In FIG. 25, an axis of abscissas indicates the signal phase difference between the channels #1 and #2, and an axis of ordinates indicates the VCO gain [GHz/V] of the VCO 112c (#1) of the channel #1.

A phase difference gain characteristic 2500 represents a characteristic of the VCO gain of the VCO 112c (#1) with respect to the signal phase difference between the channels #1 and #2. As indicated by the phase difference gain characteristic 2500, the VCO gain of the VCO 112c (#1) cyclically changes in a cycle of 1 UI of the data signal in response to changes in the signal phase difference between the channels #1 and #2.

The VCO gain 2510 is the VCO gain of the VCO 112c (#1) in a case where a data edge of the data signal of the channel #1 and a data edge of the data signal of the channel #2 coincide with each other and thus there is no interference caused by magnetic field coupling between the channels #1 and #2.

A signal phase difference 2501 occurs in a state in which the phase of the data signal of the channel #2 is advanced by approximately 90 [°] with respect to the phase of the data signal of the channel #1. In this case, the VCO gain of the VCO 112c (#1) is approximately a minimum value.

A signal phase difference 2502 occurs in a state in which the phase of the data signal of the channel #1 and the phase of the data signal of the channel #2 coincide with each other. In this case, the VCO gain of the VCO 112c (#1) is the VCO gain 2510.

A signal phase difference 2503 occurs in a state in which the phase of the data signal of the channel #2 is delayed by approximately 90 [°] with respect to the phase of the data signal of the channel #1. In this case, the VCO gain of the VCO 112c (#1) is approximately a maximum value.

(VCO Gain Detecting Unit According to Second Embodiment)

Figure 26:
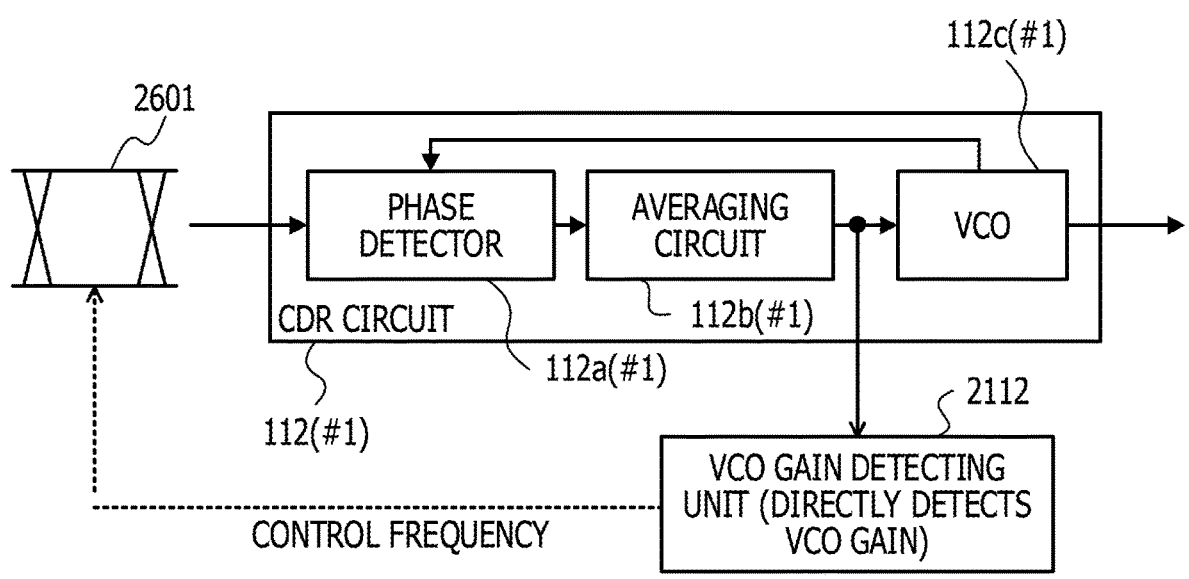
FIG. 26 is a diagram illustrating an example of a VCO gain detecting unit according to the second embodiment.

FIG. 26 is a diagram illustrating an example of a VCO gain detecting unit according to the second embodiment. A data signal 2601 illustrated in FIG. 26 is the data signal input to the CDR circuit 112 (#1) of the channel #1. The VCO gain detecting unit 2112 illustrated in FIG. 26 controls the frequency of the data signal 2601 input to the CDR circuit 112 (#1).

For example, before operation of optical transmission by the optical transmitting device 100, the VCO gain detecting unit 2112 inputs a signal for VCO gain detection as the data signal 2601 to the CDR circuit 112 (#1), and controls the frequency of the signal for VCO gain detection. The signal for VCO gain detection may, for example, be a signal generated randomly, a signal having a fixed pattern, or the like.

In addition, the VCO gain detecting unit 2112 detects the control voltage output from the averaging circuit 112b (#1) to the VCO 112c (#1) while changing the frequency of the data signal 2601. The VCO gain detecting unit 2112 then calculates the VCO gain of the VCO 112c (#1) based on each selected frequency and each detected control voltage.

As described above, the VCO gain of the VCO 112c (#1) is the ratio of the frequency of the reproduced clock output by the VCO 112c (#1) with respect to the control voltage input to the VCO 112c (#1). Accordingly, the VCO gain detecting unit 2112 illustrated in FIG. 26 makes clocks reproduced by using the VCO 112c (#1) for the respective signals of a plurality of frequencies (data signal 2601). The VCO gain detecting unit 2112 then directly detects the VCO gain of the VCO 112c (#1) based on the plurality of frequencies and the respective control voltages input to the VCO 112c (#1) when the clocks are reproduced for the respective signals of the plurality of frequencies. Incidentally, when the VCO gain detecting unit 2112 illustrated in FIG. 26 ends the detection of the VCO gain of each channel, the VCO gain detecting unit 2112 changes the data signal 2601 input to the CDR circuit 112 (#1) to the data signal output from the transmission line loss compensating circuit 111.

While description has been made of detection of the VCO gain of the VCO 112c (#1), a similar description applies also to detection of the VCO gains of the VCOs 112c (#2 to #4).

(Calculation of VCO Gain by VCO Gain Detecting Unit According to Second Embodiment)

Figure 27:
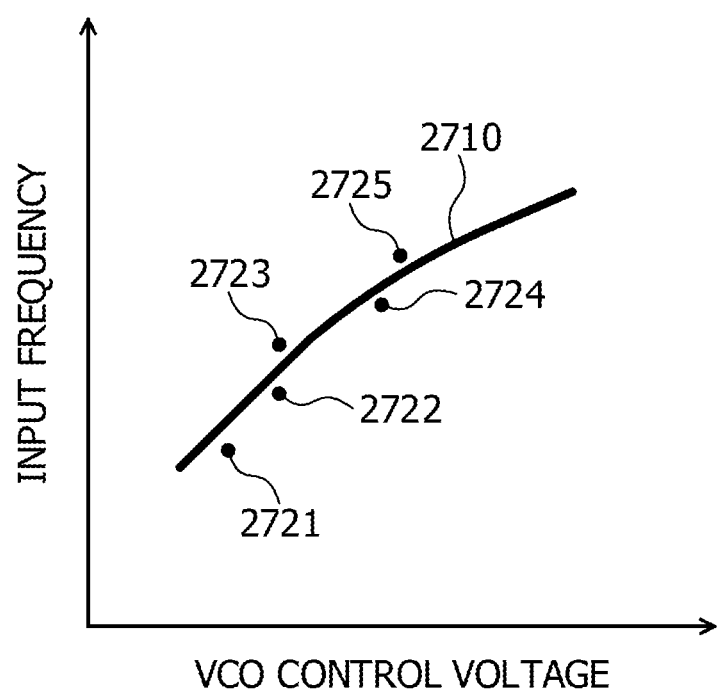
FIG. 27 is a diagram illustrating an example of calculation of a VCO gain by a VCO gain detecting unit according to the second embodiment.

FIG. 27 is a diagram illustrating an example of calculation of a VCO gain by a VCO gain detecting unit according to the second embodiment. In FIG. 27, an axis of abscissas indicates the control voltage (VCO control voltage) output from the averaging circuit 112b (#1) to the VCO 112c (#1), and an axis of ordinates indicates the frequency (input frequency) of the data signal 2601 input to the VCO 112c (#1).

A frequency-voltage characteristic 2710 is a characteristic of the control voltage output from the averaging circuit 112b (#1) to the VCO 112c (#1) with respect to the frequency of the data signal 2601 input to the VCO 112c (#1). When the frequency of the data signal 2601 is changed, the CDR circuit 112 (#1) reproduces a clock signal having the same frequency as the data signal 2601 after the change. Therefore, as indicated by the frequency-voltage characteristic 2710, the control voltage output from the averaging circuit 112b (#1) to the VCO 112c (#1) also changes.

Plotted points 2721 to 2725 are a result of the VCO gain detecting unit 2112 detecting the control voltage input to the VCO 112c (#1) while changing the frequency of the data signal 2601. The VCO gain detecting unit 2112, for example, calculates the slope of the frequency-voltage characteristic 2710 by linear interpolation based on the plotted points 2721 to 2725 or the like.

It is thereby possible to detect the ratio of the frequency of the reproduced clock output by the VCO 112c (#1) with respect to the control voltage input to the VCO 112c (#1), for example, the VCO gain of the VCO 112c (#1). While description has been made of the detection of the VCO gain of the VCO 112c (#1), a similar description applies also to detection of the VCO gains of the VCOs 112c (#2 to #4).

(Another Example of VCO Gain Detecting Unit According to Second Embodiment)

Figure 28:
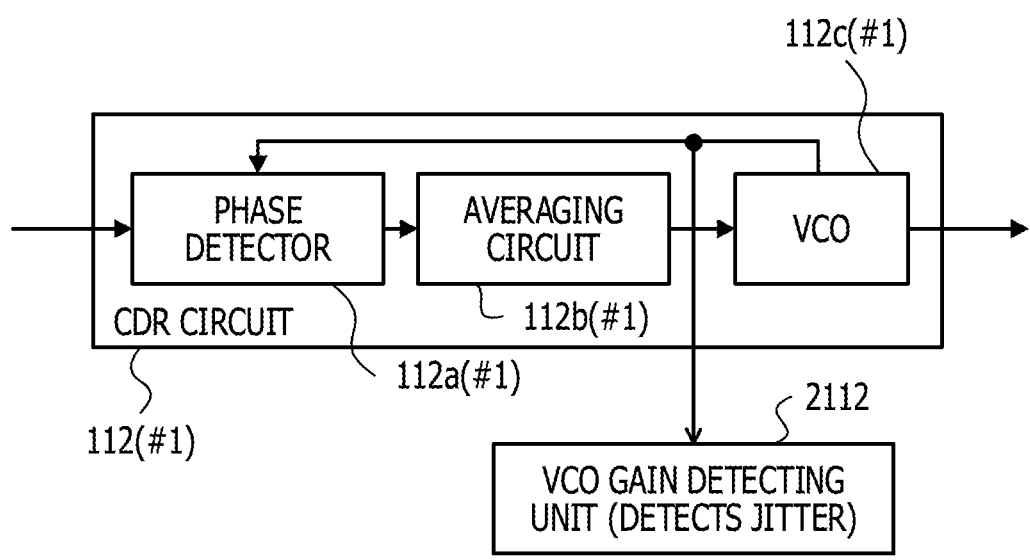
FIG. 28 is a diagram illustrating another example of a VCO gain detecting unit according to the second embodiment.

FIG. 28 is a diagram illustrating another example of a VCO gain detecting unit according to the second embodiment. Based on the reproduced clock fed back from the VCO 112c (#1) to the phase detector 112a (#1), the VCO gain detecting unit 2112 illustrated in FIG. 28 detects the jitter (tracking jitter) of the reproduced clock. The detection of the jitter may be performed by various kinds of methods using period jitter, cycle-to-cycle jitter, and the like.

Then, the VCO gain detecting unit 2112 detects the VCO gain of the VCO 112c (#1) based on the detected jitter and correspondence information between the jitter of the reproduced clock of the CDR circuit 112 (#1) and the VCO gain of the VCO 112c (#1). While description has been made of the detection of the VCO gain of the VCO 112c (#1), a similar description applies also to detection of the VCO gains of the VCOs 112c (#2 to #4).

(Jitter of Reproduced Clock of CDR Circuit According to Second Embodiment)

Figure 29:
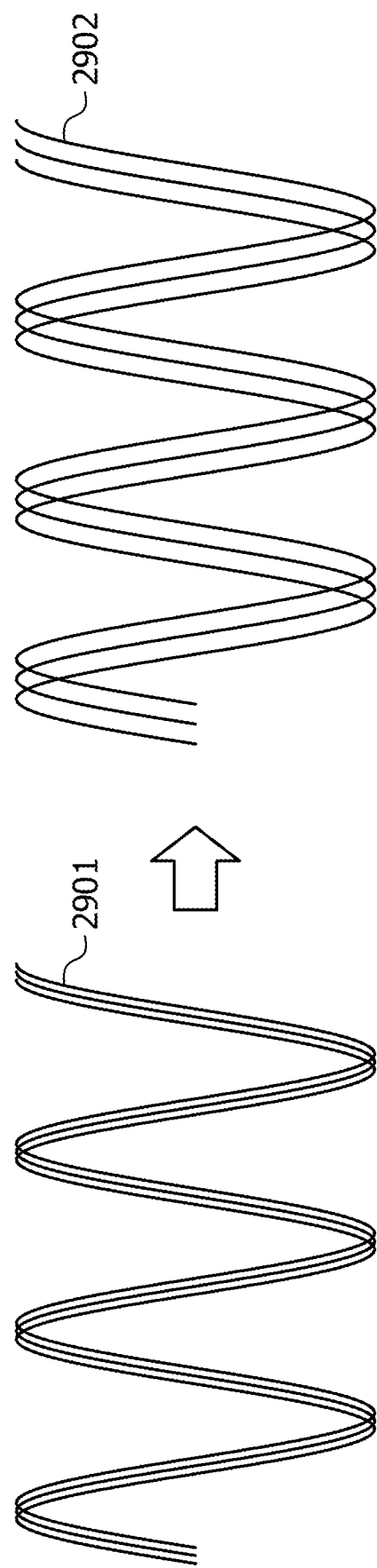
FIG. 29 is a diagram illustrating an example of a jitter of a reproduced clock of a CDR circuit according to the second embodiment.

FIG. 29 is a diagram illustrating an example of a jitter of a reproduced clock of a CDR circuit according to the second embodiment. A reproduced clock 2901 illustrated in FIG. 29 is the reproduced clock of the CDR circuit 112 (#1) in a case where the VCO 112c (#1) has a relatively small VCO gain. A reproduced clock 2902 is the reproduced clock of the CDR circuit 112 (#1) in a case where the VCO 112c (#1) has a relatively large VCO gain.

As indicated by the reproduced clocks 2901 and 2902, when the VCO gain of the VCO 112c (#1) is increased, the jitter of the reproduced clock of the CDR circuit 112 (#1) is also increased. While description has been made of the jitter of the reproduced clock of the CDR circuit 112 (#1), a similar description applies also to the jitters of the reproduced clocks of the CDR circuits 112 (#2 to #4).

(Relation Between Jitter of Reproduced Clock of CDR Circuit and VCO Gain According to Second Embodiment)

Figure 30:
FIG. 30 is a diagram illustrating an example of relation between a jitter of a reproduced clock of a CDR circuit and a VCO gain according to the second embodiment.

FIG. 30 is a diagram illustrating an example of relation between ae jitter of a reproduced clock of a CDR circuit and a VCO gain according to the second embodiment. In FIG. 30, an axis of abscissas indicates the jitter of the reproduced clock of the CDR circuit 112 (#1), and an axis of ordinates indicates the VCO gain of the VCO 112c (#1). A jitter-gain characteristic 3001 is a characteristic of the VCO gain of the VCO 112c (#1) with respect to the jitter of the reproduced clock of the CDR circuit 112 (#1).

As indicated by the jitter-gain characteristic 3001, the larger the VCO gain of the VCO 112c (#1), the larger the jitter of the reproduced clock of the CDR circuit 112 (#1). The memory of the transmitting circuit 110a, for example, stores correspondence information indicating the jitter-gain characteristic 3001. The phase detector 112a detects the VCO gain of the VCO 112c (#1) based on the detected jitter of the reproduced clock of the CDR circuit 112 (#1) and the correspondence information. The correspondence information indicating the jitter-gain characteristic 3001 may, for example, be implemented by a correspondence table, a function, or the like.

Thus, the VCO gain detecting unit 2112 illustrated in FIG. 28 detects the jitter of the reproduced clock of the CDR circuit 112 (#1), and indirectly detects the VCO gain of the VCO 112c (#1) based on the detected jitter and the correspondence information between the jitter and the VCO gain. The detection of the VCO gain may be performed before operation of optical transmission by the optical transmitting device 100, or may be performed during operation of optical transmission by the optical transmitting device 100, for example, in a state in which an actual data signal is input to the CDR circuit 112 (#1).

While description has been made of the detection of the VCO gain of the VCO 112c (#1), a similar description applies also to detection of the VCO gains of the VCOs 112c (#2 to #4).

(Yet Another Example of VCO Gain Detecting Unit According to Second Embodiment)

Figure 31:
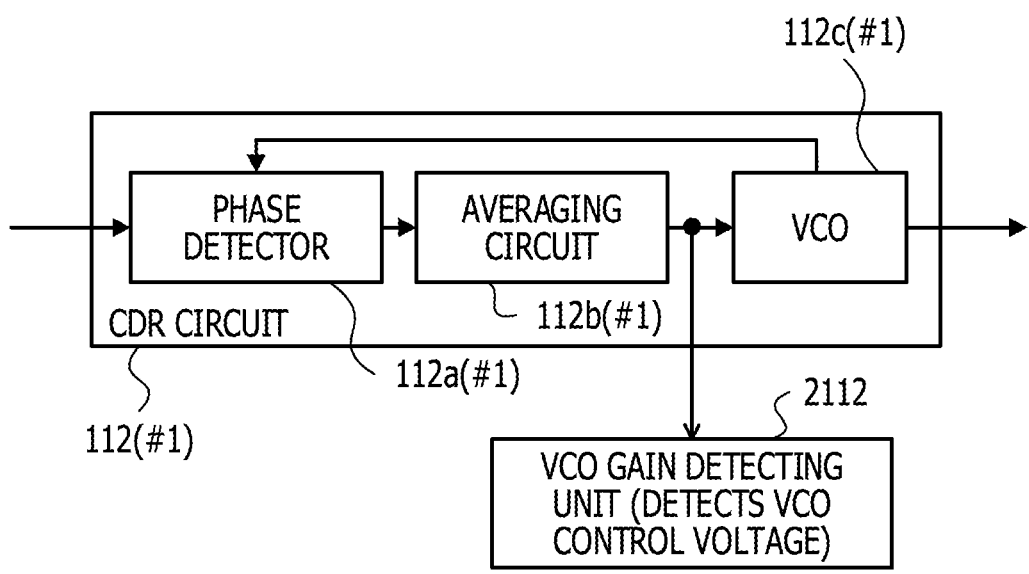
FIG. 31 is a diagram illustrating yet another example of a VCO gain detecting unit according to the second embodiment.

FIG. 31 is a diagram illustrating yet another example of a VCO gain detecting unit according to the second embodiment. The VCO gain detecting unit 2112 illustrated in FIG. 31 detects the control voltage output from the averaging circuit 112b (#1) to the VCO 112c (#1).

Then, the VCO gain detecting unit 2112 detects the VCO gain of the VCO 112c (#1) based on the detected control voltage and correspondence information between the control voltage of the VCO 112c (#1) and the VCO gain of the VCO 112c (#1). While description has been made of the detection of the VCO gain of the VCO 112c (#1), a similar description applies also to detection of the VCO gains of the VCOs 112c (#2 to #4).

(Relation Between Control Voltage of VCO and VCO Gain According to Second Embodiment)

Figure 32:
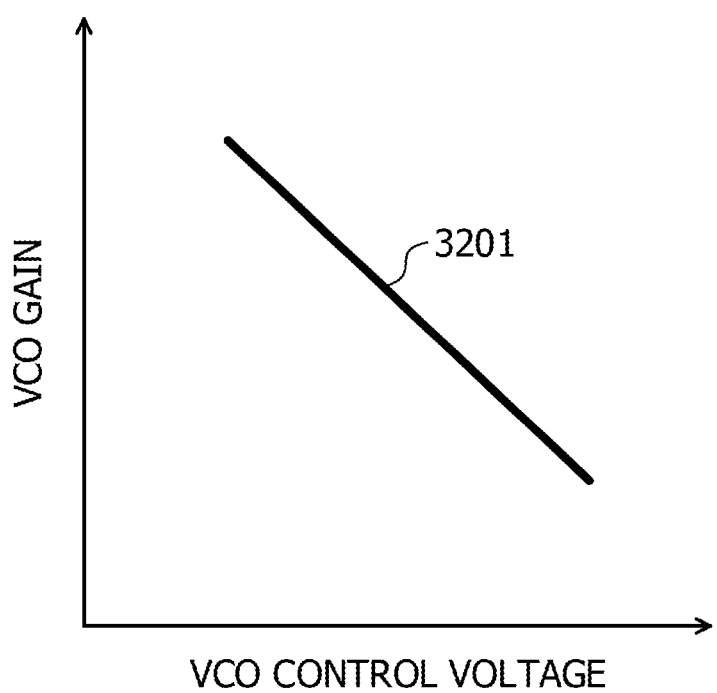
FIG. 32 is a diagram illustrating an example of relation between a control voltage of a VCO and a VCO gain according to the second embodiment.

FIG. 32 is a diagram illustrating an example of relation between a control voltage of a VCO and a VCO gain according to the second embodiment. In FIG. 32, an axis of abscissas indicates the control voltage of the VCO 112c (#1), and an axis of ordinates indicates the VCO gain of the VCO 112c (#1). A voltage-gain characteristic 3201 is a characteristic of the VCO gain of the VCO 112c (#1) with respect to the control voltage of the VCO 112c (#1).

As indicated by the voltage-gain characteristic 3201, the smaller the VCO gain of the VCO 112c (#1), the higher the control voltage of the VCO 112c (#1). This is because the CDR circuit 112 (#1) operates such that the frequency of the reproduced clock signal is a fixed frequency (frequency of the input data signal).

For example, the memory of the transmitting circuit 110a stores correspondence information indicating the voltage-gain characteristic 3201. The phase detector 112a detects the VCO gain of the VCO 112c (#1) based on the detected control voltage of the VCO 112c (#1) and the correspondence information. The correspondence information indicating the voltage-gain characteristic 3201 may, for example, be implemented by a correspondence table, a function, or the like.

Thus, the VCO gain detecting unit 2112 illustrated in FIG. 31 detects the control voltage of the VCO 112c (#1), and indirectly detects the VCO gain of the VCO 112c (#1) based on the detected control voltage and the correspondence information between the control voltage and the VCO gain. The detection of the VCO gain may be performed before operation of optical transmission by the optical transmitting device 100, or may be performed during operation of optical transmission by the optical transmitting device 100, for example, in a state in which an actual data signal is input to the CDR circuit 112 (#1).

While description has been made of the detection of the VCO gain of the VCO 112c (#1), a similar description applies also to detection of the VCO gains of the VCOs 112c (#2 to #4).

(Phase Detection and Control Processing of Optical Transmitting Device According to Second Embodiment)

Figure 33:
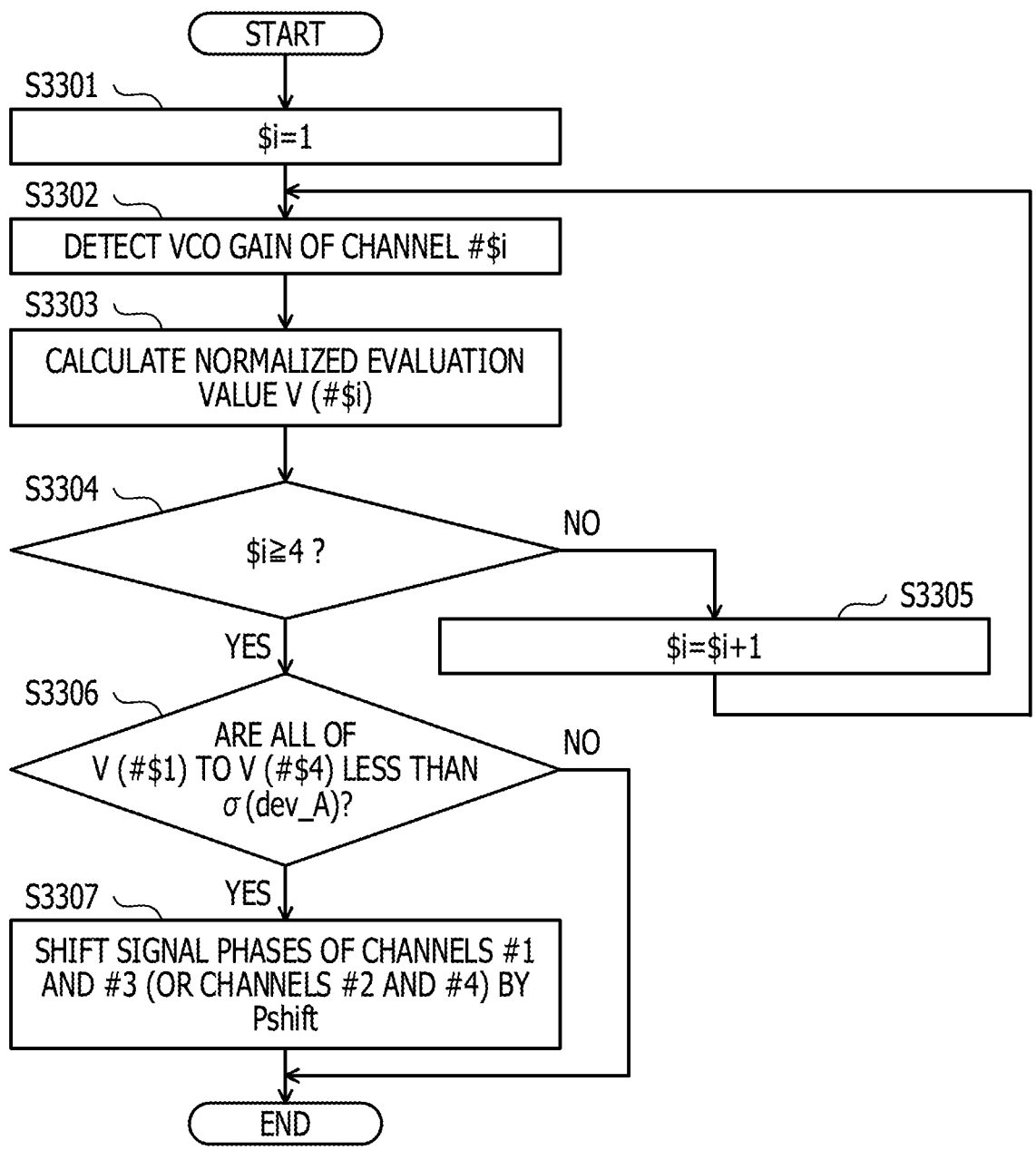
FIG. 33 is a flowchart illustrating an example of phase detection and control processing of an optical transmitting device according to the second embodiment.

FIG. 33 is a flowchart illustrating an example of phase detection and control processing of an optical transmitting device according to the second embodiment. The optical transmitting device 100 according to the second embodiment performs phase detection and control processing illustrated in FIG. 33, for example. The optical transmitting device 100, for example, performs the processing illustrated in FIG. 33 by the VCO gain detecting unit 2112 and the phase shifter control circuit 2113 illustrated in FIG. 21.

First, the optical transmitting device 100 sets one as $i, which is an index stored in the memory of the transmitting circuit 110a and indicates a present evaluation target channel (step S3301). Step S3301 is, for example, performed by the phase shifter control circuit 2113.

Next, the optical transmitting device 100 detects the VCO gain of the VCO 112c of the channel #$i among the VCOs 112c (#1 to #4) based on the present $i (step S3302). The above-described various kinds of detecting methods may be used for the detection of the VCO gain in step S3302. Step S3302 is, for example, performed by the VCO gain detecting unit 2112.

Next, the optical transmitting device 100 calculates a normalized evaluation value V (#$i) for the channel #$i based on the VCO gain detected in step S3302 (step S3303). The normalized evaluation value V (#$i) is an evaluation value indicating the magnitude of an effect of crosstalk for the channel #$i. For example, the normalized evaluation value V (#$i) is an evaluation value assuming a value of zero to one and indicating a larger effect of crosstalk as the evaluation value becomes closer to one. The calculation of the normalized evaluation value V (#$i) will be described later. Step S3303 is, for example, performed by the phase shifter control circuit 2113.

Next, the optical transmitting device 100 determines whether or not $i is equal to or more than four based on the present $i (step S3304). Step S3304 is, for example, performed by the phase shifter control circuit 2113. When $i is not equal to or more than four (step S3304: No), there is a channel for which the normalized evaluation value V (#$i) is not calculated. In this case, the optical transmitting device 100 increments $i (step S3305), and returns to step S3302. Step S3305 is, for example, performed by the phase shifter control circuit 2113.

When $i is equal to or more than four in step S3304 (step S3304: Yes), the normalized evaluation values V (#$i) are already calculated for all of the channels. In this case, the optical transmitting device 100 determines whether or not all of the normalized evaluation values V (#$1) to V (#$4) are less than a given threshold value σ (dev_A) (step S3306). Step S3306 is, for example, performed by the phase shifter control circuit 2113. The threshold value a (dev_A) is a threshold value for determining the occurrence of the worst phase by comparison with the normalized evaluation value V (#$i). The threshold value a (dev_A) may be set at 0.2 as an example.

When at least one of the normalized evaluation values V (#$1) to V (#$4) is not less than the threshold value σ (dev_A) in step S3306 (step S3306: No), the above-described worst phase has not occurred in the channels #1 to #4. In this case, the optical transmitting device 100 ends the series of phase detection and control processing without performing phase control between the channels.

When all of the normalized evaluation values V (#$1) to V (#$4) are less than the threshold value σ in step S3306 (step S3306: Yes), there is a possibility of occurrence of the above-described worst phase in the channels #1 to #4. In this case, the optical transmitting device 100 performs phase control that shifts the signal phases of the channels #1 and #3 by Pshift (step S3307). The optical transmitting device 100 then ends the series of phase detection and control processing.

Pshift is a shift amount for resolving the worst phase from the state of the above-described worst phase, and is, for example, equal to or less than a shift amount corresponding to ¼ of the UI of the data signals. Step S3307 resolves the worst phase when the worst phase has occurred. Step S3307 is, for example, performed by the phase shifter control circuit 2113 by changing shift amounts for the phases of the reproduced clocks in the variable phase shifters 2111 (#1 and #3) by Pshift.

Alternatively, in step S3307, the optical transmitting device 100 may perform phase control of shifting the signal phases of the channels #2 and #4 by Pshift. The worst phase is thereby resolved when the worst phase has occurred. In this case, step S3307 is, for example, performed by the phase shifter control circuit 2113 by changing shift amounts for the phases of the reproduced clocks in the variable phase shifters 2111 (#2 and #4) by Pshift.

The normalized evaluation value V (#$i) calculated in step S3303 will be described. In step S3303, the optical transmitting device 100, for example, calculates the normalized evaluation value V (#$i) of the channel #$i by the following Equation (1).

$$\text{Normalized Evaluation Value } V(\#\$i) = \text{ABS}(Kvco\_ch\#i - Kdef\_ch\#i)/Vmax\_ch\#i \quad (1)$$

In the above Equation (1), ABS(X) denotes the absolute value of X. Kvco_ch#i is the VCO gain detected in step S3302 for the channel #i. Kdef_ch#i is the VCO gain in the best state for the channel #i. The best state of the channel #i is a state in which there is no effect of crosstalk on the channel #i. Kdef_ch#i is, for example, obtained by calculation in advance, and is stored in the memory of the transmitting circuit 110a. Alternatively, Kdef_ch#i may be measured in advance in conditions in which no crosstalk occurs, and stored in the memory of the transmitting circuit 110a.

Vmax_ch#i is the normalized evaluation value V in the worst state for the channel #i. The worst state of the channel #i is a state in which the above-described worst phase has occurred and the channel #i is a victim. Vmax_ch#i is, for example, obtained by calculation in advance, and is stored in the memory of the transmitting circuit 110a. As an example, the following may be obtained: Vmax_ch#1=0.5, Vmax_ch#2=1, Vmax_ch#3=1, and Vmax_ch#4=0.5. Alternatively, Kdef_ch#i may be measured in advance in conditions in which no crosstalk occurs, and stored in the memory of the transmitting circuit 110a.

It is possible to calculate, by the above Equation (1), the normalized evaluation value V (#$i) that assumes a value of zero to one and becomes closer to one as the effect of crosstalk in the channel #i is increased.

(VCO Gains in Best State and Normalized Evaluation Values in Worst State, VCO Gains and Normalized Evaluation Values being Stored by Optical Transmitting Device According to Second Embodiment)

FIG. 34 is a diagram illustrating an example of VCO gains in a best state and normalized evaluation values in a worst state, the VCO gains and the normalized evaluation values being stored by an optical transmitting device according to the second embodiment. The memory of the transmitting circuit 110a, for example, stores a table 3400 illustrated in FIG. 34. The table 3400 illustrates the VCO gain in the best state and the normalized evaluation value in the worst state for each of the channels #1 to #4.

For example, Kdef_ch#1 to Kdef_ch#4 are VCO gains in the best state for the respective channels #1 to #4. Vmax_ch#1 to Vmax_ch#4 are normalized evaluation values V in the worst state for the respective channels #1 to #4. For example, for the channel #i, the optical transmitting device 100 calculates the normalized evaluation value V (#$i) based on the detected VCO gain of the channel #i, Kdef_ch#i and Vmax_ch#i in the table 3400, and the above Equation (1).

(Another Example of VCO Gains in Best State and Normalized Evaluation Values in Worst State, VCO Gains and Normalized Evaluation Values being Stored by Optical Transmitting Device According to Second Embodiment)

Figure 35:
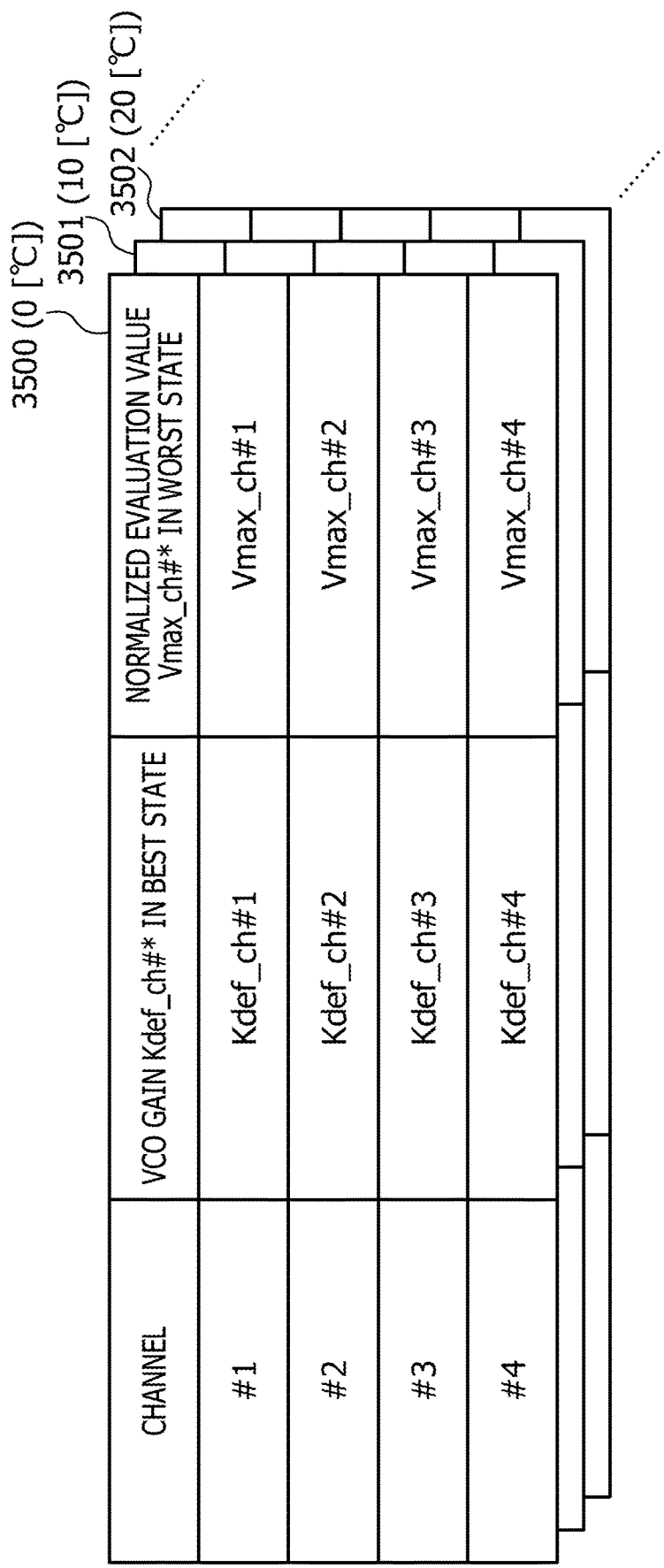
FIG. 35 is a diagram illustrating another example of VCO gains in a best state and normalized evaluation values in a worst state, the VCO gains and the normalized evaluation values being stored by an optical transmitting device according to the second embodiment.

FIG. 35 is a diagram illustrating another example of VCO gains in a best state and normalized evaluation values in a worst state, the VCO gains and the normalized evaluation values being stored by an optical transmitting device according to the second embodiment. The memory of the transmitting circuit 110a may, for example, store tables 3500, 3501, 3502, . . . illustrated in FIG. 35.

The table 3500 illustrates the VCO gain in the best state and the normalized evaluation value in the worst state for each channel in a case where the temperature of the transmitting circuit 110a is 0 [° C.]. The table 3501 illustrates the VCO gain in the best state and the normalized evaluation value in the worst state for each channel in a case where the temperature of the transmitting circuit 110a is 10 [° C.]. The table 3502 illustrates the VCO gain in the best state and the normalized evaluation value in the worst state for each channel in a case where the temperature of the transmitting circuit 110a is 20 [° C.].

For example, because the respective VCO gains of the VCOs 112c (#1 to #4) change according to the temperature of the transmitting circuit 110a, correspondence information similar to the table 3400 illustrated in FIG. 34 is stored for each temperature of the transmitting circuit 110a.

In this case, the optical transmitting device 100 includes a temperature measuring unit that measures the temperature of the transmitting circuit 110a, for example. The temperature measuring unit may, for example, be integrated on a chip of the transmitting circuit 110a, or may be disposed in the vicinity of the chip of the transmitting circuit 110a.

The optical transmitting device 100 identifies a temperature closest to the temperature measured by the temperature measuring unit among 0 [° C.], 10 [° C.], 20 [° C.], . . . . Alternatively, the optical transmitting device 100 may identify a temperature obtained by subjecting the temperature measured by the temperature measuring unit to fraction processing (for example, truncating the temperature measured by the temperature measuring unit to a multiple of 10) among 0 [° C.], 10 [° C.], 20 [° C.], . . .

Then, the optical transmitting device 100 may calculate the above-described normalized evaluation value V (#$i) based on the table corresponding to the identified temperature among the stored tables 3500, 3501, 3502, . . . . It is thereby possible to calculate the normalized evaluation value V (#$i) accurately indicating an effect of crosstalk according to the temperature of the transmitting circuit 110a, and thus suppress the effect of crosstalk between channels accurately.

(Optical Module to which Optical Transmitting Device According to Second Embodiment is Applied)

Figure 36:
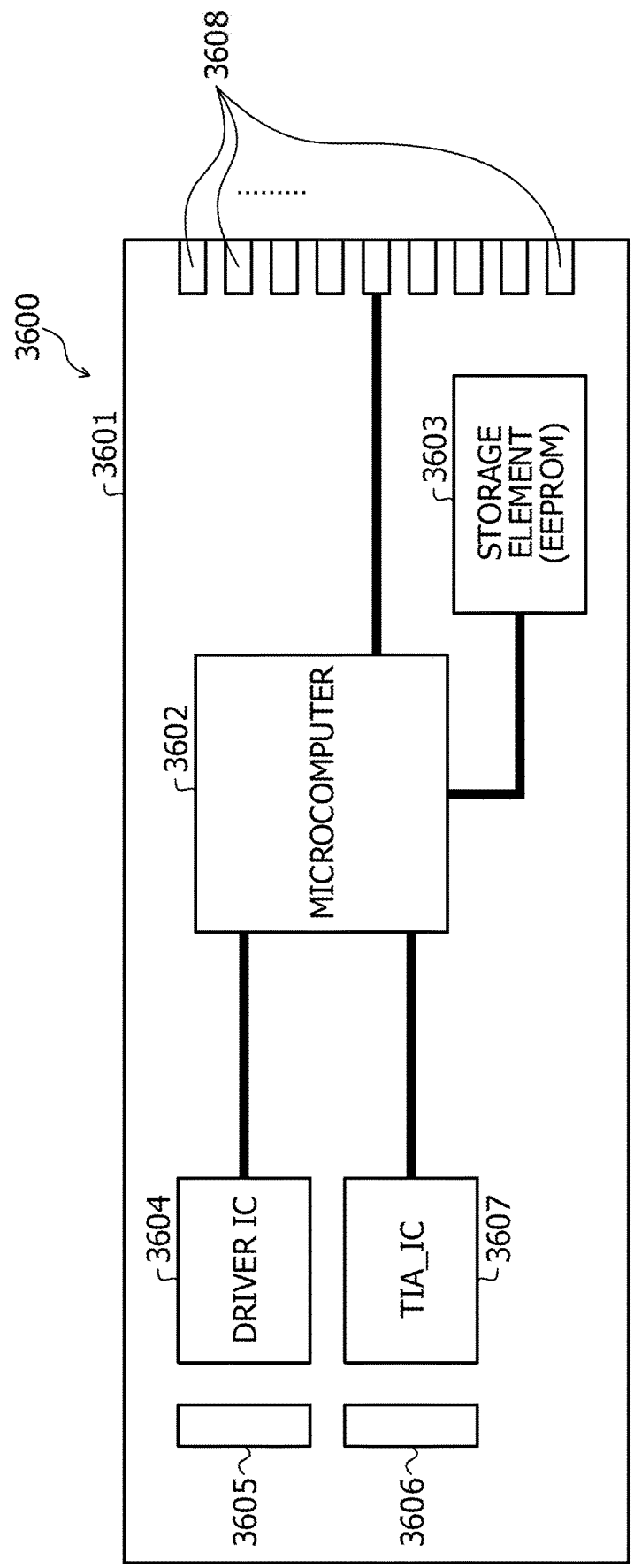
FIG. 36 is a diagram illustrating an example of an optical module to which an optical transmitting device according to the second embodiment is applied.

FIG. 36 is a diagram illustrating an example of an optical module to which an optical transmitting device according to the second embodiment is applied. The optical transmitting device 100 according to the second embodiment may be applied to an optical module 3600 illustrated in FIG. 36, for example.

The optical module 3600 includes a microcomputer 3602, a storage element 3603, a driver integrated circuit (IC) 3604, a light emitting element 3605, a light receiving element 3606, a TIA_IC 3607, and a card edge electric connector 3608 on a board 3601. The optical module 3600 is a QSFP module as an example. QSFP is an abbreviation of Quad Small Form-factor Pluggable. The board 3601 is, for example, a PCB (Printed Circuit Board: printed board).

The microcomputer 3602 outputs an alarm signal such as LOS information or the like within an IC (for example, the driver IC 3604 or the TIA_IC 3607) of the optical module 3600 to the outside during normal operation of the optical module 3600. LOS is an abbreviation of Loss Of Signal (input interruption). In addition, the microcomputer 3602 outputs, to the outside, information on reception optical power or the like such as RSSI or the like measured for a received signal obtained by the TIA_IC 3607 to be described later. RSSI is an abbreviation of Received Signal Strength Indicator (received signal strength). The outside is a device connected to the optical module 3600 by the card edge electric connector 3608 to be described later.

In addition, the microcomputer 3602 may make setting changes in the driver IC 3604 and the TIA_IC 3607 or the like according to the temperature measured by a temperature measuring unit provided to the optical module 3600. A control line of an inter-integrated circuit (I2C) interface or the like, for example, is used for communication of the microcomputer 3602 with the storage element 3603, the driver IC 3604, the TIA_IC 3607, the outside of the optical module 3600, and the like.

The storage element 3603 is coupled to the microcomputer 3602. The storage element 3603 stores various kinds of information. As an example, an EEPROM may be used as the storage element 3603. EEPROM is an abbreviation of Electrically Erasable Programmable Read Only Memory. The driver IC 3604 is a driving circuit that generates a driving signal for the light emitting element 3605 and outputs the generated driving signal to the light emitting element 3605. The light emitting element 3605 transmits an optical signal corresponding to the driving signal output from the driver IC 3604 to an opposite device of the optical module 3600.

The light receiving element 3606 converts an optical signal transmitted from the opposite device of the optical module 3600 into an electric signal, and outputs the converted electric signal as a received signal to the TIA_IC 3607. The TIA_IC 3607 converts the received signal output from the light receiving element 3606 from a current signal to a voltage signal. The card edge electric connector 3608 is a connector for making electric connection between the optical module 3600 and the external device.

In addition, the optical module 3600 may support optical transmission on a plurality of channels in both transmission and reception. Provided in this case are a number of combinations of the driver IC 3604 and the light emitting element 3605, the number corresponding to the number of channels on a transmitting side (for example, four). Also provided are a number of combinations of the light receiving element 3606 and the TIA_IC 3607, the number corresponding to the number of channels on a receiving side (for example, four).

The transmitting circuit 110a illustrated in FIG. 21 may be implemented by the driver IC 3604, for example. The light emitting elements 121 to 124 illustrated in FIG. 21 may, for example, be implemented by the light emitting element 3605. In addition, the VCO gain detecting unit 2112 and the phase shifter control circuit 2113 illustrated in FIG. 21 may, for example, be implemented by the microcomputer 3602 and the storage element 3603.

In this case, the microcomputer 3602 detects the respective VCO gains of the channels #1 to #4 by monitoring the CDR circuits 112 (#1 to #4) included in the driver IC 3604, for example. In addition, the microcomputer 3602 controls the phase shifter control circuits 2113 (#1 to #4) included in the driver IC 3604 based on detection results of the respective VCO gains. In addition, the table 3400 illustrated in FIG. 34 or the tables 3500, 3501, 3502, . . . illustrated in FIG. 35 are stored in the storage element 3603, for example.

In addition, the optical module 3600 may, for example, be applied to the first optical transmission device 2010 illustrated in FIG. 20. In this case, the driver IC 3604 is included in the transmitting circuit 2011 illustrated in FIG. 20, and the light emitting element 3605 corresponds to the light emitting element 2012a illustrated in FIG. 20.

In addition, the optical module 3600 may be applied to the second optical transmission device 2030 illustrated in FIG. 20, for example. In this case, the light receiving element 3606 corresponds to the light receiving element 2031c illustrated in FIG. 20, and the TIA_IC 3607 is included in the receiving circuit 2032 illustrated in FIG. 20.

In addition, in a configuration in which optical signals are bidirectionally transmitted between the first optical transmission device 2010 and the second optical transmission device 2030 illustrated in FIG. 20 as described above, the optical module 3600 may be applied to each of the first optical transmission device 2010 and the second optical transmission device 2030.

(Reduction of Crosstalk in Optical Transmitting Device According to Second Embodiment)

Figure 37:
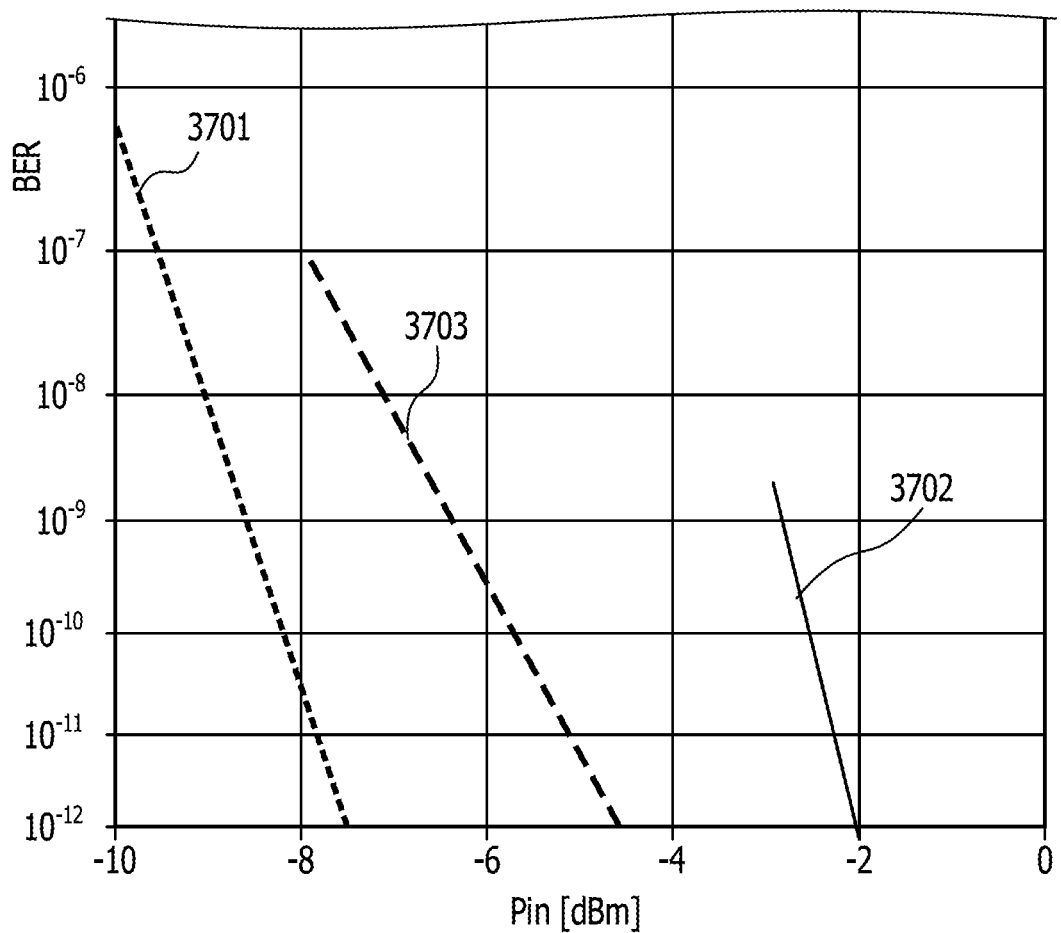
FIG. 37 is a diagram illustrating an example of reduction of crosstalk in an optical transmitting device according to the second embodiment.

FIG. 37 is a diagram illustrating an example of reduction of crosstalk in an optical transmitting device according to the second embodiment. In FIG. 37, as in FIG. 18, an axis of abscissas indicates reception power Pin [dBm] in an optical receiving device receiving optical signals transmitted by the optical transmitting device 100, and an axis of ordinates indicates BER in the optical receiving device with regard to the optical signals transmitted by the optical transmitting device 100. As in the example illustrated in FIG. 18, suppose here that the optical transmitting device 100 performs optical transmission at 28×4=112 [Gbps] by transmitting optical signals of 28 [Gbps] from the light emitting elements 121 to 124, respectively.

A reception power BER characteristic 3701 represents relation between the reception power and the BER in the optical receiving device in the above-described best state. A reception power BER characteristic 3702 represents relation between the reception power and the BER in the optical receiving device in the above-described worst state (state in which the worst phase has occurred). A reception power BER characteristic 3703 represents relation between the reception power and the BER in the optical receiving device in a case where the worst state is resolved by the phase detection and control processing described above.

As indicated by the reception power BER characteristic 3701, in the best state, there is a small crosstalk between channels, and therefore the reception power at a BER of $10^{-12}$ is relatively low at approximately −7.6 [dBm].

In addition, as indicated by the reception power BER characteristic 3702, in the worst state, the reception power at the BER of $10^{-12}$ is relatively high at approximately −2 [dBm]. This indicates a large effect of crosstalk between channels.

On the other hand, as indicated by the reception power BER characteristic 3703, the reception power at the BER of $10^{-12}$ becomes relatively low at approximately −4.7 [dBm] when the optical transmitting device 100 resolves the worst phase by performing the phase detection and control processing described above. This indicates that the phase detection and control processing described above suppresses an effect of crosstalk between channels. For example, an effect of an improvement of approximately 6 [dB] (four times) at a maximum may be obtained by resolving the worst phase.

As illustrated in FIG. 37, the phase detection and control processing of the optical transmitting device 100 may suppress an effect of crosstalk between channels in high-speed optical transmission using four channels. It is therefore possible to improve transmission and reception performance of an optical interconnect or the like to which the optical transmitting device 100 is applied, for example. Hence, robustness is increased against, for example, process variations and variations in environmental aspects such as temperature, power supply voltage, and the like, and improvements in a transmission speed and a transmission distance may be achieved.

(Comparison Between Best State and Worst State in Optical Transmitting Device According to Second Embodiment)

Figure 38:
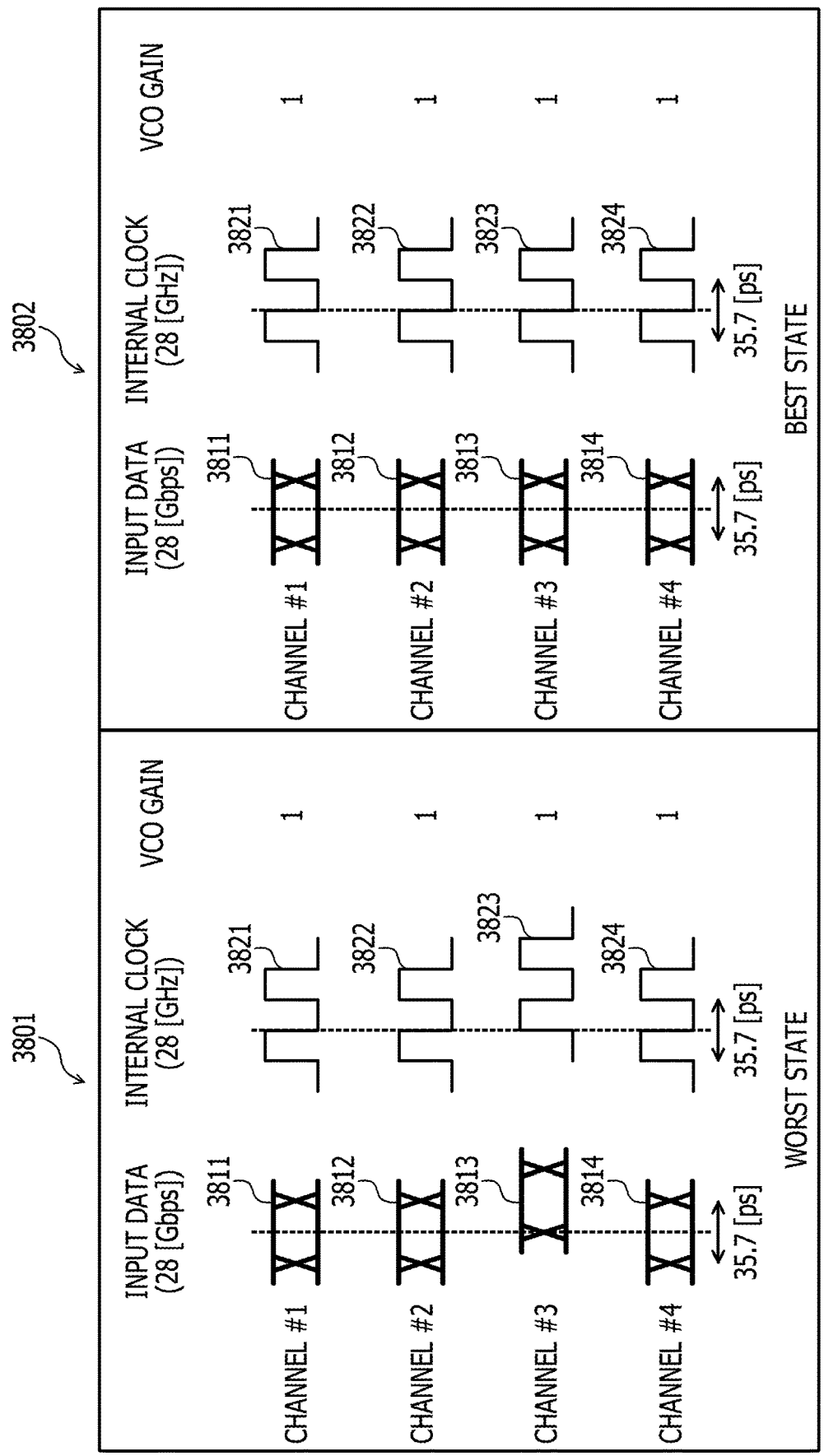
FIG. 38 is a diagram illustrating an example of comparison between a best state and a worst state in an optical transmitting device according to the second embodiment.

FIG. 38 is a diagram illustrating an example of comparison between a best state and a worst state in an optical transmitting device according to the second embodiment. Input data 3811 to 3814 illustrated in FIG. 38 represents, by eye patterns, data signals of 28 [Gbps] (cycles of 35.7 [ps]) input to the transmitting units 110 (#1 to #4) of the channels #1 to #4, respectively. Internal clocks 3821 to 3824 are reproduced clocks having cycles of 35.7 [ps] which clocks are reproduced by the CDR circuits 112 (#1 to #4) of the transmitting units 110 (#1 to #4) of the channels #1 to #4, respectively.

A worst state 3801 is an example of the worst state in which the above-described worst phase has occurred in the channels #2 to #4. For example, about an eye center of the central input data 3813 of the input data 3812 to 3814 and data edges of the input data 3812 and 3814 on both sides of the central input data 3813 have same timing. Detection results of the VCO gains for the channels #1 to #4 in the worst state 3801 are all one, for example.

A best state 3802 is an example of the best state in which there is a small effect of crosstalk in the channels #1 to #4. For example, the respective signal phases of the input data 3811 to 3814 are the same. Detection results of the VCO gains for the channels #1 to #4 in the best state 3802 are all one, for example.

Hence, with the detection results of the VCO gains for the channels #1 to #4, calculation results of the normalized evaluation values V (#1 to #4) are the same, and thus it is difficult to distinguish the worst state 3801 and the best state 3802 from each other. This results from a fact that the respective data edges (rising edges or falling edges) of the input data 3811 to 3814 in the worst state 3801 and the best state 3802 coincide with one another.

On the other hand, the processing illustrated in FIG. 33 does not distinguish the worst state 3801 and the best state 3802 from each other, and performs the phase control of step S3307 in each of the worst state 3801 and the best state 3802. Thus, when the worst state 3801 has occurred, the worst state 3801 may be resolved, and consequently an effect of crosstalk between channels on transmission quality may be suppressed.

Thus, according to the optical transmitting device 100 in accordance with the second embodiment, phase differences between the respective data signals (driving signals) output by the transmitting units 110 (#1 to #4) may be controlled based on the detection results of the VCO gains of the VCOs 112c (#1 to #4). It is thereby possible to adjust relative phases between the data signals of the respective channels, and consequently suppress an effect of crosstalk between channels on transmission quality.

In addition, the optical transmitting device 100 according to the second embodiment controls the phase differences between the respective data signals before being identified and reproduced by the 0/1 determining circuits 113 (#1 to #4) of the transmitting units 110 (#1 to #4) and being amplified by the output drivers 115 (#1 to #4). It is thereby possible to suppress an effect produced on transmission quality by crosstalk between channels in the output drivers 115 (#1 to #4) where a large crosstalk tends to occur between channels.

In addition, according to the optical transmitting device 100 in accordance with the second embodiment, the VCO gains may be detected based on at least either the control voltages input to the VCOs 112c (#1 to #4) or the clocks output by the VCOs 112c (#1 to #4). Thus, relative phases between the data signals of the respective channels may be adjusted based on the VCO gains detected by using existing VCOs 112c (#1 to #4), for example. Therefore, an effect of crosstalk between channels on transmission quality may be suppressed even when the respective configurations of the phase comparator 116 and the like illustrated in FIG. 3, for example, are not provided. Hence, changes in circuit parts, for example, may be reduced.

For example, as illustrated in FIG. 26 and FIG. 27, the optical transmitting device 100 makes clocks reproduced for the respective signals of a plurality of frequencies by using the VCO 112c in each of the CDR circuits 112 (#1 to #4). The optical transmitting device 100 may then detect the VCO gain based on the plurality of frequencies and respective control voltages input to the VCO 112c when the clocks are reproduced for the respective signals of the plurality of frequencies.

Alternatively, as illustrated in FIGS. 28 to 30, the optical transmitting device 100 may detect the VCO gains based on the jitters of the clocks output by the VCOs 112c (#1 to #4) and the correspondence information between the jitters of the clocks and the gains of the VCOs 112c (#1 to #4). Alternatively, as illustrated in FIG. 31 and FIG. 32, the optical transmitting device 100 may detect the VCO gains based on the control voltages input to the VCOs 112c (#1 to #4) and the correspondence information between the control voltages and the gains of the voltage-controlled oscillators. Alternatively, the optical transmitting device 100 may detect the VCO gains by combinations of the above-described methods.

In addition, for each of the transmitting units 110 (#1 to #4), the optical transmitting device 100 according to the second embodiment calculates an evaluation value based on a difference between a detection result of the gain of the VCO 112c and a reference gain of the VCO 112c. The reference gain is, for example, the VCO gain in the above-described best state. The evaluation value is, for example, the above-described normalized evaluation value. The optical transmitting device 100 then controls phase differences between the data signals based on each calculated evaluation value. It is thereby possible to adjust relative phases between the data signals of the respective channels using the evaluation value indicating variation in the VCO gain which variation is caused by crosstalk for each channel, and consequently suppress an effect of crosstalk between channels on transmission quality.

It is to be noted that while description has been made of a case where the optical transmitting device 100 is a transmitting device of four channels in the second embodiment, the number of channels accommodated by the optical transmitting device 100 is not limited to four. For example, the optical transmitting device 100 may be a transmitting device of eight channels or more.

In addition, while description has been made of the optical transmitting device 100 transmitting optical signals, the second embodiment is applicable also to an optical receiving device receiving optical signals. For example, the receiving circuit 2032 of the second optical transmission device 2030 illustrated in FIG. 20 may be provided with a circuit similar to the transmitting circuit 110a illustrated in FIG. 21.

In this case, however, the transmission line loss compensating circuits 111 (#1 to #4) are supplied with data signals obtained when the opto-electric conversion modules 2031 of the channels #1 to #4 receive the optical signals of the channels #1 to #4 which optical signals are transmitted by the first optical transmission device 2010. In addition, the output drivers 115 (#1 to #4) amplify the data signals output from the 0/1 determining circuits 113 (#1 to #4), respectively, and output the amplified data signals to the computer 32. It is thereby possible to suppress an effect of crosstalk between channels on transmission quality of the data signals of the respective channels which data signals are output to the computer 32 by the second optical transmission device 2030.

(Third Embodiment)

A third embodiment will be described with regard to parts different from those of the second embodiment. In the third embodiment, a configuration will be described which may distinguish the worst state 3801 and the best state 3802 illustrated in FIG. 38 from each other, resolve the worst state 3801 in the case of the worst state 3801, and maintain the best state 3802 in the case of the best state 3802.

(CDR Circuits Included in Optical Transmitting Device According to Third Embodiment)

Figure 39:
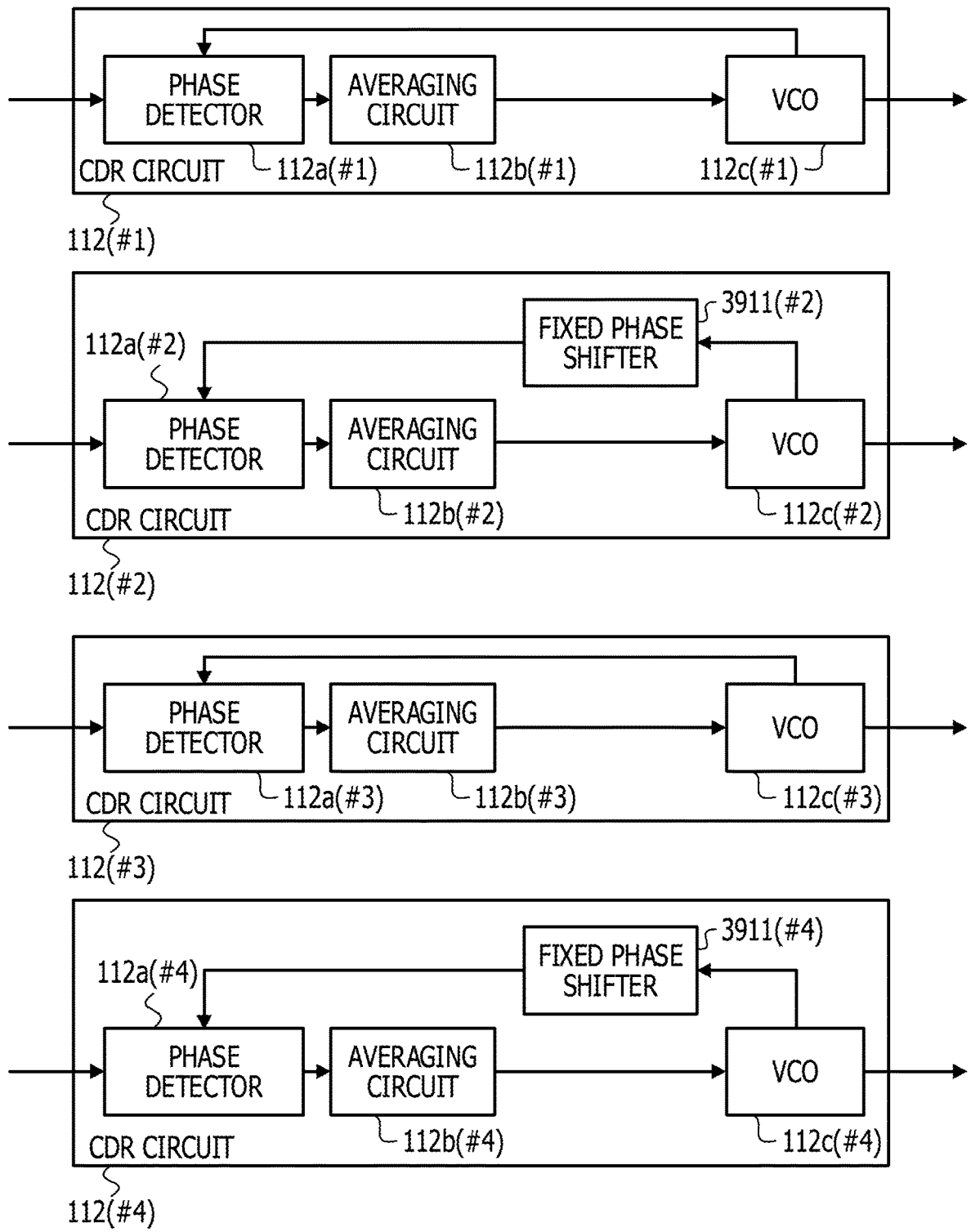
FIG. 39 is a diagram illustrating an example of CDR circuits included in an optical transmitting device according to a third embodiment.

FIG. 39 is a diagram illustrating an example of CDR circuits included in an optical transmitting device according to the third embodiment. In FIG. 39, parts similar to the parts illustrated in FIG. 21 are identified by the same reference numerals, and description thereof will be omitted. As illustrated in FIG. 39, the optical transmitting device 100 according to the third embodiment includes a fixed phase shifter 3911 (#2) in the CDR circuit 112 (#2) in addition to the configuration illustrated in FIG. 21. The fixed phase shifter 3911 (#2) delays the phase of the reproduced clock fed back from the VCO 112c (#2) to the phase detector 112a (#2) by ¼ of the UI of the data signal.

In addition, the optical transmitting device 100 according to the third embodiment includes a fixed phase shifter 3911 (#4) in the CDR circuit 112 (#4) in addition to the configuration illustrated in FIG. 21. The fixed phase shifter 3911 (#4) delays the phase of the reproduced clock fed back from the VCO 112c (#4) to the phase detector 112a (#4) by ¼ of the UI of the data signal.

On the other hand, the CDR circuits 112 (#1 and #3) do not include a fixed phase shifter corresponding to the fixed phase shifters 3911 (#2 and #4) of the CDR circuits 112 (#2 and #4), but have a configuration similar to that illustrated in FIG. 21, for example. For example, the optical transmitting device 100 includes the fixed phase shifters 3911 (#2 and #4) that provide different delay amounts to the reproduced clocks of respective channels adjacent to each other among the channels #1 to #4.

Consequently, the combination of the VCO gains detected for the channels #1 to #4 may be made to differ between the worst state 3801 and the best state 3802 illustrated in FIG. 38, for example. Hence, it is possible to distinguish the worst state 3801 and the best state 3802 from each other, resolve the worst state 3801 in the case of the worst state 3801, and maintain the best state 3802 in the case of the best state 3802.

(Phase Detection and Control Processing of Optical Transmitting Device According to Third Embodiment)

Figure 40:
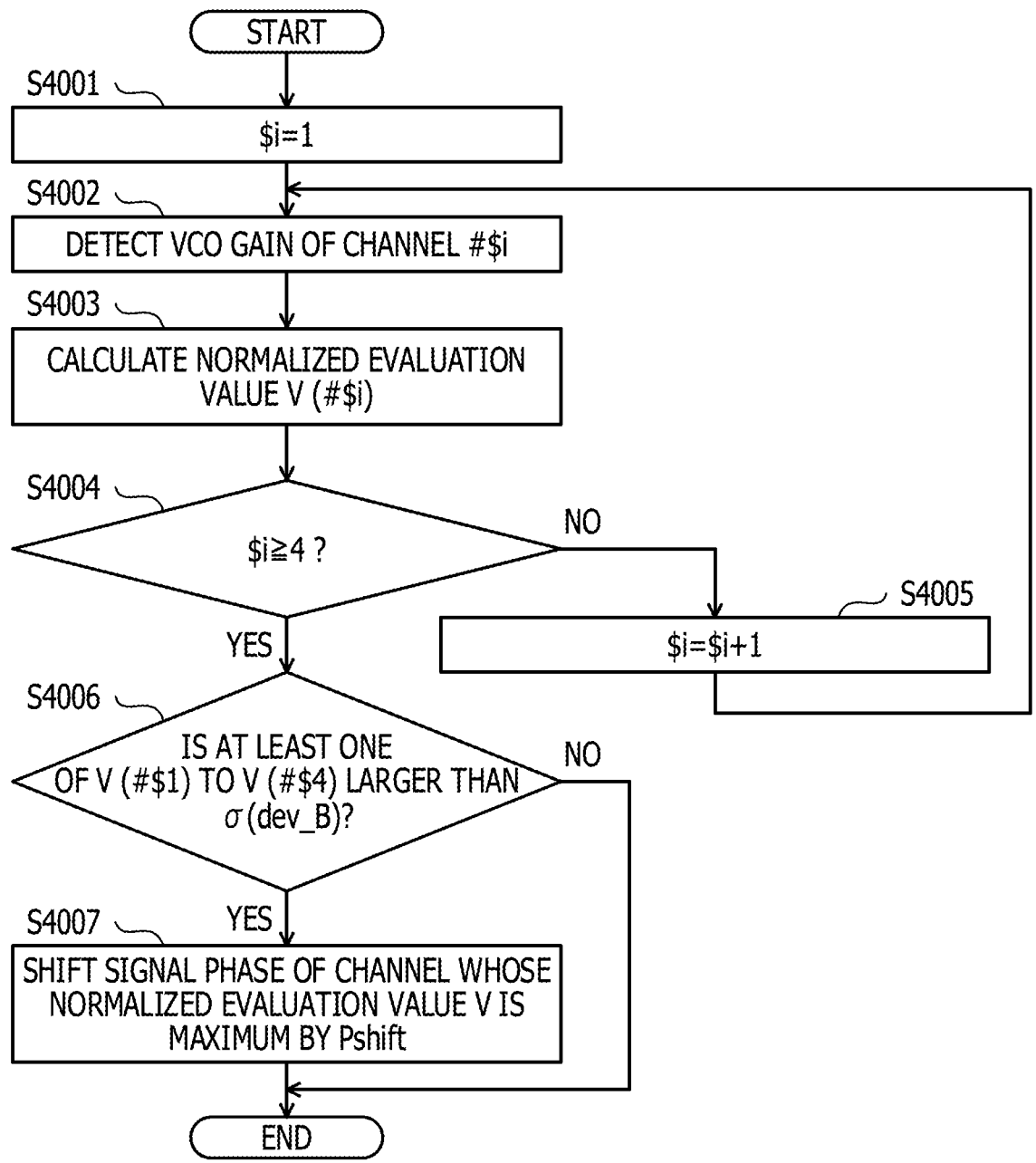
FIG. 40 is a flowchart illustrating an example of phase detection and control processing of an optical transmitting device according to the third embodiment.

FIG. 40 is a flowchart illustrating an example of phase detection and control processing of an optical transmitting device according to the third embodiment. The optical transmitting device 100 according to the third embodiment, for example, performs processing illustrated in FIG. 40. For example, the optical transmitting device 100 performs processing illustrated in FIG. 40 by the VCO gain detecting unit 2112 and the phase shifter control circuit 2113 illustrated in FIG. 21.

Steps S4001 to S4005 illustrated in FIG. 40 are similar to steps S3301 to S3305 illustrated in FIG. 33. In step S4004, when $i is equal to or more than four (step S4004: Yes), the optical transmitting device 100 proceeds to step S4006.

For example, the optical transmitting device 100 determines whether or not at least one of the normalized evaluation values V (#$1) to V (#$4) calculated in step S4003 is larger than a given threshold value σ (dev_B) (step S4006). Step S4006 is, for example, performed by the phase shifter control circuit 2113. The threshold value a (dev_B) is a threshold value for determining the occurrence of the worst phase by comparison with the normalized evaluation value V (#$i). The threshold value a (dev_B) may be set at 0.8, as an example.

When all of the normalized evaluation values V (#$1) to V (#$4) are equal to or less than the threshold value a (dev_B) in step S4006 (step S4006: No), the above-described worst phase has not occurred in the channels #1 to #4. In this case, the optical transmitting device 100 ends the series of processing without performing phase control between the channels.

When at least one of the normalized evaluation values V (#$1) to V (#$4) is larger than the threshold value σ (dev_B) in step S4006 (step S4006: Yes), the above-described worst phase has occurred in the channels #1 to #4. In this case, the optical transmitting device 100 performs phase control of shifting, by Pshift, the signal phase of a channel whose normalized evaluation value V (#$i) calculated is a maximum among the channels #1 to #4 (step S4007). The optical transmitting device 100 then ends the series of processing. Pshift is, for example, a shift amount corresponding to ½ of the UI of the data signal, but is not limited to this.

When there are a plurality of channels whose normalized evaluation values V (#$i) are a maximum in step S4007, the optical transmitting device 100 selects one of the plurality of channels, and shifts the signal phase of the channel. For example, the optical transmitting device 100 shifts the signal phase of a channel having a smallest channel number among the plurality of channels or a channel selected randomly from among the plurality of channels.

Step S4007 shifts the signal phase of the data signal of a channel that is a victim of the worst phase, and may thus resolve the worst phase described above. In addition, it is possible to reduce the number of channels in which the signal phase is shifted, and thus suppress an effect of shifting the signal phase on transmission quality. Step S4007 is, for example, performed by the phase shifter control circuit 2113 by changing, by Pshift, a shift amount for the phase of the reproduced clock in the variable phase shifter 2111 of the channel whose normalized evaluation value V (#$i) calculated is a maximum. However, the optical transmitting device 100 may perform phase control similar to step S3307 illustrated in FIG. 33 in step S4006. The above-described worst phase may be resolved also in this case.

(Comparison Between Best State and Worst State in Optical Transmitting Device According to Third Embodiment)

FIG. 41 is a diagram illustrating an example of comparison between a best state and a worst state in an optical transmitting device according to the third embodiment. In FIG. 41, parts similar to the parts illustrated in FIG. 38 are identified by the same reference numerals, and description thereof will be omitted. Suppose here that the threshold value a (dev_B) used in step S4006 illustrated in FIG. 40 is 0.8.

A best state 4101 illustrated in FIG. 41 is an example of the best state in which there is a small effect of crosstalk in the channels #1 to #4. For example, the respective signal phases of the input data 3811 to 3814 are the same in the best state 4101. The optical transmitting device 100 according to the third embodiment shifts the phases of the internal clocks 3822 and 3824 by the fixed phase shifters 3911 (#2 and #4) also in the best state 4101. The VCO gains of the channels #1 to #4 are therefore 1.25, 0.5, 1.5, and 0.75, respectively. In addition, the normalized evaluation values V (#1 to #4) of the channels #1 to #4 are all zero. In this case, the optical transmitting device 100 does not perform the phase control in step S4007 because all of the normalized evaluation values V (#1 to #4) are equal to or less than a (dev_B)=0.8. The best state 4101 may therefore be maintained.

A worst state 4102 is an example of the worst state in which the worst phase has occurred such that the channel #3 is a victim in the channels #2 to #4. In the worst state 4102, the VCO gains of the channels #1 to #4 are 1.25, 1.0, 0.5, and 1.25, respectively. In addition, the normalized evaluation values V (#1 to #4) of the channels #1 to #4 are 0, 1, 1, and 0.5, respectively. In this case, because the normalized evaluation values V (#2 and #3) are larger than σ (dev_B) =0.8, the optical transmitting device 100 shifts the signal phase of one of the channels #2 and #3 in step S4007. It is thereby possible to resolve the worst state in which the worst phase has occurred such that the channel #3 is a victim in the channels #2 to #4.

A worst state 4103 is an example of the worst state in which the worst phase has occurred such that the channel #3 is a victim in the channels #1 to #3. In the worst state 4103, the VCO gains of the channels #1 to #4 are 0.75, 1.5, 1, and 1.25, respectively. In addition, the normalized evaluation values V (#1 to #4) of the channels #1 to #4 are 0.5, 2, 1, and 0, respectively. In this case, because the normalized evaluation values V (#2 and #3) are larger than σ (dev_B)=0.8, the optical transmitting device 100 shifts the signal phase of one of the channels #2 and #3 in step S4007. It is thereby possible to resolve the worst state in which the worst phase has occurred such that the channel #3 is a victim in the channels #1 to #3.

A worst state 4104 is an example of the worst state in which the worst phase has occurred such that the channel #4 is a victim. In the worst state 4104, the VCO gains of the channels #1 to #4 are 1.25, 0.5, 1.0, and 1.25, respectively. In addition, the normalized evaluation values V (#1 to #4) of the channels #1 to #4 are 0, 0, 1, and 0.5, respectively. In this case, because the normalized evaluation value V (#3) is larger than σ (dev_B)=0.8, the optical transmitting device 100 shifts the signal phase of the channel #3 in step S4007. It is thereby possible to resolve the worst state in which the worst phase has occurred such that the channel #4 is a victim.

A worst state 4105 is an example of the worst state in which the worst phase has occurred such that the channel #1 is a victim. In the worst state 4105, the VCO gains of the channels #1 to #4 are 0.75, 1, 1.5, and 0.75, respectively. In addition, the normalized evaluation values V (#1 to #4) of the channels #1 to #4 are 0.5, 1, 0, and 0, respectively. In this case, because the normalized evaluation value V (#2) is larger than σ (dev_B)=0.8, the optical transmitting device 100 shifts the signal phase of the channel #2 in step S4007.

It is thereby possible to resolve the worst state in which the worst phase has occurred such that the channel #1 is a victim.

As illustrated in FIG. 41, the optical transmitting device 100 according to the third embodiment may resolve the worst state in the case of the worst state, and maintain the best state in the case of the best state.

Thus, as in the second embodiment, the optical transmitting device 100 according to the third embodiment may adjust relative phases between the data signals of the respective channels, and consequently suppress an effect of crosstalk between channels on transmission quality.

In addition, the optical transmitting device 100 according to the third embodiment includes the fixed phase shifters 3911 (#2 and #4) that shift the phase of at least one of clocks reproduced by respective transmitting units adjacent to each other among the transmitting units 110 (#1 to #4). The phase shifters shift the phase such that phase shift amounts for the clocks reproduced by the respective transmitting units adjacent to each other are different from each other. The clocks reproduced by the respective transmitting units adjacent to each other, for example, include the respective clocks reproduced by the transmitting circuits 110a (#1 and #2), the respective clocks reproduced by the transmitting circuits 110a (#2 and #3), and the respective clocks reproduced by the transmitting circuits 110a (#3 and #4).

It is thereby possible to identify a state in which the phases of respective channels are the same based on the VCO gains of the respective channels. Then, in such a state, the optical transmitting device 100 does not adjust relative phases between the data signals of the respective channels, and may thereby suppress an effect of shifting a signal phase on transmission quality.

Incidentally, while description has been made of a case where the fixed phase shifters 3911 (#2 and #4) are provided to the CDR circuits 112 (#2 and #4) in the example illustrated in FIG. 39 and FIG. 41, a configuration may also be adopted in which fixed phase shifters 3911 (#1 and #3) are provided to the CDR circuits 112 (#1 and #3). In addition, fixed phase shifters 3911 (#1 to #4) may be provided to the CDR circuits 112 (#1 to #4), respectively, and phase shift amounts of the fixed phase shifters 3911 (#1 and #3) may be different from phase shift amounts of the fixed phase shifters 3911 (#2 and #4).

In addition, as with the optical transmitting device 100 according to the second embodiment, the optical transmitting device 100 according to the third embodiment is a transmitting device of four channels, and besides, may, for example, be a transmitting device of eight channels or more. In addition, as with the second embodiment, the third embodiment is applicable also to an optical receiving device receiving optical signals. For example, the receiving circuit 2032 of the second optical transmission device 2030 illustrated in FIG. 20 may be provided with a circuit similar to the transmitting circuit 110a including the CDR circuits 112 (#1 to #4) illustrated in FIG. 39.

In addition, the configuration of the first embodiment and the configurations of the second and third embodiments may be interchanged. For example, as with the optical transmitting devices 100 according to the second and third embodiments, the optical transmitting device 100 according to the first embodiment may include the variable phase shifters 2111 (#1 to #4) in place of the variable phase shifters 114 (#1 to #4). For example, the optical transmitting device 100 according to the first embodiment may perform phase control by shifting the phases of the reproduced clocks input to the 0/1 determining circuits 113.

In addition, as with the optical transmitting devices 100 according to the second and third embodiments, the optical transmitting device 100 according to the first embodiment may determine whether or not there is a possibility that the worst phase has occurred based on a result of comparison between the phases of the reproduced clocks of the respective channels. Then, when there is a possibility that the worst phase has occurred, phase control that solves the worst phase may be performed.

In addition, as with the optical transmitting device 100 according to the first embodiment, the optical transmitting devices 100 according to the second and third embodiments may include the variable phase shifters 114 (#1 to #4) in place of the variable phase shifters 2111 (#1 to #4). For example, the optical transmitting devices 100 according to the second and third embodiments may perform phase control by shifting the phases of the data signals output to the output drivers 115 (#1 to #4).

In addition, as in the optical transmitting device 100 according to the first embodiment, in the optical transmitting devices 100 according to the second and third embodiments, the variable phase shifters 2111 (#1 to #4) may be implemented by using a buffer chain configuration such as the configuration illustrated in FIG. 12 or the like.

In addition, as with the optical transmitting device 100 according to the first embodiment, the optical transmitting devices 100 according to the second and third embodiments may perform the phase control that shifts the signal phases of the respective channels from each other when the signal phases of the respective channels are the same. In addition, as with the optical transmitting device 100 according to the third embodiment, the optical transmitting device 100 according to the first embodiment may maintain the signal phases of the respective channels when the signal phases of the respective channels are the same.

Incidentally, each of the foregoing embodiments performs phase shifts, and therefore causes a skew (approximately 1 UI at a maximum) between channels. The skew between the channels may be compensated for by, for example, deskewing processing (capable of compensation up to approximately ±1000 UIs, for example) on the receiving side.

As described above, according to the optical transmitting devices and the optical receiving devices, it is possible to suppress an effect of crosstalk between channels on transmission quality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmitting device comprising:
a plurality of transmitters configured to be arranged so as to correspond to a plurality of channels, the transmitters each reproducing a clock from an input data signal, and outputting the data signal identified and reproduced based on the reproduced clock to a light emitting element; and
a processor configured to control phase difference between the output data signals based on a result of comparison between phases of the reproduced clocks.

2. The optical transmitting device according to claim 1, wherein
the transmitters each include a driver amplifying the identified and reproduced data signal, and output the data signal amplified by the driver to the light emitting element, and
the processor controls the phase difference between the data signals after being identified and reproduced by the transmitters and before being amplified by the driver.

3. The optical transmitting device according to claim 1, wherein when the phases of the clocks reproduced by the transmitters are the same, the processor sets phase shift amounts for the data signals output by the transmitters to respective different amounts.

4. The optical transmitting device according to claim 1, wherein
the transmitters include a first transmitter, a second transmitter adjacent to the first transmitter, and a third transmitter adjacent to the second transmitter, and
when phases of respective clocks reproduced by the first transmitter, the second transmitter, and the third transmitter are the same, the processor sets a phase shift amount for a data signal output by the second transmitter to an amount different from a phase shift amount for respective data signals output by the first transmitter and the third transmitter.

5. The optical transmitting device according to claim 4, wherein
the plurality of transmitters include a fourth transmitter adjacent to the first transmitter or the third transmitter, and
when the phases of the respective clocks reproduced by the first transmitter, the second transmitter, and the third transmitter are a first phase, and a phase of a clock reproduced by the fourth transmitter is a second phase different from the first phase, the processor controls the phase shift amount for the data signal output by the second transmitter such that the data signal output by the second transmitter has a phase different from the first phase and the second phase.

6. An optical receiving device comprising:
a plurality of receivers configured to be arranged so as to correspond to a plurality of channels, the receivers each reproducing a clock from a data signal obtained by a light receiving element by receiving an optical signal, and outputting the data signal identified and reproduced based on the reproduced clock; and
a processor configured to control phase difference between the data signals output by the receivers based on a result of comparison between phases of the clocks reproduced by the receivers,
the receivers each include a driver amplifying the identified and reproduced data signal, and output the data signal amplified by the driver, and
the processor controls the phase difference between the data signals after being identified and reproduced by the receivers and before being amplified by the driver.

7. An optical transmitting device comprising:
a plurality of transmitters configured to be arranged so as to correspond to a plurality of channels, the transmitters each reproducing a clock from an input data signal by using a voltage-controlled oscillator, and outputting the data signal identified and reproduced based on the reproduced clock to a light emitting element; and a processor configured to control phase difference between the data signals output by the transmitters based on a detection result of a gain of the voltage-controlled oscillator of each of the transmitters.

8. The optical transmitting device according to claim 7, wherein the voltage-controlled oscillator of each of the transmitters includes an inductor.

9. The optical transmitting device according to claim 7, wherein the processor detects the gain of the voltage-controlled oscillator based on at least one of a control voltage input to the voltage-controlled oscillator and the clock output by the voltage-controlled oscillator.

10. The optical transmitting device according to claim 9, wherein the processor makes the transmitters each reproduce the clock by using the voltage-controlled oscillator for respective signals of a plurality of frequencies, and detects the gain of the voltage-controlled oscillator based on the plurality of frequencies and respective control voltages input to the voltage-controlled oscillator when the clock is reproduced for the respective signals of the plurality of frequencies.

11. The optical transmitting device according to claim 10, wherein the processor detects the gain of the voltage-controlled oscillator based on a detection result of jitter of the clock output by the voltage-controlled oscillator and correspondence information between the jitter and the gain of the voltage-controlled oscillator.

12. The optical transmitting device according to claim 9, wherein the processor detects the gain of the voltage-controlled oscillator based on the control voltage input to the voltage-controlled oscillator and correspondence information between the control voltage and the gain of the voltage-controlled oscillator.

13. The optical transmitting device according to claim 7, wherein the processor calculates an evaluation value based on a difference between the detection result of the gain of the voltage-controlled oscillator and a given reference gain of the voltage-controlled oscillator for each of the transmitters, and controls the phase difference based on each calculated evaluation value.

14. The optical transmitting device according to claim 13, wherein based on a measurement result of temperature of the own device, the processor calculates the evaluation value based on a difference between the detection result of the gain of the voltage-controlled oscillator and the reference gain corresponding to the temperature of the own device.

15. The optical transmitting device according to claim 7, further comprising:

a phase shifter configured to shift a phase of at least one of respective clocks reproduced by respective transmitters adjacent to each other among the plurality of transmitters such that phase shift amounts for the respective clocks reproduced by the respective transmitters adjacent to each other are different from each other.

* * * * *